US011689256B2

(12) United States Patent
Zhong et al.

(10) Patent No.: US 11,689,256 B2
(45) Date of Patent: Jun. 27, 2023

(54) CHANNEL MEASUREMENT METHOD AND COMMUNICATIONS APPARATUS

(71) Applicant: HUAWEI TECHNOLOGIES CO., LTD., Guangdong (CN)

(72) Inventors: Zhimeng Zhong, Shanghai (CN); Huangping Jin, Shanghai (CN); Haifan Yin, Shenzhen (CN); Xiaoyan Bi, Shanghai (CN); Li Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/347,903

(22) Filed: Jun. 15, 2021

(65) Prior Publication Data

US 2021/0320694 A1 Oct. 14, 2021

Related U.S. Application Data

(63) Continuation of application No. PCT/CN2019/124505, filed on Dec. 11, 2019.

(30) Foreign Application Priority Data

Dec. 18, 2018 (CN) .......................... 201811550306.9

(51) Int. Cl.
*H04W 72/04* (2009.01)
*H04B 7/0456* (2017.01)
(Continued)

(52) U.S. Cl.
CPC ......... *H04B 7/0456* (2013.01); *H04L 5/0048* (2013.01); *H04L 25/0202* (2013.01); *H04W 72/23* (2023.01)

(58) Field of Classification Search
CPC .... H04J 11/0053; H04J 11/00; H04J 11/0023; H04J 11/0079; H04J 11/0036;
(Continued)

(56) References Cited

U.S. PATENT DOCUMENTS

2012/0033571 A1* 2/2012 Shimezawa .......... H04B 7/0689
370/252
2014/0064109 A1* 3/2014 Krishnamurthy .... H04B 7/0456
370/252
(Continued)

FOREIGN PATENT DOCUMENTS

CN 105099529 A 11/2015
CN 106599391 A 4/2017
(Continued)

OTHER PUBLICATIONS

CATT, "Discussion on standard-transparent baseline schemes for EBF/FD-MIMO," 3GPP TSG RAN WG1 Meeting #80, R1-150119, Athens, Greece, Feb. 9-13, 2015, 3 pages.
(Continued)

*Primary Examiner* — Eva Y Puente
(74) *Attorney, Agent, or Firm* — Fish & Richardson P.C.

(57) ABSTRACT

Example channel measurement methods and communications apparatus are described. One example method includes receiving a precoded reference signal by a terminal device, where the precoded reference signal is obtained by precoding a reference signal based on K angle vectors and L delay vectors. First indication information is generated and sent, where the first indication information is used to indicate P weighting coefficients corresponding to P angle-delay pairs. The P weighting coefficients are determined by using the precoded reference signal. The P angle-delay pairs and the P weighting coefficients corresponding to the P angle-delay pairs are used to determine a precoding matrix. Each angle-delay pair includes one of the K angle vectors and one of the
(Continued)

L delay vectors. The K angle vectors and the L delay vectors are determined based on uplink channel measurement.

21 Claims, 6 Drawing Sheets

(51) Int. Cl.
*H04L 5/00* (2006.01)
*H04L 25/02* (2006.01)
*H04W 72/23* (2023.01)

(58) Field of Classification Search
CPC .... H04J 11/0066; H04J 11/005; H04J 11/003; H04J 11/0056; H04W 72/04; H04W 72/042; H04W 88/08; H04W 24/10; H04W 72/0446; H04W 88/02; H04W 52/325; H04W 52/146; H04W 72/046; H04L 5/0048; H04L 1/0026; H04L 5/0057; H04L 5/0053; H04L 5/0023; H04L 1/0027; H04L 5/0051; H04L 1/06; H04L 5/005; H04L 5/00
USPC .......................................................... 375/267
See application file for complete search history.

(56) References Cited

U.S. PATENT DOCUMENTS

| | | | |
|---|---|---|---|
| 2017/0026100 A1* | 1/2017 | Wang | H04B 7/0639 |
| 2019/0379433 A1* | 12/2019 | Chen | H04L 5/0048 |
| 2020/0228181 A1* | 7/2020 | Wu | H04B 7/0663 |
| 2020/0358497 A1 | 11/2020 | Liu et al. | |

FOREIGN PATENT DOCUMENTS

| | | | |
|---|---|---|---|
| CN | 107196749 A | 9/2017 | |
| CN | 107370558 A | 11/2017 | |
| CN | 107733485 A | 2/2018 | |
| CN | 107888265 A | 4/2018 | |
| CN | 107889141 A | 4/2018 | |
| CN | 108631891 A | 10/2018 | |
| CN | 108933745 A | 12/2018 | |
| EP | 2843854 A1 | 3/2015 | |
| WO | 2017193961 A1 | 11/2017 | |
| WO | 2018146633 A1 | 8/2018 | |
| WO | 2018201495 A1 | 11/2018 | |

OTHER PUBLICATIONS

Extended European Search Report issued in European Application No. 19899982.3 dated Dec. 15, 2021, 13 pages.
ZTE, "Specification Impacts of Beamformed CSI-RS Configuration," 3GPP TSG RAN WG1 Meeting #82bis, R1-155264, Malmö, Sweden, Oct. 5- 9, 2015, 6 pages.
3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.
Haghighatshoar et al., "Pilot decontamination through compressive wideband channel estimation," 2016 50th Asilomar Conference on Signals, Systems and Computers, Mar. 6, 2017, 5 pages.
Huawei, HiSilicon, "Discussion on CSI enhancement," 3GPP TSG RAN WG1 Meeting #95, R1-1812242, Spokane, USA, Nov. 12-16, 2018, 8 pages.
Intel Corporation, "Discussion on Type II CSI compression," 3GPP TSG RAN WG1 #95, R1-1812511, Spokane, USA Nov. 12-16, 2018, 10 pages.
Luo, "Research on Three Dimensional MIMO System And Its Precoding Methods," Master Thesis Dissertation, University of Electronic Science and Technology of China, Feb. 2016, 2 pages (with English abstract).
Office Action issued in Chinese Application No. 201811550306.9 dated Mar. 18, 2021, 6 pages (with English translation).
Office Action issued in Chinese Application No. 201811550306.9 dated Nov. 2, 2020, 16 pages (with English translation).
PCT International Search Report and Written Opinion issued in International Application No. PCT/CN2019/124505 dated Mar. 10, 2020, 14 pages (with English translation).

* cited by examiner

CHANNEL MEASUREMENT METHOD AND COMMUNICATIONS APPARATUS

CROSS-REFERENCE TO RELATED APPLICATIONS

This application is a continuation of International Application No. PCT/CN2019/124505, filed on Dec. 11, 2019, which claims priority to Chinese Patent Application No. 201811550306.9, filed on Dec. 18, 2018. The disclosures of the aforementioned applications are hereby incorporated by reference in their entireties.

TECHNICAL FIELD

This application relates to the wireless communications field, and more specifically, to a channel measurement method and a communications apparatus.

BACKGROUND

In a massive multiple-input multiple-output (Massive MIMO) technology, a network device may reduce interference between a plurality of users and interference between a plurality of signal flows of a same user through precoding. This helps improve signal quality, implement spatial multiplexing, and improve spectrum utilization.

For example, a terminal device may determine a precoding matrix based on downlink channel measurement, and expects to enable, through feedback, the network device to obtain a precoding matrix that is the same as or similar to the precoding matrix determined by the terminal device. Specifically, for example, the terminal device may indicate the precoding matrix by feeding back one or more beam vectors and a weighting coefficient of the one or more beam vectors. For details of the feedback of the terminal device, refer to a type II codebook feedback mode defined in the new radio (NR) protocol TS38.214.

However, such a feedback mode causes relatively high feedback overheads.

SUMMARY

This application provides a channel measurement method and a communications apparatus, to reduce feedback overheads.

According to a first aspect, a channel measurement method is provided. The method may be performed by a terminal device, or may be performed by a chip disposed in a terminal device.

Specifically, the method includes: receiving a precoded reference signal, where the precoded reference signal is obtained by precoding a reference signal based on K angle vectors and L delay vectors; generating first indication information, where the first indication information is used to indicate P weighting coefficients corresponding to P angle-delay pairs; the P weighting coefficients are determined by using the precoded reference signal; the P angle-delay pairs and the P weighting coefficients corresponding to the P angle-delay pairs are used to determine a precoding matrix; each of the P angle-delay pairs includes one of the K angle vectors and one of the L delay vectors; and P, K, and L are all positive integers; and sending the first indication information.

Therefore, a network device may precode a downlink reference signal based on a predetermined angle and delay, so that the terminal device performs downlink channel measurement based on the precoded reference signal. Because the network device precodes the reference signal based on the predetermined angle and delay, the terminal device may not need to feed back a space domain vector and a frequency domain vector (for example, the foregoing angle vector and delay vector), but only needs to feed back a weighting coefficient corresponding to each angle-delay pair, thereby greatly reducing feedback overheads of the terminal device. Moreover, the reference signal is precoded, which is equivalent to predetermining a space domain vector and a frequency domain vector that can be used to construct a precoding matrix, so that a downlink channel measurement process of the terminal device is simplified, and calculation complexity of the terminal device in the channel measurement process is reduced. In addition, a precoding matrix is constructed through linear superposition of a plurality of space domain vectors and a plurality of frequency domain vectors, so that the precoding matrix determined by the network device can adapt to a downlink channel, thereby still ensuring relatively high feedback precision while reducing the feedback overheads. Further, space-domain precoding is performed on the downlink reference signal, so that a quantity of ports for a reference signal can be reduced, thereby reducing pilot overheads.

With reference to the first aspect, in some implementations of the first aspect, the method further includes: receiving second indication information, where the second indication information is used to configure one or more reference signal resources; the one or more reference signal resources are used to carry the precoded reference signal; a precoded reference signal carried on a same reference signal resource corresponds to one or more ports; and when a plurality of reference signal resources are configured by using the second indication information, angle-delay pairs corresponding to precoded reference signals carried on the reference signal resources are different, and the reference signal resources do not overlap in frequency domain and/or time domain.

The network device may configure one or more reference signal resources in an existing reference signal resource configuration manner. Reference signals carried on the one or more reference resources may all be used for channel measurement. A quantity of ports corresponding to a precoded reference signal carried on each reference signal resource may be counted in a unit of an RB. Therefore, precoded reference signals carried on different reference signal resources may correspond to different angle vectors and/or delay vectors. Port numbers corresponding to precoded reference signals carried on different reference signal resources may be the same or may be different. This is not limited in this application.

With reference to the first aspect, in some implementations of the first aspect, the method further includes: receiving third indication information, where the third indication information is used to configure one reference signal resource; the reference signal resource is used to carry the precoded reference signal; and port numbers corresponding to precoded reference signals carried on at least two resource blocks (RB) in the reference signal resource are different.

Alternatively, the network device may configure, in a manner different from an existing reference resource configuration manner, one reference signal resource for a precoded reference signal corresponding to a plurality of angle vectors and a plurality of delay vectors. A quantity of ports corresponding to the precoded reference signal carried on the reference signal resource may be counted across RBs. Therefore, precoded reference signals carried on at least two RBs in a same reference signal resource may correspond to different delay vectors and/or angle vectors. On a same reference signal resource, different delay vectors and/or angle vectors may be distinguished by using different port numbers.

With reference to the first aspect, in some implementations of the first aspect, the method further includes: receiving fourth indication information, where the fourth indication information is used to indicate a quantity M of frequency domain groups; each of the M frequency domain groups includes a plurality of RBs; precoded reference signals that are of a same port and that are carried on any two RBs in a same frequency domain group correspond to a same angle-delay pair; and M is an integer greater than 1.

The plurality of RBs are grouped, so that different angle vectors and/or delay vectors can be loaded to different frequency domain groups, thereby reducing a quantity of ports corresponding to a precoded reference signal carried on each RB, and also reducing pilot overheads.

According to a second aspect, a channel measurement method is provided. The method may be performed by a network device, or may be performed by a chip disposed in a network device.

Specifically, the method includes: sending a precoded reference signal, where the precoded reference signal is obtained by precoding a reference signal based on K angle vectors and L delay vectors; receiving first indication information, where the first indication information is used to indicate P weighting coefficients corresponding to P angle-delay pairs; the P weighting coefficients are determined by using the precoded reference signal; the P angle-delay pairs and the P weighting coefficients corresponding to the P angle-delay pairs are used to determine a precoding matrix; each of the P angle-delay pairs includes one of the K angle vectors and one of the L delay vectors; and P, K, and L are all positive integers; and determining the precoding matrix based on the first indication information.

Therefore, the network device may precode a downlink reference signal based on a predetermined angle and delay, so that a terminal device performs downlink channel measurement based on the precoded reference signal. Because the network device precodes the reference signal based on the predetermined angle and delay, the terminal device may not need to feed back a space domain vector and a frequency domain vector (for example, the foregoing angle vector and delay vector), but only needs to feed back a weighting coefficient corresponding to each angle-delay pair, thereby greatly reducing feedback overheads of the terminal device. Moreover, the reference signal is precoded, which is equivalent to predetermining a space domain vector and a frequency domain vector that can be used to construct a precoding matrix, so that a downlink channel measurement process of the terminal device is simplified, and calculation complexity of the terminal device in the channel measurement process is reduced. In addition, a precoding matrix is constructed through linear superposition of a plurality of space domain vectors and a plurality of frequency domain vectors, so that the precoding matrix determined by the network device can adapt to a downlink channel, thereby still ensuring relatively high feedback precision while reducing the feedback overheads. Further, space-domain precoding is performed on the downlink reference signal, so that a quantity of ports for a reference signal can be reduced, thereby reducing pilot overheads.

With reference to the second aspect, in some implementations of the second aspect, the method further includes: sending second indication information, where the second indication information is used to configure one or more reference signal resources; the one or more reference signal resources are used to carry the precoded reference signal; a precoded reference signal carried on a same reference signal resource corresponds to one or more ports; and when a plurality of reference signal resources are configured by using the second indication information, angle-delay pairs corresponding to precoded reference signals carried on the reference signal resources are different, and the reference signal resources do not overlap in frequency domain and/or time domain.

The network device may configure one or more reference signal resources in an existing reference signal resource configuration manner. Reference signals carried on the one or more reference resources may all be used for channel measurement. A quantity of ports corresponding to a precoded reference signal carried on each reference signal resource may be counted in a unit of an RB. Therefore, precoded reference signals carried on different reference signal resources may correspond to different angle vectors and/or delay vectors. Port numbers corresponding to precoded reference signals carried on different reference signal resources may be the same or may be different. This is not limited in this application.

With reference to the second aspect, in some implementations of the second aspect, the method further includes: sending third indication information, where the third indication information is used to configure one reference signal resource; the reference signal resource is used to carry the precoded reference signal; and ports corresponding to precoded reference signals carried on at least two RBs in the reference signal resource are different.

Alternatively, the network device may configure, in a manner different from an existing reference resource configuration manner, one reference signal resource for a precoded reference signal corresponding to a plurality of angle vectors and a plurality of delay vectors. A quantity of ports corresponding to the precoded reference signal carried on the reference signal resource may be counted across RBs. Therefore, precoded reference signals carried on at least two RBs in a same reference signal resource may correspond to different delay vectors and/or angle vectors. On a same reference signal resource, different delay vectors and/or angle vectors may be distinguished by using different port numbers.

With reference to the second aspect, in some implementations of the second aspect, the method further includes: sending fourth indication information, where the fourth indication information is used to indicate a quantity M of frequency domain groups; each of the M frequency domain groups includes a plurality of RBs; precoded reference signals that are of a same port and that are carried on any two RBs in a same frequency domain group correspond to a same angle-delay pair; and M is an integer greater than 1.

The plurality of RBs are grouped, so that different angle vectors and/or delay vectors can be loaded to different frequency domain groups, thereby reducing a quantity of ports corresponding to a precoded reference signal carried on each RB, and also reducing pilot overheads.

With reference to the first aspect or the second aspect, in some implementations, each of the P weighting coefficients is a sum of a plurality of estimation values obtained by performing channel estimation, on a plurality of RBs, on a precoded reference signal that is obtained through precoding based on one angle vector and one delay vector.

The K angle vectors and the L delay vectors may be used to determine the P angle-delay pairs. Each of the P angle-delay pairs may include one of the K angle vectors and one of the L delay vectors. The terminal device may perform channel estimation, on the plurality of RBs, on the precoded reference signal corresponding to the one angle vector and the one delay vector, and obtain the sum of the plurality of channel estimation values obtained through estimation, to determine the weighting coefficient corresponding to the angle vector and the delay vector. The weighting coefficient is a weighting coefficient of an angle-delay pair including the angle vector and the delay vector.

With reference to the first aspect or the second aspect, in some implementations, the K angle vectors and the L delay vectors are determined based on uplink channel measurement.

Reciprocity between uplink and downlink channels is used, so that the network device loads reciprocal angles and reciprocal delays to a downlink reference signal, to precompensate the downlink channel; and the terminal device determines, based on the received precoded reference signal, information about a downlink channel that has no reciprocity. Therefore, a downlink channel measurement process of the terminal device is simplified, and calculation complexity of the terminal device in the channel measurement process is reduced.

According to a third aspect, a channel measurement method is provided. The method may be performed by a terminal device, or may be performed by a chip disposed in a terminal device.

Specifically, the method includes: receiving a precoded reference signal, where the precoded reference signal is obtained by precoding a reference signal based on L delay vectors; generating fifth indication information, where the fifth indication information is used to indicate P weighting coefficients corresponding to P antenna-delay pairs; the P weighting coefficients are determined by using the precoded reference signal; the P antenna-delay pairs and the P weighting coefficients corresponding to the P antenna-delay pairs are used to determine a precoding matrix; each of the P antenna-delay pairs includes one of T transmit antenna ports and one of the L delay vectors; and P, T, and L are all positive integers; and sending the fifth indication information.

Therefore, a network device may precode a downlink reference signal on each transmit antenna port based on a predetermined delay, so that the terminal device performs downlink channel measurement based on the precoded reference signal. Because the network device precodes the reference signal based on the predetermined delay, the terminal device may not need to feed back a frequency domain vector (for example, the foregoing delay vector), but only needs to feed back a weighting coefficient corresponding to each antenna-delay pair, thereby greatly reducing feedback overheads of the terminal device. Moreover, the reference signal is precoded, which is equivalent to predetermining a frequency domain vector that can be used to construct a precoding matrix, so that a downlink channel measurement process of the terminal device is simplified, and calculation complexity of the terminal device in the channel measurement process is reduced. In addition, a precoding matrix is constructed through linear superposition of a plurality of frequency domain vectors, so that the precoding matrix determined by the network device can adapt to a downlink channel, thereby still ensuring relatively high feedback precision while reducing the feedback overheads.

With reference to the third aspect, in some implementations of the third aspect, the method further includes: receiving second indication information, where the second indication information is used to configure one or more reference signal resources; the one or more reference signal resources are used to carry the precoded reference signal; a precoded reference signal carried on a same reference signal resource corresponds to one or more ports; and when a plurality of reference signal resources are configured by using the second indication information, antenna-delay pairs corresponding to precoded reference signals carried on the reference signal resources are different, and the reference signal resources do not overlap in frequency domain and/or time domain.

The network device may configure one or more reference signal resources in an existing reference signal resource configuration manner. Reference signals carried on the one or more reference resources may all be used for channel measurement. A quantity of ports corresponding to a precoded reference signal carried on each reference signal resource may be counted in a unit of an RB. Therefore, precoded reference signals carried on different reference signal resources may correspond to different transmit antenna ports and/or delay vectors. Port numbers corresponding to precoded reference signals carried on different reference signal resources may be the same or may be different. This is not limited in this application.

With reference to the third aspect, in some implementations of the third aspect, the method further includes: receiving third indication information, where the third indication information is used to configure one reference signal resource; the reference signal resource is used to carry the precoded reference signal, and port numbers corresponding to precoded reference signals carried on at least two RBs in the reference signal resource are different.

Alternatively, the network device may configure, in a manner different from an existing reference resource configuration manner, one reference signal resource for a precoded reference signal corresponding to a plurality of angle vectors and a plurality of delay vectors. A quantity of ports corresponding to the precoded reference signal carried on the reference signal resource may be counted across RBs. Therefore, precoded reference signals carried on at least two RBs in a same reference signal resource may correspond to different transmit antenna ports and/or delay vectors. On a same reference signal resource, different transmit antenna ports and/or delay vectors may be distinguished by using different port numbers.

With reference to the third aspect, in some implementations of the third aspect, the method further includes: receiving fourth indication information, where the fourth indication information is used to indicate a quantity M of frequency domain groups; each of the M frequency domain groups includes a plurality of RBs; precoded reference signals that are of a same port and that are carried on any two RBs in a same frequency domain group correspond to a same angle-delay pair; and M is an integer greater than 1.

The plurality of RBs are grouped, so that different delay vectors can be loaded to different frequency domain groups, thereby reducing a quantity of ports corresponding to a precoded reference signal carried on each RB, and also reducing pilot overheads.

According to a fourth aspect, a channel measurement method is provided. The method may be performed by a network device, or may be performed by a chip disposed in a network device.

Specifically, the method includes: sending a precoded reference signal, where the precoded reference signal is obtained by precoding a reference signal based on L delay vectors; receiving the fifth indication information, where the fifth indication information is used to indicate P weighting coefficients corresponding to P antenna-delay pairs; the P weighting coefficients are determined by using the precoded reference signal; the P antenna-delay pairs and the P weighting coefficients corresponding to the P antenna-delay pairs are used to determine a precoding matrix; each of the P antenna-delay pairs includes one of T transmit antenna ports and one of the L delay vectors; and P, T, and L are all positive integers; and determining the precoding matrix based on the fifth indication information.

Therefore, the network device may precode a downlink reference signal on each transmit antenna port based on a predetermined delay, so that a terminal device performs downlink channel measurement based on the precoded reference signal. Because the network device precodes the reference signal based on the predetermined delay, the terminal device may not need to feed back a frequency domain vector (for example, the foregoing delay vector), but only needs to feed back a weighting coefficient corresponding to each antenna-delay pair, thereby greatly reducing feedback overheads of the terminal device. Moreover, the reference signal is precoded, which is equivalent to predetermining a frequency domain vector that can be used to construct a precoding matrix, so that a downlink channel measurement process of the terminal device is simplified, and calculation complexity of the terminal device in the channel measurement process is reduced. In addition, a precoding matrix is constructed through linear superposition of a plurality of frequency domain vectors, so that the precoding matrix determined by the network device can adapt to a downlink channel, thereby still ensuring relatively high feedback precision while reducing the feedback overheads.

With reference to the fourth aspect, in some implementations of the fourth aspect, the method further includes: sending second indication information, where the second indication information is used to configure one or more reference signal resources; the one or more reference signal resources are used to carry the precoded reference signal; a precoded reference signal carried on a same reference signal resource corresponds to one or more ports; and when a plurality of reference signal resources are configured by using the second indication information, antenna-delay pairs corresponding to precoded reference signals carried on the reference signal resources are different, and the reference signal resources do not overlap in frequency domain and/or time domain.

The network device may configure one or more reference signal resources in an existing reference signal resource configuration manner. Reference signals carried on the one or more reference resources may all be used for channel measurement. A quantity of ports corresponding to a precoded reference signal carried on each reference signal resource may be counted in a unit of an RB. Therefore, precoded reference signals carried on different reference signal resources may correspond to different transmit antenna ports and/or delay vectors. Port numbers corresponding to precoded reference signals carried on different reference signal resources may be the same or may be different. This is not limited in this application.

With reference to the fourth aspect, in some implementations of the fourth aspect, the method further includes: sending third indication information, where the third indication information is used to configure one reference signal resource; the reference signal resource is used to carry the precoded reference signal; and port numbers corresponding to precoded reference signals carried on at least two RBs in the reference signal resource are different.

Alternatively, the network device may configure, in a manner different from an existing reference resource configuration manner, one reference signal resource for a precoded reference signal corresponding to a plurality of angle vectors and a plurality of delay vectors. A quantity of ports corresponding to the precoded reference signal carried on the reference signal resource may be counted across RBs. Therefore, precoded reference signals carried on at least two RBs in a same reference signal resource may correspond to different transmit antenna ports and/or delay vectors. On a same reference signal resource, different transmit antenna ports and/or delay vectors may be distinguished by using different port numbers.

With reference to the fourth aspect, in some implementations of the fourth aspect, the method further includes: sending fourth indication information, where the fourth indication information is used to indicate a quantity M of frequency domain groups; each of the M frequency domain groups includes a plurality of RBs; precoded reference signals that are of a same port and that are carried on any two RBs in a same frequency domain group correspond to a same angle-delay pair; and M is an integer greater than 1.

The plurality of RBs are grouped, so that different delay vectors can be loaded to different frequency domain groups, thereby reducing a quantity of ports corresponding to a precoded reference signal carried on each RB, and also reducing pilot overheads.

With reference to the third aspect or the fourth aspect, in some implementations, each of the P weighting coefficients is a sum of a plurality of estimation values obtained by performing channel estimation, on a plurality of RBs, on a precoded reference signal that is sent through one transmit antenna port and that is obtained through precoding based on one delay vector.

The L delay vectors and T transmit antenna ports in each polarization direction may be used to determine P antenna-delay pairs. Each of the P antenna-delay pairs may include one of the T transmit antenna ports and one of the L delay vectors. The terminal device may perform channel estimation, on the plurality of RBs, on the precoded reference signal corresponding to the one transmit antenna port and the one delay vector, and obtain the sum of the plurality of channel estimation values obtained through estimation, to determine the weighting coefficient corresponding to the transmit antenna port and the delay vector. The weighting coefficient is a weighting coefficient of an antenna-delay pair including the transmit antenna port and the delay vector.

With reference to the third aspect or the fourth aspect, in some implementations, the L delay vectors are determined through uplink channel measurement.

Reciprocity between uplink and downlink channels is used, so that reciprocal delays can be loaded to a downlink reference signal, to pre-compensate the downlink channel; and the terminal device determines, based on the received precoded reference signal, information about a downlink channel that has no reciprocity. Therefore, a downlink channel measurement process of the terminal device is simplified, and calculation complexity of the terminal device in the channel measurement process is reduced.

With reference to any one of the first aspect to the fourth aspect, in some implementations, the P weighting coefficients correspond to one receive antenna.

That is, the first indication information and the fifth indication information may be fed back based on the receive antenna. In this case, the terminal device may feed back, based on the received precoded reference signal, P weighting coefficients corresponding to each receive antenna. The network device may reconstruct a downlink channel based on the weighting coefficients corresponding to each receive antenna, to determine the precoding matrix.

With reference to any one of the first aspect to the fourth aspect, in some implementations, the P weighting coefficients correspond to one transport layer.

That is, the first indication information and the fifth indication information may be fed back based on the transport layer. In this case, the terminal device may determine the transport layer based on the received precoded reference signal, and feed back P weighting coefficients based on each transport layer. The network device may directly determine the precoding matrix based on the weighting coefficients corresponding to each transport layer.

According to a fifth aspect, a communications apparatus is provided. The communications apparatus includes modules or units configured to perform the method according to any one of the first aspect or the third aspect or the possible implementations of the first aspect or the third aspect.

According to a sixth aspect, a communications apparatus is provided. The communications apparatus includes a processor. The processor is coupled to a memory, and may be configured to execute instructions in the memory, to implement the method according to any one of the first aspect or the third aspect or the possible implementations of the first aspect or the third aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface may be an input/output circuit.

According to a seventh aspect, a communications apparatus is provided. The communications apparatus includes modules or units configured to perform the method according to any one of the second aspect or the fourth aspect or the possible implementations of the second aspect or the fourth aspect.

According to an eighth aspect, a communications apparatus is provided. The communications apparatus includes a processor. The processor is coupled to a memory, and may be configured to execute instructions in the memory, to implement the method according to any one of the second aspect or the fourth aspect or the possible implementations of the second aspect or the fourth aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to a ninth aspect, a processor is provided. The processor includes an input circuit, an output circuit, and a processing circuit. The processing circuit is configured to: receive a signal through the input circuit, and transmit a signal through the output circuit, so that the processor performs the method according to any one of the first aspect to the fourth aspect or the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a tenth aspect, a processing apparatus is provided. The processing apparatus includes a processor and a memory. The processor is configured to: read instructions stored in the memory, receive a signal through a receiver, and transmit a signal through a transmitter, to perform the method according to any one of the first aspect to the fourth aspect or the possible implementations of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the tenth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to an eleventh aspect, a computer program product is provided. The computer program product includes a computer program (which may also be referred to as code or an instruction), and when the computer program is run, a computer is enabled to perform the method according to any one of the first aspect to the fourth aspect or the possible implementations of the first aspect to the fourth aspect.

According to a twelfth aspect, a computer-readable medium is provided. The computer-readable medium stores a computer program (which may also be referred to as code or an instruction), and when the computer program is run on a computer, the computer is enabled to perform the method according to any one of the first aspect to the fourth aspect or the possible implementations of the first aspect to the fourth aspect.

According to a thirteenth aspect, a communications system is provided. The communications system includes the foregoing network device and terminal device.

DESCRIPTION OF EMBODIMENTS

The following describes the technical solutions in this application with reference to the accompanying drawings.

The technical solutions in the embodiments of this application may be applied to various communications systems such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

Figure 1:
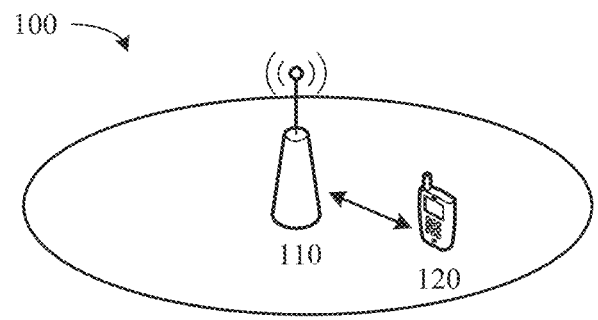
FIG. 1 is a schematic diagram of a communications system to which a channel measurement method according to an embodiment of this application is applicable.

For ease of understanding the embodiments of this application, a communications system shown in FIG. 1 is first used as an example to describe in detail a communications system to which the embodiments of this application are applicable. FIG. 1 is a schematic diagram of a communications system 100 to which a precoding vector indication method according to an embodiment of this application is applicable. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 may communicate with the terminal device 120 through a radio link. A plurality of antennas may be configured for each communications device such as the network device 110 or the terminal device 120. For each communications device in the communications system 100, the plurality of configured antennas may include at least one transmit antenna configured to send a signal and at least one receive antenna configured to receive a signal. Therefore, the communications devices in the communications system 100, for example, the network device 110 and the terminal device 120, may communicate with each other by using a multi-antenna technology.

It should be understood that the network device in the communications system may be any device having a wireless transceiver function or a chip that may be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), an access point (AP) in a wireless fidelity (wireless fidelity, Wi-Fi) system, a wireless relay node, a wireless backhaul node, a transmission point (TP), a transmission reception point (TRP), or the like, or may be a gNB or a transmission point (TRP or TP) in a 5G system, for example, an NR system, or one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, the gNB may include a centralized unit (CU) and the DU. The gNB may further include a radio frequency unit (radio unit, RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in such an architecture, higher layer signaling, such as RRC layer signaling or PHCP (dynamic host configuration protocol) layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network (CN). This is not limited herein.

It should be further understood that the terminal device in the communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application.

It should be further understood that FIG. 1 is merely a simplified schematic diagram used as an example for ease of understanding. The communications system 100 may further include another network device or another terminal device, which is not shown in FIG. 1.

For ease of understanding the embodiments of this application, the following briefly describes a processing process of a downlink signal at the physical layer before the downlink signal is sent. It should be understood that the processing process of the downlink signal described below may be performed by the network device, or may be performed by a chip disposed in the network device. For ease of description, these devices are collectively referred to as network devices below.

The network device may process a codeword on a physical channel. The codeword may be a coded bit obtained through coding (for example, including channel coding). The codeword is scrambled to generate a scrambled bit. Modulation mapping is performed on the scrambled bit, to obtain a modulated symbol. The modulated symbol is mapped to a plurality of layers through layer mapping. The layer is also referred to as a transport layer. A modulated symbol obtained through the layer mapping is precoded, to obtain a precoded signal. The precoded signal is mapped to a plurality of resource elements (RE) through RE mapping. These REs are then transmitted through an antenna port after orthogonal multiplexing (orthogonal frequency division multiplexing, OFDM) modulation is performed on the REs.

It should be understood that the processing process of the downlink signal described above is merely an example for description, and shall not constitute any limitation on this application. For a specific processing process of the downlink signal, refer to the conventional technology. For brevity, detailed descriptions of the specific process are omitted herein.

For ease of understanding the embodiments of this application, the following briefly describes several terms used in this application.

1. Precoding technology: When a channel state is known, the network device may process a to-be-sent signal by using a precoding matrix that matches the channel state, so that a precoded to-be-sent signal adapts to a channel, thereby reducing complexity of eliminating inter-channel impact by a receiving device. Therefore, after the to-be-sent signal is precoded, quality (for example, a signal to interference plus noise ratio (SINR)) of a received signal is improved. Therefore, a sending device and a plurality of receiving devices can implement transmission on a same time-frequency resource by using the precoding technology. That is, multi-user multiple-input multiple-output (MU-MIMO) is implemented. It should be understood that related descriptions of the precoding technology in this specification are merely examples for ease of understanding, and are not intended to limit the protection scope of the embodiments of this application. In a specific implementation process, the sending device may further perform precoding in another manner. For example, when channel information (for example, but not limited to a channel matrix) cannot be learned of, precoding is performed by using a preset precoding matrix or through weighted processing. For brevity, specific content of the precoding manner is not further described in this specification.

2. Channel reciprocity: In a time division duplex (TDD) mode, on uplink and downlink channels, signals are transmitted on different time domain resources and on a same frequency domain resource. Within a relatively short time (for example, a channel propagation coherence time), it may be considered that signals on uplink and downlink channels experience same channel fading. This is reciprocity between the uplink and downlink channels. Based on the reciprocity between the uplink and downlink channels, the network device may measure an uplink channel based on an uplink reference signal, for example, a sounding reference signal (SRS). In addition, the downlink channel may be estimated based on the uplink channel, so that a precoding matrix used for downlink transmission can be determined.

However, in a frequency division duplex (FDD) mode, because a frequency band interval between the uplink and downlink channels is far greater than a coherence bandwidth, and the uplink and downlink channels do not have complete reciprocity, the precoding matrix that is used for downlink transmission and that is determined by using the uplink channel may not adapt to the downlink channel. However, in the FDD mode, the uplink and downlink channels still have partial reciprocity, for example, angle reciprocity and delay reciprocity. Therefore, an angle and a delay may also be referred to as reciprocity parameters.

When a signal is transmitted through a radio channel, the signal may arrive at a receive antenna through a plurality of paths from a transmit antenna. A multipath delay causes frequency selective fading, that is, a change in a frequency domain channel. A delay is a transmission time of a radio signal on different transmission paths, is determined by a distance and a speed, and is irrelevant to a frequency domain of the radio signal. When a signal is transmitted on different transmission paths, there are different transmission delays due to different distances. Therefore, delays on the uplink and downlink channels in the FDD mode may be considered to be the same, in other words, reciprocal.

In addition, an angle may be an angle of arrival (AOA) at which a signal arrives at a receive antenna through a radio channel, or may be an angle of departure (AOD) at which a signal is transmitted through a transmit antenna. In the embodiments of this application, the angle may be an angle of arrival at which an uplink signal arrives at the network device, or may be an angle of departure at which the network device transmits a downlink signal. Because of reciprocity of transmission paths of the uplink and downlink channels at different frequencies, an angle of arrival of the uplink reference signal and an angle of departure of a downlink reference signal may be considered to be reciprocal.

Therefore, it may be considered that the delays and the angles on the uplink and downlink channels in the FDD mode have reciprocity. In the embodiments of this application, each angle may be represented by using one angle vector, and each delay may be represented by using one delay vector. Therefore, in the embodiments of this application, one angle vector may represent one angle, and one delay vector may represent one delay.

3. Reference signal (RS) and precoded reference signal: The reference signal may also be referred to as a pilot, a reference sequence, or the like. In the embodiments of this application, the reference signal may be a reference signal used for channel measurement. For example, the reference signal may be a channel state information reference signal (CSI-RS) used for downlink channel measurement, or may be a sounding reference signal (SRS) used for uplink channel measurement. It should be understood that the reference signals listed above are merely examples, and shall not constitute any limitation on this application. This application does not exclude a possibility that another reference signal is defined in a future protocol to implement a same or similar function.

The precoded reference signal may be a reference signal obtained by precoding the reference signal. The precoding may specifically include beamforming and/or phase rotation. Beamforming may be implemented, for example, by precoding a downlink reference signal based on one or more angle vectors, and phase rotation may be implemented, for example, by precoding a downlink reference signal based on one or more delay vectors.

In the embodiments of this application, for ease of differentiation and description, a reference signal obtained through precoding, for example, beamforming and/or phase rotation, is referred to as a precoded reference signal, and a reference signal that is not precoded is referred to as a reference signal for short.

In the embodiments of this application, precoding the downlink reference signal based on the one or more angle vectors may also be referred to as loading the one or more angle vectors to the downlink reference signal, to implement beamforming. Precoding the downlink reference signal based on the one or more delay vectors may also be referred to as loading the one or more delay vectors to the downlink reference signal, to implement phase rotation.

4. Port: The port may be understood as a virtual antenna identified by a receiving device. In the embodiments of this application, a port may be a transmit antenna port. For example, a reference signal of each port may be a reference signal that is not precoded, or may be a precoded reference signal obtained by precoding a reference signal based on one delay vector. The port may alternatively be a reference signal port after beamforming. For example, a reference signal of each port may be a precoded reference signal obtained by precoding a reference signal based on one angle vector, or may be a precoded reference signal obtained by precoding a reference signal based on one angle vector and one delay vector. A signal of each port may be transmitted by using one or more RBs.

The transmit antenna port may be an actual independent transceiver unit (TxRU). It may be understood that, if space-domain precoding is performed on a reference signal, a quantity of ports may be a quantity of reference signal ports, and the quantity of reference signal ports may be less than a quantity of transmit antenna ports.

In embodiments shown below, when a transmit antenna port is involved, the quantity of ports may be a quantity of ports on which space-domain precoding is not performed, namely, a quantity of actual independent transceiver units. When a port is involved, in different embodiments, the port may be a transmit antenna port, or may be a reference signal port. A specific meaning expressed by the port may be determined based on a specific embodiment.

5. Angle vector: The angle vector may be understood as a precoding vector used to perform beamforming on a reference signal. A transmitted reference signal may have specific spatial directivity through beamforming. Therefore, a process of precoding a reference signal based on an angle vector may also be considered as a space domain (or space domain for short) precoding process.

A quantity of ports of a precoded reference signal obtained by precoding a reference signal based on one or more angle vectors is the same as a quantity of the angle vectors. When the quantity K of the angle vectors is less than a quantity T of transmit antennas, dimension reduction of antenna ports can be implemented through space-domain precoding, thereby reducing pilot overheads.

A length of the angle vector may be T, T is a quantity of transmit antenna ports in one polarization direction, and T≥1 and T is an integer.

Optionally, the angle vector is obtained from a discrete Fourier transform (DFT) matrix, for example, $$v_{i_1,i_2} = \left[ u_{i_2} \quad e^{j\frac{2\pi i_1}{O_1 I_1}} u_{i_2} \quad \ldots \quad e^{j\frac{2\pi i_1(I_1-1)}{O_1 I_1}} u_{i_2} \right]^T$$

$$u_{i_2} = \begin{cases} \left[ 1 \quad e^{j\frac{2\pi i_2}{O_2 I_2}} \quad \ldots \quad e^{j\frac{2\pi i_2(I_2-1)}{O_2 I_2}} \right] & I_2 > 1 \\ 1 & I_2 = 1 \end{cases}.$$

$I_1$ is a quantity of antenna ports in a same polarization direction that are included in each column (or row) in an antenna array, and $I_2$ is a quantity of antenna ports in a same polarization direction that are included in each row (or column) in the antenna array. In this embodiment, $T=I_1 \times I_2$. $O_1$ and $O_2$ are oversampling factors. $i_1$ and $i_2$ satisfy $0 \leq i_1 \leq (O_1 \times I_1 - 1)$ and $0 \leq i_2 \leq (O_2 \times I_2 - 1)$.

Optionally, the angle vector is a steering vector of a uniform linear array (ULA), for example, $$a(\theta_k) = \begin{bmatrix} 1 \\ e^{j\frac{2\pi}{\lambda}\cos\theta_k d} \\ \vdots \\ e^{j\frac{2\pi}{\lambda}\cos\theta_k (T-1)d} \end{bmatrix}.$$

$\theta_k$ is an angle, and k=1, 2, ..., or K. K indicates the quantity of the angle vectors, $\lambda$ is a wavelength, and d is an antenna spacing.

The steering vector may indicate a phase difference between responses of angles of arrival of a path at different antennas. The steering vector $a(\theta_k)$ and a vector $V_{i_1,i_2}$ in the DFT matrix satisfy $$\cos\theta_k d = \frac{i_1}{O_1 I_1}.$$

Optionally, the angle vector is a steering vector of a uniform plane array (UPA). The steering vector may be, for example, a steering vector that includes information about a horizontal angle and a pitch angle, for example, $$a(\theta_k, \varphi_k) = \begin{bmatrix} e^{j\frac{2\pi}{\lambda}u_k \rho_1} \\ e^{j\frac{2\pi}{\lambda}u_k \rho_2} \\ \vdots \\ e^{j\frac{2\pi}{\lambda}u_k \rho_T} \end{bmatrix}.$$

$\theta_k$ is the horizontal angle; $\varphi_k$ is the pitch angle; $\rho_t$ is three-dimensional coordinates of a $t^{th}$ transmit antenna port, and t=1, 2, ..., or T; and $u_k$ is a unit spherical basis vector corresponding to a $k^{th}$ angle: $u_k=[\sin \varphi_k \cos \varphi_k \sin \varphi_k \sin \varphi_k \cos \varphi_k]$.

For ease of description below, the angle vector is denoted as $a(\theta_k)$.

It is assumed that the transmit antenna is a single-polarized antenna; the quantity of transmit antennas is T; and a quantity of frequency domain units is N, and N≥1 and N is an integer. In this case, for a receive antenna, a channel may be a matrix whose dimensions are N×T. If space-domain precoding is performed on a reference signal based on one angle vector, the angle vector may be loaded to the reference signal. Because dimensions of the angle vector are T×1, for a receive antenna, dimensions of a precoded channel may be N×1. That is, a received precoded reference signal may be represented as a matrix whose dimensions are N×1.

Because the reference signal to which the angle vector is loaded may be transmitted to the terminal device through a downlink channel, a channel measured by the terminal device based on the received precoded reference signal is equivalent to a channel to which the angle vector is loaded. For example, a downlink channel V to which the angle vector $a(\theta_k)$ is loaded may be represented as $Va(\theta_k)$.

Therefore, if space-domain precoding is performed on a reference signal based on one angle vector, for each frequency domain unit on each receive antenna, dimensions of a channel estimated based on a precoded reference signal may be 1×1.

It should be understood that the angle vector is a form that is proposed in this application and that is used to represent an angle. The angle vector is named only for ease of distinguishing from the delay vector, and shall not constitute any limitation on this application. This application does not exclude a possibility that another name is defined in a future protocol to represent a same or similar meaning.

6. Delay vector: The delay vector is a vector that is proposed in this application and that may be used to indicate a change rule of a channel in frequency domain. As described above, the multipath delay causes frequency selective fading. It can be learned from Fourier transform that a time delay of a signal in time domain may be equivalent to a phase gradient in frequency domain.

For example, for a signal g(t), the signal may be transformed in frequency domain through Fourier transform: $F(g(t)) = \int_{-\infty}^{+\infty} g(t) e^{j\omega t} dt$; and for a signal $g(t-t_0)$, the signal may be transformed in frequency domain through Fourier transform: $F(g(t-t_0)) = \int_{-\infty}^{+\infty} g(t-t_0) e^{j\omega t} dt = e^{j\omega t_0} F(g(t))$. ω is a frequency variable, different frequencies correspond to different phase rotations, and t and t−t0 indicate delays.

A signal of the two delays may be represented as $x(t)=g(t)+g(t-t_0)$, and therefore, a function $X(\omega)=g(\omega)(1+e^{j\omega t_0})$ of the frequency variable may be obtained. Assuming that $g(\omega)\equiv 1$, $X(\omega)=1+e^{j\omega t_0}$ may be obtained. Therefore, signals of two different delays cause frequency-domain selective fading.

Because a phase change of a channel in each frequency domain unit is related to a delay, a change rule of the phase of the channel in each frequency domain unit may be represented by using a delay vector. In other words, the delay vector may be used to represent a delay characteristic of the channel.

That the reference signal is precoded based on the delay vector may essentially mean that phase rotation is performed on each frequency domain unit in frequency domain based on an element in the delay vector, to pre-compensate, by using the precoded reference signal, a frequency selective characteristic caused by the multipath delay. Therefore, a process of precoding the reference signal based on the delay vector may be considered as a frequency-domain precoding process.

Precoding a reference signal based on different delay vectors is equivalent to performing phase rotation on each frequency domain unit of a channel based on the different delay vectors. In addition, phase rotation angles of a same frequency domain unit may be different. To distinguish between different delays, the network device may precode a reference signal based on each of L delay vectors.

In the embodiments of this application, for ease of understanding, an example in which an RB is used as a frequency domain unit is used to describe a specific process of performing frequency-domain precoding on a reference signal. When an RB is used as an example of a frequency domain unit, it may be considered that each frequency domain unit includes only one RB used to carry a reference signal. Actually, each frequency domain unit may include one or more RBs used to carry a reference signal. When each frequency domain unit includes a plurality of RBs used to carry a reference signal, the network device may load a delay vector to the plurality of RBs used to carry the reference signal in each frequency domain unit.

Optionally, a length of the delay vector is N, N is a quantity of RBs that are in a frequency domain bandwidth occupied by a CSI measurement resource and that are used to carry a reference signal (for example, the precoded reference signal in the embodiments), and N≥1 and N is an integer.

Optionally, an $l^{th}$ delay vector in the L delay vectors may be represented as $b(\tau_l)$, and $$b(\tau_l) = \begin{bmatrix} e^{-j2\pi f_1 \tau_l} \\ e^{-j2\pi f_2 \tau_l} \\ \vdots \\ e^{-j2\pi f_N \tau_l} \end{bmatrix}.$$

l=1, 2, . . . , or L; L may indicate a quantity of delay vectors; and $f_1, f_2, \ldots,$ and $f_N$ represent carrier frequencies of the first, the second, . . . , and an $N^{th}$ RB, respectively.

Optionally, the delay vector is obtained from a DFT matrix, for example, $$u_k = \begin{bmatrix} 1 & e^{j\frac{2\pi k}{O_f N}} & \ldots & e^{j\frac{2\pi k(N-1)}{O_f N}} \end{bmatrix}^T.$$

Each vector in the DFT matrix may be referred to as a DFT vector.

$O_f$ is an oversampling factor, and $O_f \geq 1$; and k is an index of the DFT vector, and satisfies $0 \leq k \leq O_f \times N - 1$ or $1 - O_f \times N \leq k \leq 0$.

For example, when k<0, $b(\tau_l)$ and the vector $u_k$ in the DFT matrix may satisfy:
$b(\tau_l) = u_k \beta_l$ and $$\Delta f \tau_l = \frac{k}{O_f N},$$

where $\beta_l = e^{-j2\pi f_1 \tau_l}$, $\Delta f = f_n - f_{n+1}$, and $1 \leq n \leq N-1$.

For ease of description, the delay vector is denoted as $b(\tau_l)$.

The frequency domain bandwidth occupied by the CSI measurement resource may be understood as a bandwidth used to transmit a reference signal, and the reference signal may be a reference signal used for channel measurement, for example, a CSI-RS. Signaling used to indicate the frequency domain bandwidth occupied by the CSI measurement resource may be, for example, a CSI-bandwidth occupation range (CSI-Frequency Occupation). The frequency domain bandwidth occupied by the CSI measurement resource may also be referred to as a pilot transmission bandwidth or a measurement bandwidth. For ease of description below, the frequency domain bandwidth occupied by the CSI measurement resource is referred to as the measurement bandwidth for short.

It should be understood that the length N of the delay vector is merely a possible design, and shall not constitute any limitation on this application. Lengths of different delay vectors are defined below with reference to different embodiments. Detailed descriptions are omitted herein.

It is assumed that the transmit antenna is a single-polarized antenna, the quantity of transmit antennas is T, and the quantity of RBs is N. In this case, for a receive antenna, a downlink channel may be represented as a matrix whose dimensions are N×T. If frequency-domain precoding is performed on a reference signal based on a delay vector, N elements in the delay vector may be respectively loaded to reference signals carried on the N RBs.

Because the reference signal to which the delay vector is loaded may be transmitted to the terminal device through the downlink channel, a channel measured by the terminal device based on the received precoded reference signal is equivalent to a channel to which the delay vector is loaded. For example, a channel $V^{(n)}$ of an $n^{th}$ RB to which an $n^{th}$ element in the delay vector is loaded may be represented as $V^{(n)}e^{j2\pi f_n \tau_l}$. It should be noted that frequency-domain precoding may be performed on the reference signal based on the delay vector before resource mapping, or after resource mapping. This is not limited in this application.

It should be understood that the delay vector is a form that is proposed in this application and that is used to represent a delay. The delay vector is named only for ease of distinguishing from the angle vector, and shall not constitute any limitation on this application. This application does not exclude a possibility that another name is defined in a future protocol to represent a same or similar meaning.

7. Frequency domain unit: The frequency domain unit is a unit of a frequency domain resource, and may represent different frequency domain resource granularities. For example, the frequency domain unit may include but is not limited to a subband, a resource block (RB), a resource block group (RBG), and a precoding resource block group (PRG).

In the embodiments of this application, the network device may determine, based on a feedback of the terminal device, a precoding matrix corresponding to each frequency domain unit.

8: Angle-delay pair: The angle-delay pair may be a combination of one angle vector and one delay vector. Each angle-delay pair may include one angle vector and one delay vector. Angle vectors and/or delay vectors included in any two angle-delay pairs are different. In other words, each angle-delay pair may be uniquely determined by using one angle vector and one delay vector. It should be understood that the angle-delay pair may be understood as a representation form of a spatial-frequency basic unit determined by using one angle vector and one delay vector, but the angle-delay pair may not necessarily be a unique representation form. For example, the angle-delay pair may alternatively be represented as a spatial-frequency component matrix or a spatial-frequency component vector described below.

9. Spatial-frequency component matrix: One spatial-frequency component matrix may be determined by using one angle-delay pair. In other words, a spatial-frequency component matrix may be uniquely determined by using one angle vector and one delay vector. A spatial-frequency component matrix and an angle-delay pair may be mutually converted.

One spatial-frequency component matrix may be determined, for example, by a product of one angle vector and a conjugate transpose of one delay vector, for example, $a(\theta_k) \times b(\tau_l)^H$, and have dimensions of T×N.

It should be understood that the spatial-frequency component matrix may be understood as another representation form of a spatial-frequency basic unit determined by using one angle vector and one delay vector. For example, the spatial-frequency basic unit may alternatively be represented as a spatial-frequency component vector. For example, the spatial-frequency component vector is determined by using a Kronecker product of one angle vector and one delay vector.

It should be further understood that a specific form of the spatial-frequency basic unit is not limited in this application. Various possible forms determined by a person skilled in the art based on a same concept by using one angle vector and one delay vector shall all fall within the protection scope of this application. In addition, if definitions of the angle vector and the delay vector are different from those listed above, an operation relationship among the spatial-frequency component matrix, the angle vector, and the delay vector, and an operation relationship among the spatial-frequency component vector, the angle vector, and the delay vector may also be different. The operation relationship among the spatial-frequency component matrix, the angle vector, and the delay vector, and the operation relationship among the spatial-frequency component vector, the angle vector, and the delay vector are not limited in this application.

10. Spatial-frequency matrix: In the embodiments of this application, the spatial-frequency matrix is an intermediate quantity used to determine a precoding matrix. For each frequency domain unit, the precoding matrix may usually be a matrix whose dimensions are T×Z. Z represents a quantity of transport layers, and Z is an integer greater than or equal to 1.

In the embodiments of this application, the spatial-frequency matrix may be determined based on each receive antenna, or may be determined based on each transport layer.

If the spatial-frequency matrix is determined based on a receive antenna, the spatial-frequency matrix may be referred to as a spatial-frequency matrix corresponding to the receive antenna. The spatial-frequency matrix corresponding to the receive antenna may be used to construct a downlink channel matrix of each frequency domain unit, to determine a precoding matrix corresponding to each frequency domain unit. For example, a channel matrix corresponding to a frequency domain unit may be a conjugate transpose of a matrix constructed by using column vectors that correspond to a same frequency domain unit and that are in spatial-frequency matrices corresponding to receive antennas. For example, an $n^{th}$ column vector in the spatial-frequency matrix corresponding to each receive antenna is extracted, and a matrix whose dimensions are TX R may be obtained by arranging the column vectors from left to right in a sequence of the receive antennas. R indicates a quantity of the receive antennas, and R is an integer greater than or equal to 1. After a conjugate transpose of the matrix is obtained, a channel matrix $V^{(n)}$ of an $n^{th}$ frequency domain unit may be obtained. A relationship between the channel matrix and the spatial-frequency matrix is described in detail below, and detailed descriptions of the relationship between the channel matrix and the spatial-frequency matrix are omitted herein.

If the spatial-frequency matrix is determined based on a transport layer, the spatial-frequency matrix may be referred to as a spatial-frequency matrix corresponding to the transport layer. The spatial-frequency matrix corresponding to the transport layer may be directly used to determine a precoding matrix corresponding to each frequency domain unit. For example, a precoding matrix corresponding to a frequency domain unit may be constructed by using column vectors that correspond to a same frequency domain unit and that are in spatial-frequency matrices corresponding to transport layers. For example, an $n^{th}$ column vector in the spatial-frequency matrix corresponding to each transport layer is extracted, and a matrix whose dimensions are T×Z may be obtained by arranging the column vectors from left to right in a sequence of the transport layers. Z indicates a quantity of the transport layers, and Z is an integer greater than or equal to 1. The matrix may be used as a precoding matrix $W^{(n)}$ of an $n^{th}$ frequency domain unit.

A specific process of determining the precoding matrix based on the spatial-frequency matrix is described in detail in the following embodiments, and detailed descriptions of the specific process are omitted herein.

It should be noted that a precoding matrix determined according to a channel measurement method provided in the embodiments of this application may be a precoding matrix directly used for downlink data transmission. Alternatively, some beamforming methods, for example, including zero forcing (ZF), a minimum mean-squared error (MMSE), and a maximum signal-to-leakage-and-noise ratio (SLNR), may be used, to obtain a precoding matrix finally used for downlink data transmission. This is not limited in this application. All precoding matrices below may be precoding matrices determined based on the channel measurement method provided in this application.

In the embodiments of this application, the spatial-frequency matrix may be determined by using one or more angle-delay pairs. For example, the spatial-frequency matrix may be a weighted sum of one or more spatial-frequency component matrices. The spatial-frequency matrix may alternatively be converted into a form of a spatial-frequency vector, and the spatial-frequency vector may alternatively be a weighted sum of one or more spatial-frequency component vectors.

A type II codebook feedback mode is defined in the NR protocol TS38.214. An example of feedback in the type II codebook feedback mode when a rank is 1 is shown below:

tions are the same, and the beam vectors $v_0$ to $v_3$ are all used, $a_0$ to $a_7$ are wideband amplitude coefficients included in $W_1$, and may be indicated by using quantized values of the wideband amplitude coefficients. $c_0$ to $c_7$ are subband coefficients included in $W_2$, and each subband coefficient may include a subband amplitude coefficient and a subband phase coefficient. For example, $c_0$ to $c_7$ may include subband amplitude coefficients $\alpha_0$ to $\alpha_7$ and subband phase coefficients $\varphi_0$ to $\varphi_7$, respectively, and may be indicated by using quantized values of the subband amplitude coefficients $\alpha_0$ to $\alpha_7$ and quantized values of the subband phase coefficients $\varphi_0$ to $\varphi_7$, respectively.

Because the terminal device feeds back the amplitude coefficient and the phase coefficient based on each subband, relatively high feedback overheads are caused. Therefore, a feedback manner that is based on continuity in frequency domain and frequency selective fading caused by a multipath delay and in which a delay vector is used to describe a frequency domain change rule is proposed. The delay vector may also be understood as a vector used to indicate a delay characteristic of a channel.

The spatial-frequency matrix described above is an intermediate quantity that is proposed based on the continuity in frequency domain and that is used to construct a precoding matrix. A spatial-frequency matrix H may satisfy. $H = SCF^H$. S represents a matrix constructed by using one or more (for example, K) angle vectors, for example, $S = [a(\theta_1) \, a(\theta_2) \, \cdots \, a(\theta_K)]$; F represents a matrix constructed by using one or more (for example, L) delay vectors, for example, $F = [b(\theta_1) \, b(\tau_2) \, \cdots \, b(\tau_L)]$; and C represents a coefficient matrix constructed by using a weighting coefficient corresponding to each of the K angle vectors and each of the L delay vectors.

In the FDD mode, because of reciprocity between delays and angles on uplink and downlink channels, a spatial-frequency matrix $H_{UL}$ obtained through uplink channel measurement may be expressed as $H_{UL} = SC_{UL}F^H$, and a spatial-frequency matrix $H_{DL}$ obtained through downlink channel measurement may be expressed as $H_{DL} = SC_{DL}F^H$. Therefore, in the embodiments of this application, a coefficient matrix $C_{DL}$ corresponding to the downlink channel is determined and fed back through downlink channel measurement, to determine a precoding matrix that adapts to the downlink channel.

The foregoing formula $H_{DL} = SC_{DL}F^H$ is further transformed to obtain $S^H H_{DL} = C_{DL}F^H$, and $(H_{DL}^H S)^H = C_{DL}F^H$ is further obtained and is further transformed to obtain a coefficient matrix $C_{DL} = (H_{DL}^H S)^H F$. $H_{DL}^H$ is a spatial-fre- $$W = W_1 W_2 = \begin{bmatrix} a_0 v_0 & a_1 v_1 & a_2 v_2 & a_3 v_3 & & & & \\ & & & & a_4 v_0 & a_5 v_1 & a_6 v_2 & a_7 v_3 \end{bmatrix} \begin{bmatrix} c_0 & c_1 & c_2 & c_3 & c_4 & c_5 & c_6 & c_7 \end{bmatrix}^T = \begin{bmatrix} a_0 c_0 v_0 + a_1 c_1 v_1 + a_2 c_2 v_2 + a_3 c_3 v_3 \\ a_4 c_4 v_0 + a_5 c_5 v_1 + a_6 c_6 v_2 + a_7 c_7 v_3 \end{bmatrix}.$$

W represents a to-be-fed-back precoding matrix in two polarization directions in one subband at one transport layer. $W_1$ may be fed back by using a wideband, and $W_2$ may be fed back by using a subband. $v_0$ to $v_3$ are beam vectors included in $W_1$, and the plurality of beam vectors may be indicated by using, for example, an index of a combination of the plurality of beam vectors. In the precoding matrix shown above, beam vectors in the two polarization direcquency matrix determined by using an actual channel, and $H_{DL}^H S$ is an actual channel on which space-domain precoding is performed. Each element in the coefficient matrix $C_{DL}$ may be determined by multiplying one row in $(H_{DL}^H S)^H$ by one column in F. In other words, each element in the coefficient matrix $C_{DL}$ may be obtained by multiplying one row in a conjugate transpose $(H_{DL}^H S)^H$ of the actual channel $H_{DL}{}^H S$ by one column in F, or multiplying a conjugate transpose of one column in the actual channel $H_{DL}{}^H S$ by one column in F.

Therefore, in the embodiments of this application, the spatial-frequency matrix $H_{DL}$ determined based on the weighting coefficient of each angle-delay pair fed back by the terminal device may be obtained by using the conjugate transpose of the actual channel. In other words, the spatial-frequency matrix in the embodiments of this application may alternatively be obtained by a conjugate transpose (namely, $V^H$) of the actual channel V.

From another perspective, in the embodiments of this application, it is defined that the spatial-frequency component matrix is determined by $a(\theta_k) \times b(\tau_1)^H$. Therefore, it may be determined that dimensions of the spatial-frequency matrix $H_{DL}$ are a quantity of transmit antennas×a quantity of frequency domain units, for example, dimensions of a spatial-frequency matrix corresponding to the downlink channel are T×N. In the following embodiments, unless otherwise specified, the spatial-frequency matrix is the matrix $H_{DL}$ whose dimensions are T×N described above.

However, this is not necessarily a spatial-frequency matrix determined by using an actual channel. Generally, dimensions of a channel matrix are defined as a quantity of receive antennas×a quantity of transmit antennas. For example, dimensions of the downlink channel are R×T. Dimensions of the spatial-frequency matrix determined by using the channel matrix are N×T, which are exactly opposite to the dimensions T×N of the foregoing spatial-frequency matrix $H_{DL}$. Therefore, in the embodiments of this application, the actual channel may be a conjugate transpose of a channel matrix determined by using the foregoing spatial-frequency matrix $H_{DL}$. A downlink channel matrix determined by using the spatial-frequency matrix $H_{DL}$ may be a conjugate transpose of the actual channel.

Further, a precoding matrix may be determined by using the spatial-frequency matrix $H_{DL}$. The precoding matrix of the $n^{th}$ frequency domain unit may be constructed by the $n^{th}$ column vector in the spatial-frequency matrix corresponding to each transport layer.

For example, SVD (singular value decomposition) is performed on the channel matrix. A conjugate transpose of a precoding matrix may be obtained by performing SVD on a channel matrix V. However, if SVD is performed on a conjugate transpose of the channel matrix, that is, SVD is performed on $V^H$, the precoding matrix may be exactly obtained. Therefore, in the embodiments of this application, the spatial-frequency matrix $H_{DL}$ determined by using the conjugate transpose of the actual channel may be used to directly determine the precoding matrix corresponding to each frequency domain unit.

A detailed process of determining the channel matrix and the precoding matrix by using the spatial-frequency matrix $H_{DL}$ is described in detail in the following embodiments, and detailed descriptions of the specific process are omitted herein.

It should be understood that a relationship between the actual channel and the spatial-frequency matrix $H_{DL}$ is not fixed. Different definitions of the spatial-frequency matrix and the spatial-frequency component matrix may change the relationship between the actual channel and the spatial-frequency matrix $H_{DL}$. For example, the spatial-frequency matrix $H_{DL}$ may be obtained based on the conjugate transpose of the actual channel, or may be obtained based on a transpose of the actual channel.

When the spatial-frequency matrix and the spatial-frequency component matrix are defined differently, operations performed by the network device when the delay and the angle are loaded are also different, and operations performed by the terminal device when the terminal device performs channel measurement and performs feedback correspondingly change. However, these are only implementation behaviors of the terminal device and the network device, and shall not constitute any limitation on this application. In the embodiments of this application, merely for ease of understanding, a case in which the spatial-frequency matrix is obtained based on the conjugate transpose of the actual channel is shown. The definition of the channel matrix, the dimensions and the definition of the spatial-frequency matrix, and a transformation relationship between the channel matrix and the spatial-frequency matrix are not limited in this application. Similarly, a transformation relationship between the spatial-frequency matrix and the precoding matrix is not limited in this application either.

11. Antenna-delay pair: The antenna-delay pair may be a combination of one transmit antenna port and one delay vector. Each antenna-delay pair may include one transmit antenna port and one delay vector. Transmit antenna ports and/or delay vectors included in any two antenna-delay pairs are different. In other words, each antenna-delay pair may be uniquely determined by using one transmit antenna port and one delay vector. It should be understood that the antenna-delay pair may be understood as a representation form of a spatial-frequency basic unit determined by using one transmit antenna port and one delay vector, but is not necessarily a unique representation form. A representation form of a combination of a transmit antenna port and a delay vector is not limited in this application.

12: Reference signal resource: The reference signal resource may be used to configure a transmission attribute of the reference signal, for example, a time-frequency resource location, a port mapping relationship, a power factor, and a scrambling code. For details, refer to the conventional technology. A transmit end device may send a reference signal based on a reference signal resource, and a receive end device may receive a reference signal based on a reference signal resource. One reference signal resource may include one or more RBs.

In the embodiments of this application, the reference signal resource may be, for example, a CSI-RS resource.

13. Pilot density: The pilot density is a ratio of a quantity of resource elements (RE) occupied by a reference signal of each port, such as a precoded reference signal in this application, to a total quantity of RBs in an occupied bandwidth. For example, if a pilot density of a reference signal of a port is 1, it may indicate that in a bandwidth occupied by the reference signal of the port, each RB has one RE used to carry the reference signal of the port. For another example, if a pilot density of a reference signal of a port is 0.5, it may indicate that in a bandwidth occupied by the reference signal of the port, one RB in every two RBs includes an RE for carrying the reference signal of the port, in other words, there is one RB between adjacent RBs used to carry the reference signal of the port.

In addition, for ease of understanding the embodiments of this application, the following descriptions are provided.

First, for ease of understanding, the following briefly describes main parameters in this application.

P: P is a quantity of angle-delay pairs, and P is an integer greater than or equal to 1.

N: N is a quantity of frequency domain units, and N is an integer greater than or equal to 1.

T: T is a quantity of transmit antenna ports in a polarization direction, and T is an integer greater than or equal to 1.

K: K is a quantity of angle vectors, and K is an integer greater than or equal to 1.

L: L is a quantity of delay vectors, and L is an integer greater than or equal to 1.

R: R is a quantity of receive antennas, and R is an integer greater than or equal to 1.

Z: Z is a quantity of transport layers, and Z is an integer greater than or equal to 1.

J: J is a quantity of polarization directions of a transmit antenna, and J is an integer greater than or equal to 1.

M: M is a quantity of frequency domain groups, and M is an integer greater than 1.

Second, in this application, for ease of description, when numbering is involved, numbers may be consecutive and start from 1. For example, the L angle vectors may include the first angle vector to an $L^{th}$ angle vector, and the K delay vectors may include the first delay vector to a $K^{th}$ delay vector. Certainly, a specific implementation is not limited thereto. For example, numbers may alternatively be consecutive and start from 0. For example, the L angle vectors may include the zeroth angle vector to an $(L-1)^{th}$ angle vector, and the K delay vectors may include the zeroth delay vector to a $(K-1)^{th}$ delay vector.

It should be understood that the foregoing descriptions are all provided for ease of describing the technical solutions provided in the embodiments of this application, but are not intended to limit the scope of this application.

Third, in this application, transformation of a matrix and a vector is involved in many places. For ease of understanding, unified descriptions are provided herein. An upper corner mark T indicates a transpose. For example, $A^T$ indicates a transpose of a matrix (or vector) A. An upper corner mark * represents a conjugate. For example, A* represents a conjugate of the matrix (or vector) A. An upper corner mark H represents a conjugate transpose. For example, $A^H$ represents a conjugate transpose of the matrix (or vector) A. For brevity, descriptions of a same or similar case are omitted below.

Fourth, in the embodiments shown below, an example in which both the angle vector and the delay vector are column vectors is used to describe the embodiments provided in this application. However, this shall not constitute any limitation on this application. Based on a same concept, a person skilled in the art may further figure out more possible representations.

Fifth, in this application, "used to indicate" may include "used to directly indicate" and "used to indirectly indicate". When a piece of indication information is described as being used to indicate A, the indication information may directly indicate A or indirectly indicate A, but it does not necessarily indicate that the indication information carries A.

Information indicated by the indication information is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information. For example, a person skilled in the art should understand that a precoding matrix includes precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to the conventional technology. Details are not described in this specification. It can be learned from the foregoing descriptions that, for example, when a plurality of pieces of information of a same type need to be indicated, manners of indicating different information may be different. In a specific implementation process, a required indication manner may be selected according to a specific requirement. The selected indication manner is not limited in the embodiments of this application. In this way, the indication manner in the embodiments of this application should be understood as covering various methods that can enable a to-be-indicated party to learn of the to-be-indicated information.

In addition, the to-be-indicated information may have another equivalent form. For example, a row vector may be represented as a column vector; a matrix may be represented by using a transposed matrix of the matrix; the matrix may alternatively be represented in a form of a vector or an array; and the vector or the array may be formed by connecting row vectors or column vectors in the matrix. The technical solutions provided in the embodiments of this application should be understood as covering various forms. For example, some or all features in the embodiments of this application should be understood as covering various representations of the features.

The to-be-indicated information may be sent as a whole, or may be divided into a plurality of pieces of sub-information for separate sending. In addition, sending periodicities and/or sending occasions of the sub-information may be the same or may be different. A specific sending method is not limited in this application. The sending periodicities and/or the sending occasions of the sub-information may be predefined, for example, predefined according to a protocol, or may be configured by a transmit end device by sending configuration information to a receive end device. The configuration information may include, for example, but not limited to, one or a combination of at least two of radio resource control signaling, media access control (MAC) layer signaling, and physical layer signaling. The radio resource control signaling includes, for example, radio resource control (RRC) signaling. The MAC layer signaling includes, for example, a MAC control element (CE). The physical layer signaling includes, for example, downlink control information (DCI).

Sixth, definitions listed in this application for many features (for example, a Hadamard product, a Kronecker product, channel state information (CSI), an RB, an angle, and a delay) are merely used to explain functions of the features by using an example. For detailed content thereof, refer to the conventional technology.

Seventh, the terms "first". "second", and various numbers in the following embodiments are merely used for differentiation for ease of description, and are not intended to limit the scope of the embodiments of this application. For example, the terms are used to distinguish between different indication information.

Eighth, in the embodiments shown below, "being pre-obtained" may include "being indicated by a network device by using signaling" or "being predefined", for example, "being defined in a protocol". The "predefinition" may be implemented in a manner in which corresponding code, a table, or other related indication information may be pre-stored in a device (for example, including a terminal device and a network device). A specific implementation of the "predefinition" is not limited in this application.

Ninth, "storage" in the embodiments of this application may be storage in one or more memories. The one or more memories may be separately disposed, or may be integrated into an encoder or a decoder, a processor, or a communications apparatus. Alternatively, some of the one or more memories may be separately disposed, and some of the one or more memories are integrated into a decoder, a processor, or a communications apparatus. A type of the memory may be a storage medium in any form, and this is not limited in this application.

Tenth, a "protocol" in the embodiments of this application may be a standard protocol in the communications field, for example, may include an LTE protocol, an NR protocol, and a related protocol applied to a future communications system. This is not limited in this application.

Eleventh, "at least one" indicates one or more, and "a plurality of" indicates two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. The term "at least one of the following items (pieces)" or a similar expression thereof means any combination of these items, including any combination of singular items (pieces) or plural items (pieces). For example, at least one of a, b, and c may represent: a, b, c, a and b, a and c, b and c, or a, b, and c, where a, b, and c each may be singular or plural.

The following describes in detail the channel measurement method provided in the embodiments of this application with reference to the accompanying drawings.

It should be understood that the method provided in the embodiments of this application may be applied to a system in which communication is performed by using a multi-antenna technology, for example, the communications system 100 shown in FIG. 1. The communications system may include at least one network device and at least one terminal device. The network device and the terminal device may communicate with each other by using the multi-antenna technology.

It should be further understood that, a specific structure of an execution body of the method provided in the embodiments of this application is not specifically limited in the embodiments shown below, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

Without loss of generality, interaction between the network device and the terminal device is used as an example below to describe in detail the channel measurement method provided in the embodiments of this application.

In an implementation, the network device may precode a downlink reference signal based on a predetermined angle and delay, so that the terminal device estimates and feeds back, based on a received precoded reference signal, a plurality of weighting coefficients corresponding to a plurality of angle-delay pairs. The network device may determine, based on the plurality of angle-delay pairs and the plurality of weighting coefficients fed back by the terminal device, a precoding matrix that adapts to a downlink channel.

In another implementation, the network device may precode a downlink reference signal based on a predetermined delay, so that the terminal device estimates and feeds back, based on a received precoded reference signal, a plurality of weighting coefficients corresponding to a plurality of antenna-delay pairs. The network device may determine, based on the plurality of antenna-delay pairs and the plurality of weighting coefficients fed back by the terminal device, a precoding matrix that adapts to a downlink channel.

For ease of understanding, in the embodiments shown below, a polarization direction is first used as an example to describe in detail a channel measurement method 200 provided in the embodiments of this application. It should be understood that the polarization direction may be any one of one or more polarization directions of a transmit antenna that are configured by the network device. In other words, for a precoded reference signal transmitted by a transmit antenna in any polarization direction, the terminal device may perform channel measurement based on the method 200 provided in the embodiments of this application, or the network device may determine a precoding matrix based on the method 200 provided in the embodiments of this application. It should be further understood that a quantity of polarization directions of a transmit antenna is not limited in this application. For example, there may be one polarization direction, namely, a single polarization direction, or there may be a plurality of polarization directions, for example, dual polarization directions.

Figure 2:
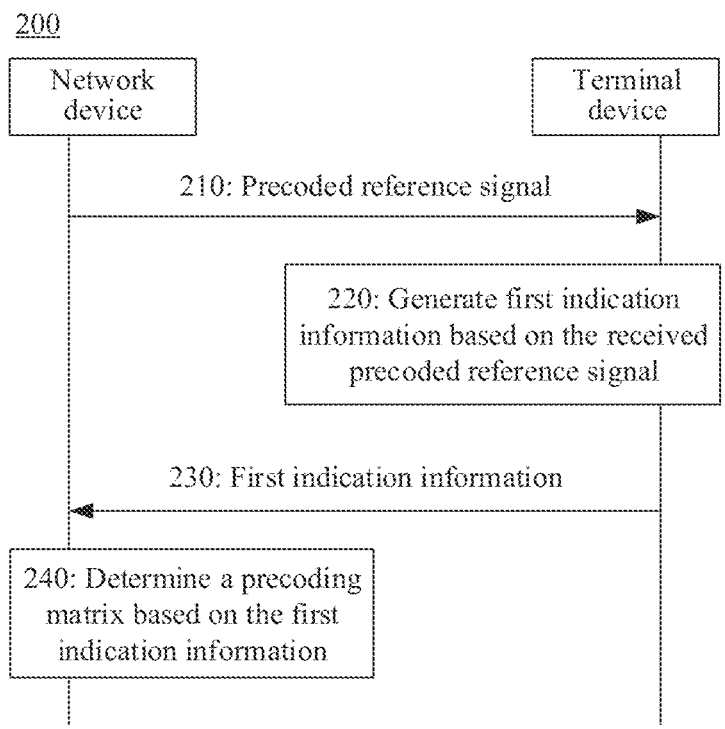
FIG. 2 is a schematic flowchart of a channel measurement method according to an embodiment of this application.

FIG. 2 is a schematic flowchart of the channel measurement method 200 from a perspective of device interaction according to an embodiment of this application. As shown in the figure, the method 200 may include step 210 to step 240. The following describes the steps in the method 200 in detail.

Step 210: The terminal device receives a precoded reference signal, where the precoded reference signal is obtained by precoding a reference signal based on K angle vectors and L delay vectors. Correspondingly, the network device sends the precoded reference signal. $K \geq 1$, $L \geq 1$, and both K and L are integers.

In this embodiment, the network device may precode the reference signal based on the K angle vectors and the L delay vectors. A plurality of combinations of angle vectors and delay vectors may be obtained based on the K angle vectors and the L delay vectors. Angle vectors and/or delay vectors in any two combinations are different. An angle vector and a delay vector in each combination may be used to precode a reference signal, to obtain a precoded reference signal corresponding to one port. Therefore, the precoded reference signal obtained by the network device through precoding based on the K angle vectors and the L delay vectors may correspond to one or more ports, and the precoded reference signal of each port may be obtained by precoding the reference signal based on one of the K angle vectors and one of the L delay vectors. In other words, the precoded reference signal of each port may be obtained by precoding the reference signal based on one combination of an angle vector and a delay vector.

In a possible implementation, the network device may traverse the K angle vectors and the L delay vectors, to obtain K×L combinations of angle vectors and delay vectors, or K×L angle-delay pairs. That is, the network device may precode the reference signal based on each of the K angle vectors and each of the L delay vectors. When precoding the reference signal based on a $k^{th}$ (1≤k≤K, and k is an integer) angle vector in the K angle vectors, the network device may traverse each of the L delay vectors to precode the reference signal. Alternatively, when precoding the reference signal based on an $l^{th}$ (1≤l≤L, and l is an integer) delay vector in the L delay vectors, the network device may traverse each of the K angle vectors to precode the reference signal. In other words, the K angle vectors may be considered as being shared by all the delay vectors, and the L delay vectors may also be considered as being shared by all the angle vectors. That is, the K angle vectors and the L delay vectors are shared by each other.

In another possible implementation, delay vectors corresponding to at least two angle vectors are different. When precoding the reference signal based on a $k^{th}$ angle vector in the K angle vectors, the network device may traverse each of $L_k$ (1≤$L_k$≤L, and $L_k$ is an integer) delay vectors corresponding to the $k^{th}$ angle vector, to precode the reference signal. L in the L delay vectors may satisfy $$L \leq \sum_{k=1}^{K} L_k.$$

Herein, that the delay vectors corresponding to the at least two angle vectors are different may mean that delay vectors corresponding to at least two of the K angle vectors are different, and delay vectors respectively corresponding to other angle vectors may be the same or may be different. This is not limited in this application. In other words, delay vectors corresponding to angle vectors are partially or completely different.

That delay vectors corresponding to two angle vectors are different may mean that the delay vectors corresponding to the two angle vectors are completely different, that is, the delay vectors corresponding to the two angle vectors are not repeated, or have no intersection. For example, a delay vector corresponding to an angle vector $a(\theta_1)$ includes $b(\tau_2)$, and delay vectors corresponding to an angle vector $a(\theta_2)$ include $b(\tau_1)$ and $b(\tau_3)$. That delay vectors corresponding to two angle vectors are different may alternatively mean that the delay vectors corresponding to the two angle vectors are partially different, that is, the delay vectors corresponding to the two angle vectors are partially repeated but are not completely the same, or the delay vectors corresponding to the two angle vectors have an intersection but are not completely the same. For example, delay vectors corresponding to $a(\theta_1)$ include $b(\tau_2)$ and $b(\tau_3)$, and delay vectors corresponding to an angle vector $a(\theta_2)$ include $b(\tau_1)$ and $b(\tau_3)$.

When delay vectors corresponding to any two of the K angle vectors are not repeated, $$L = \sum_{k=1}^{K} L_k.$$

When delay vectors corresponding to two or more of the K angle vectors are partially repeated, $$L < \sum_{k=1}^{K} L_k.$$

Therefore, the network device may obtain $$\sum_{k=1}^{K} L_k$$

combinations of angle vectors and delay vectors based on the K angle vectors and the L delay vectors.

In still another possible implementation, angle vectors corresponding to at least two delay vectors are different. When precoding the reference signal based on an $l^{th}$ delay vector in the L delay vectors, the network device may traverse each of $K_l$ (1≤$K_l$≤K, and $K_l$ is an integer) angle vectors corresponding to the $l^{th}$ delay vector, to precode the reference signal. K in the K angle vectors may satisfy:

$$K \leq \sum_{l=1}^{L} K_l.$$

Herein, that the angle vector corresponding to the at least two delay vectors are different may mean that angle vectors corresponding to at least two of the L delay vectors are different, and angle vectors respectively corresponding to other delay vectors may be the same or may be different. This is not limited in this application. In other words, angle vectors corresponding to delay vectors are partially or completely different.

That angle vectors corresponding to two delay vectors are different may mean that the angle vectors corresponding to the two delay vectors are completely different, that is, the angle vectors corresponding to the two delay vectors are not repeated, or have no intersection. For example, an angle vector corresponding to a delay vector $b(\tau_1)$ includes $a(\theta_2)$, and an angle vector corresponding to a delay vector $b(\tau_2)$ includes $a(\theta_1)$. That angle vectors corresponding to two delay vectors are different may alternatively mean that the angle vectors corresponding to the two delay vectors are partially different, that is, the angle vectors corresponding to the two delay vectors are partially repeated but are not completely the same, or the angle vectors corresponding to the two delay vectors have an intersection but are not completely the same. For example, an angle vector corresponding to a delay vector $b(\tau_1)$ includes $a(\theta_2)$, and angle vectors corresponding to a delay vector $b(\tau_2)$ include $a(\theta_1)$ and $a(\theta_2)$. When angle vectors corresponding to any two of the L delay vectors are not repeated, $$K = \sum_{l=1}^{L} K_l.$$

When angle vectors corresponding to two or more of the L delay vectors are partially repeated, $$K < \sum_{l=1}^{L} K_l.$$

Therefore, the network device may obtain $$\sum_{l=1}^{L} K_l$$

combinations of angle vectors and delay vectors based on the K angle vectors and the L delay vectors.

It should be understood that, the foregoing lists a correspondence between an angle vector and a delay vector merely for ease of understanding. However, this shall not constitute any limitation on this application. The correspondence between an angle vector and a delay vector is not limited in this application.

For ease of description below, a quantity of combinations of angle vectors and delay vectors that are determined by using the K angle vectors and the L delay vectors is denoted as P. It may be understood that in different implementations, values of P are different. For example, P=K $$P = K \times L; P = \sum_{k=1}^{K} L_k; \text{ or } P = \sum_{l=1}^{L} K_l.$$

Because of reciprocity between angles and delays on uplink and downlink channels, optionally, the K angle vectors and the L delay vectors may all be determined based on uplink channel measurement.

Specifically, the network device may determine K (K≥1, and K is an integer) angles and L (L≥1, and L is an integer) delays based on an uplink channel matrix obtained through pre-estimation. The K angles may be represented by using the K angle vectors. The L delays may be represented by using the L delay vectors. The uplink channel matrix may be a weighted sum of K×L spatial-frequency matrices determined by using the K angle vectors and the L delay vectors. For ease of description below, it is assumed that P=K×L, and P is a positive integer.

For example, the K angle vectors may be K stronger angle vectors determined from a predefined angle vector set. The K angle vectors may be jointly determined for the L delay vectors, or may be separately determined for each of the L delay vectors. This is not limited in this application. Optionally, each angle vector in the angle vector set is obtained from a DFT matrix. For example, the K angle vectors may be determined by performing DFT on the uplink channel matrix. Optionally, each angle vector in the angle vector set is a steering vector.

For example, the L delay vectors may be L stronger delay vectors determined from a predefined delay vector set. The L delay vectors may be jointly determined for the K angle vectors, or may be separately determined for each of the K angle vectors. This is not limited in this application. Optionally, each delay vector in the delay vector set is obtained from a DFT matrix. For example, the L delay vectors may be determined by performing DFT on the uplink channel matrix.

For example, the network device may determine, by using a joint angle and delay estimation (JADE) algorithm in the conventional technology, the K angle vectors and one or more stronger delay vectors corresponding to each angle vector. Specifically, the estimation algorithm may be, for example, a multiple signal classification algorithm (MUSIC), a Bartlett algorithm, or an estimation of signal parameters via rotation invariant technique algorithm (ESPRIT). Alternatively, the network device may perform DFT on a spatial-frequency matrix that is determined based on uplink channel measurement, to determine the K angle vectors and the L delay vectors. A specific method for determining the K angle vectors and the L delay vectors by the network device is not limited in this application.

An example in which DFT is performed on the spatial-frequency matrix is used. It is assumed that both the angle vector and the delay vector are obtained from the DFT matrices. For example, the predefined angle vector set may be a vector set including a plurality of vectors in a space-domain DFT matrix. For ease of distinguishing, the vector set is referred to as an angle vector set $U_s$, and $U_s=[u_{s,1}\ u_{s,2} \cdots u_{s,T}]$. For example, the predefined delay vector set may be a vector set including a plurality of vectors in a frequency-domain DFT matrix. For ease of differentiation, the vector set is referred to as a delay vector set $U_f$, and $U_f=[u_{f,1}\ u_{f,2} \cdots u_{f,N}]$.

The network device may determine an uplink channel through channel estimation, and further determine a spatial-frequency matrix $H_{UL}$ of the uplink channel. The network device may perform space-domain DFT transform and frequency-domain DFT transform on the spatial-frequency matrix $H_{UL}$ that is obtained through uplink channel estimation, to obtain a coefficient matrix $C_{UL}$ as follows: $C_{UL}=U_s^H H_{UL} U_f$. For ease of understanding, dimensions of the spatial-frequency matrix $H_{UL}$ of the uplink channel are kept consistent with dimensions of a spatial-frequency matrix $H_{DL}$ of a downlink channel herein. The foregoing has described the dimensions of the spatial-frequency matrix of the downlink channel and a relationship between the dimensions and the downlink channel. Dimensions of the spatial-frequency matrix $H_{UL}$ determined by using the uplink channel may be N×T.

It should be understood that, the dimensions of the spatial-frequency matrix $H_{UL}$ of the uplink channel and the calculation formula used to determine the coefficient matrix $C_{UL}$ that are shown herein are merely examples, and shall not constitute any limitation on this application. If different dimensions are defined for the spatial-frequency matrix $H_{UL}$, calculation formulas used to determine the coefficient matrix $C_{UL}$ are also different.

The network device may determine K stronger rows from the coefficient matrix $C_{UL}$. The K stronger rows may be used to determine the K angle vectors. For example, the network device may determine, based on a quadratic sum of moduli of elements in each row in the coefficient matrix $C_{UL}$, K rows with larger quadratic sums of the moduli. The K rows with the larger quadratic sums of the moduli may be used to determine the K angle vectors. Positions of the K rows in the coefficient matrix $C_{UL}$ may be used to determine positions of the K angle vectors in the angle vector set. For example, row sequence numbers of the K rows in the coefficient matrix $C_{UL}$ may be column sequence numbers of the K angle vectors in the angle vector set. Therefore, the K angle vectors may be determined. The K angle vectors are angle vectors selected from the angle vector set and used to precode a downlink reference signal. The network device may determine, based on a quadratic sum of moduli of elements in each column in the coefficient matrix $C_{UL}$, L columns with larger quadratic sums of the moduli. The L columns with the larger quadratic sums of the moduli may be used to determine the L delay vectors. Positions of the L columns in the coefficient matrix $C_{UL}$ may be used to determine positions of the L delay vectors in the delay vector set. For example, column sequence numbers of the L columns in the coefficient matrix $C_{UL}$ may be column sequence numbers of the L delay vectors in the delay vector set. Therefore, the L delay vectors may be determined. The L delay vectors are delay vectors selected from the delay vector set and used to decode the downlink reference signal.

Alternatively, the network device may determine one or more stronger delay vectors based on each of the K stronger rows in the coefficient matrix $C_{UL}$. For example, for a $k^{th}$ row in the K rows, the network device may determine, based on a square of a modulus of each element, one or more elements with squares of moduli being greater than a preset value, for example, $L_k$ elements. The preset value may be, for example, a predefined value. For example, the preset value may be 80% of a quadratic sum of the moduli of the elements in this column. The $L_k$ elements with the squares of the moduli being greater than the preset value may be used to determine $L_k$ delay vectors. For example, columns in which the Lk elements with the squares of the moduli being greater than the preset value are located in the coefficient matrix $C_{UL}$ may be used to determine positions of the Lk delay vectors in the predefined delay vector set. For example, column sequence numbers of the Lk elements in the coefficient matrix $C_{UL}$ may be column sequence numbers of the Lk delay vectors in the delay vector set. For the K angle vectors, a total quantity of delay vectors may be L. The L delay vectors are delay vectors selected from the delay vector set.

It should be understood that, merely for ease of understanding, the foregoing lists several possible methods that may be used by the network device to determine the K angle vectors and the L delay vectors. However, this shall not constitute any limitation on this application. A specific implementation of determining the K angle vectors and the L delay vectors by the network device is not limited in this application.

In addition, for example, the uplink channel matrix may be obtained by the network device through estimation based on an uplink reference signal, for example, an SRS, that is received in advance, or obtained based on a correctly decoded data signal. This is not limited in this application. For a specific method for obtaining the uplink channel matrix through estimation by the network device based on the uplink reference signal, refer to the conventional technology. For brevity, detailed descriptions of the specific method are omitted herein. In an FDD mode, angles and delays on uplink and downlink channels may be reciprocal. Therefore, the K angle vectors and the L delay vectors that are obtained through uplink channel measurement may be loaded to the downlink reference signal, so that the terminal device performs downlink channel measurement based on the received precoded reference signal. Certainly, the K angle vectors obtained through uplink channel measurement may alternatively be loaded to the downlink reference signal, or the L delay vectors obtained through uplink channel measurement may alternatively be loaded to the downlink reference signal. In this embodiment, a case in which the K angle vectors and the L delay vectors are loaded to the downlink reference signal is mainly described in detail.

It should be understood that determining the K angle vectors and the L delay vectors based on uplink channel measurement is not a unique implementation. For example, the K angle vectors and the L delay vectors may be predefined, for example, defined in a protocol; or may be determined by the network device through statistics collection based on a result fed back in one or more previous downlink channel measurements. A manner of obtaining the K angle vectors and the L delay vectors is not limited in this application.

It should be further understood that the K angle vectors and the L delay vectors are not necessarily determined based on uplink channel measurement. For example, the K angle vectors and the L delay vectors may be predefined, for example, defined in a protocol; or the K angle vectors and the L delay vectors may be determined through statistics collection based on a result fed back in one or more previous downlink channel measurements. A manner of determining the K angle vectors and the L delay vectors is not limited in this application.

The network device may precode the downlink reference signal such as a CSI-RS based on the K angle vectors and the L delay vectors, to obtain a precoded reference signal. The network device may further transmit the precoded reference signal by using a preconfigured reference signal resource.

Optionally, the method 200 further includes: The terminal device receives second indication information, where the second indication information is used to configure one or more reference signal resources. Correspondingly, the network device sends the second indication information.

The one or more reference signal resources configured by using the second indication information may be used to carry the precoded reference signal. A precoded reference signal carried on a same reference signal resource may correspond to one or more ports. When a plurality of reference signal resources are configured by using the second indication information, angle-delay pairs corresponding to precoded reference signals carried on the reference signal resources may be different, and the reference signal resources do not overlap in frequency domain and/or time domain. In this embodiment, a precoded reference signal of each port corresponds to one angle vector and one delay vector, or corresponds to one angle-delay pair.

Herein, the angle-delay pair corresponding to the precoded reference signal may be an angle vector and a delay vector that are used to precode the reference signal. That the angle-delay pairs corresponding to the precoded reference signals carried on the reference signal resources are different is that precoded reference signals carried on any two reference signal resources are obtained based on different combinations of angle vectors and delay vectors.

Specifically, that the angle-delay pairs corresponding to the precoded reference signals carried on the reference signal resources are different may include one or more of the following cases: Precoded reference signals carried on two reference signal resources may be obtained through precoding based on a same angle vector and different delay vectors; precoded reference signals carried on two reference signal resources may be obtained through precoding based on a same delay vector and different angle vectors; and precoded reference signals carried on two reference signal resources may be obtained through precoding based on different angle vectors and different delay vectors.

In other words, precoded reference signals carried on any two reference signal resources may be obtained through precoding based on different angle-delay pairs, and angle vectors and/or delay vectors included in the angle-delay pairs are different. In other words, delay vectors corresponding to precoded reference signals carried on different reference signal resources may be repeated, or angle vectors corresponding to precoded reference signals carried on different reference signal resources may be repeated, but formed angle-delay pairs are not repeated. For example, the second indication information may be higher layer signaling such as an RRC message. This is not limited in this application.

In a possible design, the second indication information may be used to configure a CSI-RS resource (CSI-RS resource, that is, an example of the reference signal resource) by using a higher layer parameter, for example, a CSI resource configuration (CSI-ResourceConfig) and a non-zero power (NZP) CSI-RS resource set (NZP-CSI-RS-ResourceSet). The higher layer parameter may be, for example, a quantity of ports, a time-frequency resource, and a pilot density configured for each CSI-RS resource. Therefore, the terminal device may determine, based on the higher layer parameter, a quantity of ports corresponding to a precoded reference signal carried on each RB.

It should be noted that, in a current protocol, for example, in an NR protocol, the quantity of ports may be a quantity of ports corresponding to a precoded reference signal carried on each RB. The network device may map a precoded reference signal of one or more ports to a plurality of RBs in a measurement bandwidth, and a precoded reference signal carried on each RB may correspond to the one or more ports. The terminal device may receive the precoded reference signal of the one or more ports on each of the plurality of RBs in the measurement bandwidth.

As described above, one reference signal resource may include one or more RBs. In each reference signal resource configured by using the second indication information, precoded reference signals carried on the RBs may correspond to one or more same ports. In other words, in a same reference signal resource, a precoded reference signal carried on each RB may be obtained through precoding based on one or more same delay vectors and one or more same angle vectors.

In a possible implementation, the network device may traverse the P combinations of angle vectors and delay vectors to precode the reference signal, to obtain the precoded reference signal. As described above, P may be K×L, $$\sum_{k=1}^{K} L_k, \text{ or } \sum_{l=1}^{L} K_l.$$

Figure 3:
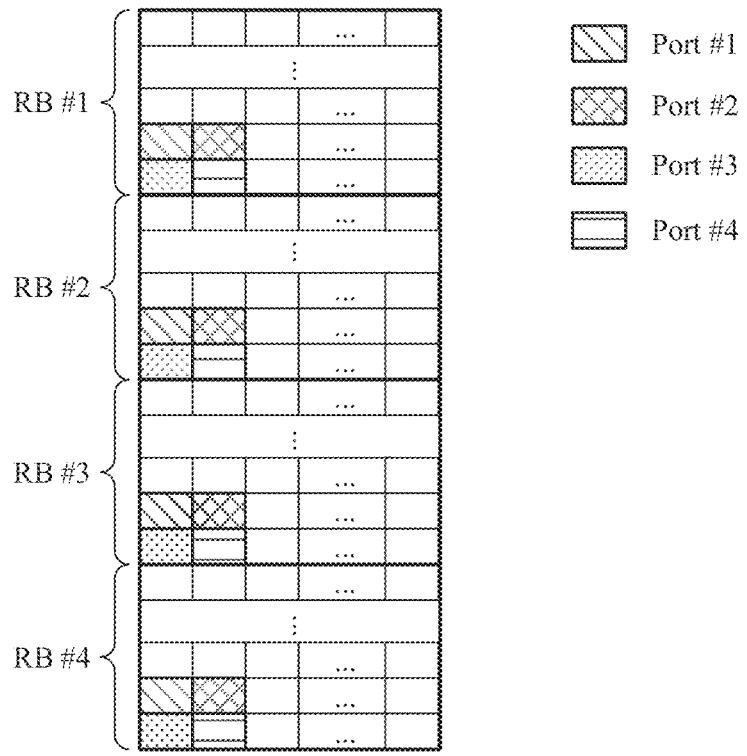
FIG. 3 to FIG. 7 are schematic diagrams of precoded reference signals that are of a plurality of ports and that are carried on a plurality of RBs according to embodiments of this application.

The reference signal resource used to transmit the precoded reference signal may be preconfigured by the network device by using higher layer signaling, for example, the second indication information. The reference signal resource may include one or more RBs, for example, N RBs, and N is an integer greater than or equal to 1. A precoded reference signal carried on each RB may be obtained through precoding based on the K angle vectors and the L delay vectors. FIG. 3 below shows an example in which precoded reference signals of a plurality of ports are carried on a plurality of RBs.

In this implementation, the network device may preconfigure one reference signal resource for the terminal device. A precoded reference signal carried on each RB in the reference signal resource may correspond to P ports. A precoded reference signal of each port may be obtained by precoding the reference signal based on one of the L delay vectors and one of the K angle vectors. In other words, the precoded reference signals carried on all the RBs in the reference signal resource may correspond to a same angle-delay pair, or correspond to a same angle vector and a same delay vector.

In addition, because the K angle vectors and the L delay vectors are loaded to each RB in the reference signal resource, and each RB corresponds to a relatively large quantity of ports, relatively high pilot overheads may be caused. Therefore, the network device may configure a relatively small pilot density by using higher layer signaling, for example, the second indication information, to reduce the pilot overheads.

In another possible implementation, the network device may allocate the P combinations of angle vectors and delay vectors to different RBs, so that angle-delay pairs corresponding to precoded reference signals carried on the different RBs are different, in other words, angle vectors and/or delay vectors corresponding to the precoded reference signals carried on the different RBs are different.

Figure 4:
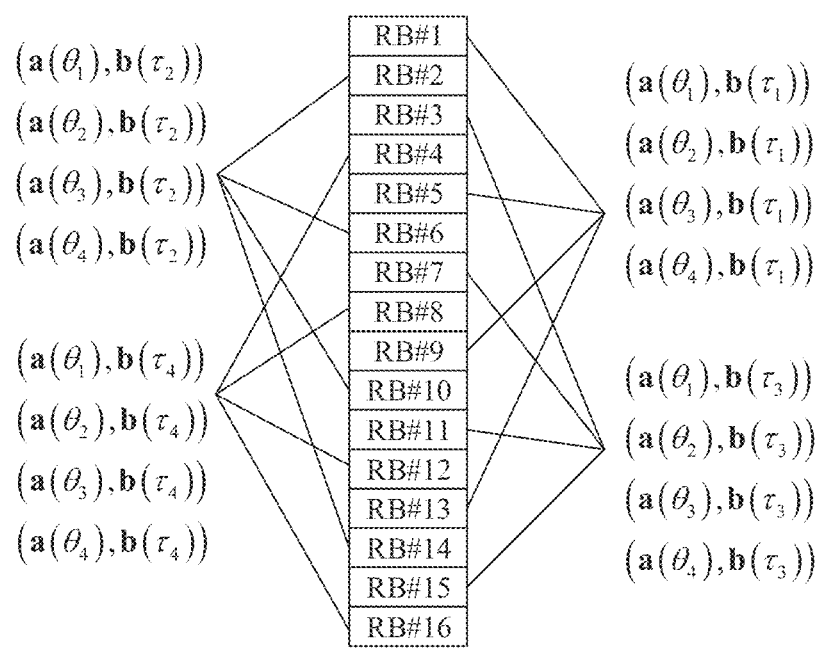
Figure 5:
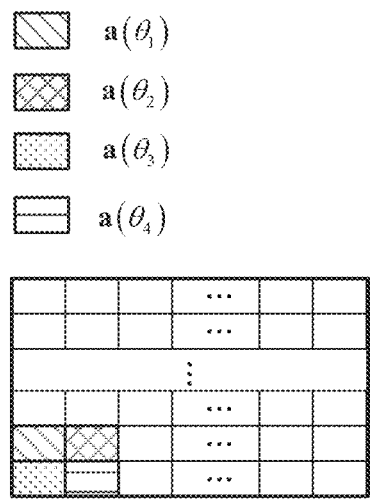

If the K angle vectors and the L delay vectors are shared by each other, the network device may precode the reference signal by traversing each of the K angle vectors, and precode the reference signal based on the L delay vectors. In addition, precoded reference signals obtained through precoding based on different delay vectors may be mapped to different RBs. The precoded reference signal carried on each RB may be obtained through precoding based on the K angle vectors and some of the L delay vectors. In the plurality of RBs, precoded reference signals carried on at least two RBs are obtained through precoding based on different delay vectors. FIG. 4 and FIG. 5 below each show an example in which precoded reference signals of a plurality of ports are carried on a plurality of RBs.

Figure 6:
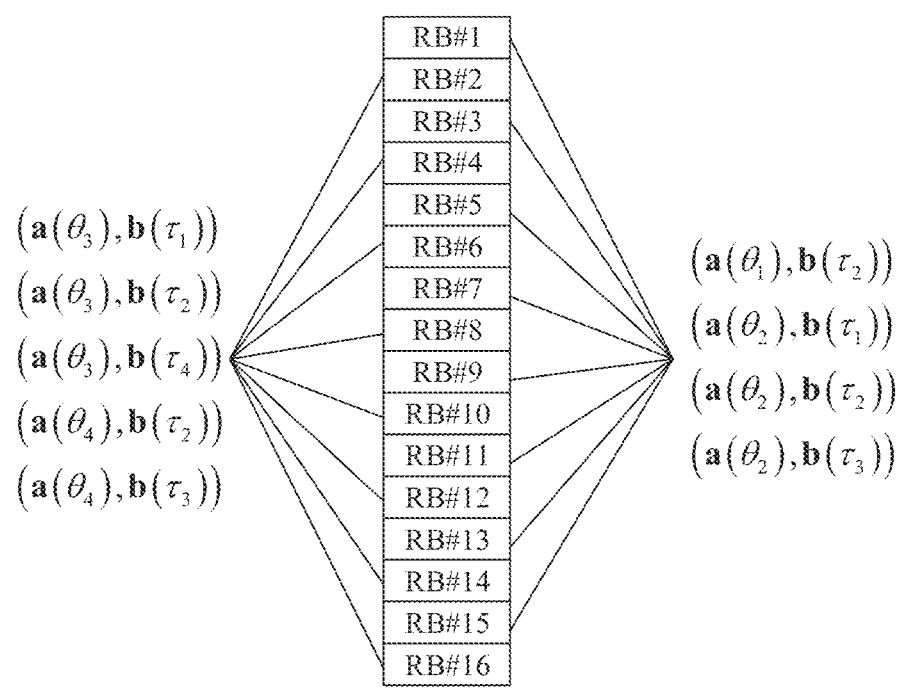
Figure 7:
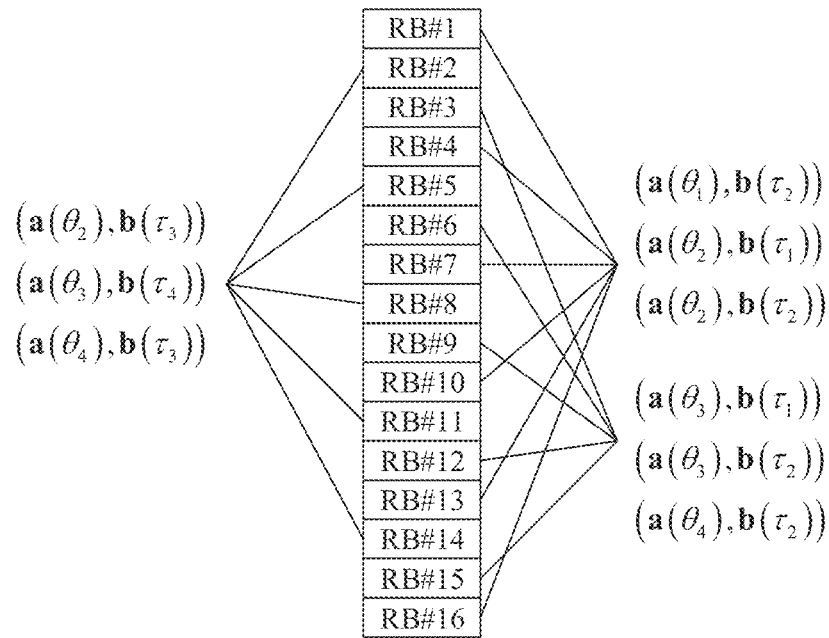

If delay vectors corresponding to at least two angle vectors are different, the network device may precode the reference signal based on different combinations of angle vectors and delay vectors (or different angle-delay pairs). In addition, precoded reference signals obtained through precoding based on different combinations of angle vectors and delay vectors may be mapped to different RBs. The precoded reference signal carried on each RB may be obtained through precoding based on one or more of the K angle vectors and a corresponding delay vector. In the plurality of RBs, precoded reference signals carried on at least two RBs are obtained through precoding based on different combinations of angle vectors and delay vectors. FIG. 6 and FIG. 7 below show two examples in which precoded reference signals of a plurality of ports are carried on a plurality of RBs.

If angle vectors corresponding to at least two delay vectors are different, the network device may precode the reference signal based on different combinations of angle vectors and delay vectors (or different angle-delay pairs). In addition, precoded reference signals obtained through precoding based on different combinations of angle vectors and delay vectors may be mapped to different RBs. The precoded reference signal carried on each RB may be obtained through precoding based on one or more of the L delay vectors and a corresponding angle vector. In the plurality of RBs, precoded reference signals carried on at least two RBs are obtained through precoding based on different combinations of angle vectors and delay vectors.

In this implementation, there may be a plurality of reference signal resources used to transmit the precoded reference signal. The network device may preconfigure a plurality of reference signal resources for the terminal device by using higher layer signaling, for example, the second indication information. Each of the plurality of reference signal resources may include one or more RBs. A precoded reference signal carried on each reference signal resource may correspond to one or more ports, and quantities of ports corresponding to the precoded reference signals carried on the reference signal resources may be different or the same. When the quantities of ports corresponding to the precoded reference signals carried on the reference signal resources are the same, port numbers corresponding to the precoded reference signals carried on the reference signal resources may be the same or may be different. Regardless of whether the port numbers corresponding to the precoded reference signals carried on the reference signal resources are the same or different, angle-delay pairs corresponding to the precoded reference signals carried on the reference signal resources may be different, in other words, delay vectors and/or angle vectors corresponding to precoded reference signals carried on the reference signal resources may be different.

It may be understood that, the precoded reference signal of each port may be obtained by precoding the reference signal based on one of the L delay vectors and one of the K angle vectors. In addition, the reference signal resources do not overlap in frequency domain and/or time domain. For example, the reference signal resources are arranged in a staggered manner in frequency domain. Therefore, precoded reference signals obtained through precoding based on different combinations of angle vectors and delay vectors may be carried by using different time-frequency resources.

In this implementation, a quantity of ports to which the precoded reference signal carried on each RB may correspond may be less than P. For example, if the K angle vectors and one delay vector are loaded to each RB, the precoded reference signal carried on each RB may correspond to K ports, and precoded reference signals carried on at least two RBs correspond to different ports.

For example, the network device may group the plurality of RBs to obtain a plurality of frequency domain groups. A precoded reference signal carried on an RB in each frequency domain group may be obtained through precoding based on a same delay vector or a same angle vector (or a same angle-delay pair). For ease of differentiation, the two different implementations listed above may be distinguished by whether the RBs are grouped. In the former implementation, the network device may not group the RBs, and one or more ports corresponding to the precoded reference signals carried on the RBs may be the same. In the latter implementation, the network device may group the RBs, and ports corresponding to the precoded reference signals carried on the RBs are different. It should be understood that the frequency domain group may be a logical concept, and the RBs are not necessarily actually grouped.

For ease of understanding, the following describes, with reference to the accompanying drawing, a correspondence between a precoded reference signal carried on each RB in a reference signal resource and a port. It should be understood that the RB is merely a possible form of a frequency domain unit, and the frequency domain unit may be, for example, a subband, a PRB (physical resource block), or an RBG. This is not limited in this application. A frequency domain unit in any form may include one or more RBs. In other words, the RB shown in the accompanying drawings (including FIG. 3 to FIG. 7) may be a frequency domain unit, or may be an RB that is in a frequency domain unit and that is used to carry a precoded reference signal. This is not limited in this application.

In addition, a quantity of RBs that is in each frequency domain unit and that is used to carry a precoded reference signal is not limited in this application either. For example, each frequency domain unit may include one RB used to carry a precoded reference signal, or may include a plurality of RBs used to carry a precoded reference signal. Regardless of a quantity of RBs for carrying a precoded reference signal in the frequency domain unit, a quantity of ports corresponding to a precoded reference signal carried on each RB remains unchanged. It may be understood that when each frequency domain unit includes a plurality of RBs used to carry a precoded reference signal, ports corresponding to precoded reference signals carried on RBs in a same frequency domain unit may be the same or different. This is not limited in this application.

The following describes in detail, with reference to the accompanying drawings, a correspondence between an RB and a port in the foregoing two implementations.

It should be noted that the accompanying drawings (including FIG. 3 to FIG. 7) mentioned below are merely examples, and show two examples in which precoded reference signals of a plurality of ports are carried on a plurality of RBs. However, this shall not constitute any limitation on this application. Actually, a precoded reference signal is not necessarily carried on each RB in a measurement bandwidth, and is not necessarily carried on a plurality of consecutive RBs. In other words, the terminal device may not necessarily receive the precoded reference signals of the plurality of ports on each RB in the measurement bandwidth. That is, the network device may not necessarily map the precoded reference signal to each RB in the measurement bandwidth. RBs used to carry a downlink reference signal may be discretely distributed in the measurement bandwidth. For example, there is one RB for carrying a downlink reference signal at an interval of several RBs. The distribution of the RBs in the measurement bandwidth may be determined, for example, based on the pilot density as described above. This is not limited in this application.

For example, an RB #1, an RB #2, an RB #3, and an RB #4 in FIG. 3 are not necessarily consecutive in frequency domain. For example, the RB #1, the RB #2, the RB #3, and the RB #4 may be respectively located in four continuous to-be-measured subbands, but there may be one or more RBs between two RBs, for example, between the RB #1 and the RB #2, between the RB #2 and the RB #3, and between the RB #3 and the RB #4.

FIG. 3 shows an example in which precoded reference signals of a plurality of ports are carried on a plurality of RBs. The figure shows an example in which a quantity of RBs is 4. In the four RBs shown in the figure, precoded reference signals carried on each RB may correspond to four ports. For example, the precoded reference signals of the four ports may be obtained through precoding based on one delay vector and four angle vectors, that is, L=1 and K=4. Alternatively, the precoded reference signals of the four ports may be obtained through precoding based on two delay vectors and two angle vectors, that is, L=2 and K=2. Alternatively, the precoded reference signals of the four ports may be obtained through precoding based on four delay vectors and one angle vector, that is, L=4 and K=1. Alternatively, the precoded reference signals of the four ports may be obtained through precoding based on two angle vectors and two delay vectors corresponding to each angle vector, that is, L=2 and $K_1=K_2=2$. Alternatively, the precoded reference signals of the four ports may be obtained through precoding based on two delay vectors and two angle vectors corresponding to each delay vector, that is, K=2 and $L_1=L_2=2$. This is not limited in this application. In other words, a quantity of ports corresponding to the precoded reference signals carried on each RB shown in FIG. 3 may be P.

The four RBs may be an example of the reference signal resource described above. The four RBs may belong to a same reference signal resource. It should be understood that the figure is merely an example, and shows an example in which the four RBs are used as the reference signal resource. This shall not constitute any limitation on this application. The reference signal resource may include more or fewer RBs. A quantity of RBs included in the reference signal resource is not limited in this application.

As shown in the figure, precoded reference signals of a same port occupy a same RE in all the RBs, in other words, relative positions of resources occupied by the precoded reference signals of the same port in all the RBs are the same. REs occupied by precoded reference signals of different ports in a same RB may be different, for example, may be distinguished in a frequency division multiplexing (FDM) or time division multiplexing (TDM) manner. Alternatively, REs occupied by precoded reference signals of different ports in a same RB may be the same, for example, may be distinguished in a code division multiplexing (CDM) manner. The figure is merely an example, and shows an example in which a port #1 and a port #2 are distinguished from a port #3 and a port #4 through FDM, and the port #1 and the port #3 are distinguished from the port #2 and the port #4 through TDM.

It should be understood that FIG. 3 is merely an example for ease of understanding, and does not completely show all REs in an RB. A quantity of REs in each RB is not limited in this application. In addition, a quantity of ports corresponding to a precoded reference signal carried on each RB and a specific resource multiplexing manner of the precoded reference signals of the ports are not limited in this application.

Still referring to FIG. 3, the precoded reference signals carried on each RB may be obtained by precoding the reference signal by traversing P combinations of delay vectors and angle vectors (or P angle-delay pairs). Optionally, a length of the delay vector is a quantity of RBs that are in a frequency domain bandwidth occupied by a CSI measurement resource and that are used to carry a reference signal. In other words, the length of the delay vector is N, N is a quantity of RBs, and N is a positive integer. N elements in a delay vector corresponding to each port may be in a one-to-one correspondence with the N RBs. As shown in the figure, in the four RBs in the figure, positions of REs corresponding to a same port may be the same. Four elements in the delay vector may respectively correspond to values of precoded reference signals of a same port on different RBs.

For example, a delay vector corresponding to a port is $$b(\tau_l) = \begin{bmatrix} e^{-j2\pi f_1 \tau_l} \\ e^{-j2\pi f_2 \tau_l} \\ e^{-j2\pi f_3 \tau_l} \\ e^{-j2\pi f_4 \tau_l} \end{bmatrix}.$$

In this case, the precoded reference signal carried on the RB #1 may be obtained at least by precoding the reference signal based on an element $e^{-j2\pi f_1 \tau_l}$; the precoded reference signal carried on the RB #2 may be obtained at least by precoding the reference signal based on an element $e^{-j2\pi f_2 \tau_l}$; the precoded reference signal carried on the RB #3 may be obtained at least by precoding the reference signal based on an element $e^{-j2\pi f_3 \tau_l}$; and the precoded reference signal carried on the RB #4 may be obtained at least by precoding the reference signal based on an element $e^{-j2\pi f_4 \tau_l}$.

The precoded reference signal carried on the RB #1 is used as an example. The precoded reference signal may be obtained at least by precoding the reference signal based on an element $e^{-j2\pi f_1 \tau_l}$ in the delay vector $b(\tau_1)$ For example, if the reference signal is precoded based on the element $e^{-j2\pi f_1 \tau_l}$ in the delay vector $b(\tau_1)$, a channel measured by the terminal device based on the received precoded reference signal may be represented as $V^{-j2\pi f_1 \tau_l}$. For another example, if the reference signal is precoded based on an element e in the delay vector $b(\tau_1)$ and one angle vector such as $a(\theta_1)$, a channel measured by the terminal device based on the received precoded reference signal may be represented as $e^{-j2\pi f_1 \tau_l} V a(\theta_1)$. A precoded reference signal carried on another RB may also be obtained through precoding in a same manner. For brevity, examples are not further listed one by one herein.

Therefore, a precoded reference signal carried on an $n^{th}$ ($1 \leq n \leq N$, and n is a positive integer) RB in the N RBs (the RBs shown in FIG. 3) may be determined by using at least an $n^{th}$ element in a corresponding delay vector. For example, a precoded reference signal carried on the first RB (namely, the RB #1) in the four RBs is determined by using at least the first element in a corresponding delay vector. For example, the precoded reference signal carried on the RB #1 may be obtained through precoding based on only a delay vector, or may be obtained through precoding based on a delay vector and an angle vector. There may be one or more delay vectors. This is not limited in this application. For each delay vector, the network device may precode the reference signal based on the foregoing method. For example, in this embodiment, the precoded reference signal carried on the RB #1 may be obtained through precoding based on the L delay vectors and the K angle vectors.

If the precoded reference signal on each RB is obtained through precoding by traversing the P combinations of angle vectors and delay vectors, relatively high pilot overheads are caused when there are a relatively large quantity of RBs. To reduce the pilot overheads, the RBs may be grouped. A precoded reference signal carried on each frequency domain group may be obtained through precoding based on some of the P combinations of angle vectors and delay vectors, for example, one delay vector and an angle vector corresponding to the delay vector, or one angle vector and a delay vector corresponding to the angle vector, or one delay vector and one angle vector. In this way, the pilot overheads can be greatly reduced.

In this embodiment, the N RBs may be grouped into a plurality of frequency domain groups, for example, M frequency domain groups, and M is an integer greater than 1. Each frequency domain group may include $\lfloor N/M \rfloor$ RBs. If N cannot be exactly divided by M, a quantity of RBs in the last frequency domain group may be a quantity of remaining RBs. In other words, a quantity of RBs included in an $M^{th}$ frequency domain group may be less than $\lfloor N/M \rfloor$.

When the RBs are grouped, a precoded reference signal carried on each frequency domain group may be obtained through precoding based on the K angle vectors and one or more of the L delay vectors; or a precoded reference signal carried on each frequency domain group may be obtained through precoding based on the L delay vectors and one or more of the K angle vectors.

For example, it is assumed that the K angle vectors and the L delay vectors are shared. In an embodiment, the network device may group the N RBs based on different delay vectors. A precoded reference signal carried on each frequency domain group may be obtained through precoding based on the K angle vectors and L/M delay vectors. Therefore, a quantity of ports corresponding to the precoded reference signal carried on each RB may be K×L/M. Precoded reference signals carried on any two RBs in a same frequency domain group may correspond to one or more same delay vectors. In other words, precoded reference signals of a same port that are carried on any two RBs in a same frequency domain group may correspond to a same delay vector. Delay vectors corresponding to precoded reference signals carried on different frequency domain groups are different.

Optionally, M=L. In other words, a quantity of frequency domain groups may be equal to a quantity of delay vectors. In this case, each frequency domain group may include $\lfloor N/L \rfloor$ RBs. RBs included in an $l^{th}$ frequency domain group in the L frequency domain groups may be an $1^{st}$ RB, an $(1+L)^{th}$ RB, and an $(1+2L)^{th}$ RB to $(1+(\lfloor N/L \rfloor-1)\times L)^{th}$ RB in the N RBs. In other words, the $l^{th}$ frequency domain group in the L frequency domain groups includes an $(1+(i-1)\times L)^{th}$ RB in the N RBs, and i=1, 2, ..., $\lfloor N/L \rfloor$.

The $1^{st}$ RB in the N RBs may be the first RB in the $l^{th}$ frequency domain group; the $(1+L)^{th}$ RB in the N RBs may be the second RB in the $l^{th}$ frequency domain group; the $(1+2L)^{th}$ RB in the N RBs may be the third RB in the $l^{th}$ frequency domain group; and the $(1+(\lfloor N/L \rfloor-1)\times L)^{th}$ RB in the N RBs may be an $\lfloor N/L \rfloor^{th}$ RB in the $l^{th}$ frequency domain group. By analogy, an $(1+(n-1)\times L)^{th}$ RB in the N RBs may be an $n^{th}$ RB in the $l^{th}$ frequency domain group.

The network device may perform, based on the $l^{th}$ delay vector in the L delay vectors, frequency-domain precoding on a reference signal carried on each RB in the $l^{th}$ frequency domain group in the L frequency domain groups (it may be understood that the reference signal may be a reference signal on which space-domain precoding is performed). Each frequency domain group may correspond to one delay vector, and an RB in each frequency domain group may correspond to one element in the delay vector.

In this case, a quantity of ports corresponding to the precoded reference signal carried on each RB may be K.

FIG. 4 and FIG. 5 each show another example in which precoded reference signals of a plurality of ports are carried on a plurality of RBs. As shown in the figures, a quantity of RBs is 16. In the 16 RBs shown in FIG. 4, a precoded reference signal carried on each RB may correspond to one delay vector. The 16 RBs may be grouped into four frequency domain groups. For example, an RB #1, an RB #5, an RB #9, and an RB #13 may be grouped into a frequency domain group #1; an RB #2, an RB #6, an RB #10, and an RB #14 may be grouped into a frequency domain group #2; an RB #3, an RB #7, an RB #11, and an RB #15 may be grouped into a frequency domain group #3; and an RB #4, an RB #8, an RB #12, and an RB #16 may be grouped into a frequency domain group #4.

The 16 RBs may respectively belong to four reference signal resources. Each frequency domain group may belong to one reference signal resource. Precoded reference signals carried on a same frequency domain group may be obtained through precoding based on the K angle vectors and one delay vector. For example, K=4 and L=4. For example, the K angle vectors may include $a(\theta_1)$, $a(\theta_2)$, $a(\theta_3)$ and $a(\theta_4)$. For example, the L delay vectors may include $b(\tau_1)$, $b(\tau_2)$, $b(\tau_3)$, and $b(\tau_4)$. Precoded reference signals carried on the RB #1, the RB #5, the RB #9, and the RB #13 may be obtained through precoding based on K same angle vectors and a same delay vector, for example, four combinations of angle vectors and delay vectors that are obtained by separately combining $a(\theta_1)$, $a(\theta_2)$, $a(\theta_3)$, and $a(\theta_4)$ with $b(\tau_1)$, for example, including $(a(\theta_1),b(\tau_1))$, $(a(\theta_2),b(\tau_1))$ $(a(\theta_3),b(\tau_1))$, and $(a(\theta_4),b(\tau_1))$. Precoded reference signals carried on the RB #2, the RB #6, the RB #10, and the RB #14 may be obtained through precoding based on K same angle vectors and a same delay vector, for example, four combinations of angle vectors and delay vectors that are obtained by separately combining $a(\theta_1)$, $a(\theta_2)$, $a(\theta_3)$, and $a(\theta_4)$ with $b(\tau_2)$, for example, including $(a(\theta_1),b(\tau_2))$, $(a(\theta_2),b(\tau_2))$, $(a(\theta_3),b(\tau_2))$, and $(a(\theta_4),b(\tau_2))$. Precoded reference signals carried on the RB #3, the RB #7, the RB #11, and the RB #15 may be obtained through precoding based on K same angle vectors and a same delay vector, for example, four combinations of angle vectors and delay vectors that are obtained by separately combining $a(\theta_1)$, $a(\theta_2)$, $a(\theta_3)$, and $a(\theta_4)$ with $b(\tau_3)$, for example, including $(a(\theta_1),b(\tau_3))$, $(a(\theta_2),b(\tau_3))$, and $(a(\theta_4),b(\tau_3))$. Precoded reference signals carried on the RB #4, the RB #8, the RB #12, and the RB #16 may be obtained through precoding based on K same angle vectors and a same delay vector, for example, four combinations of angle vectors and delay vectors that are obtained by separately combining $a(\theta_1)$, $a(\theta_2)$, $a(\theta_3)$, and $a(\theta_4)$ with $b(\tau_4)$, for example, including $(a(\theta_1),b(\tau_4))$, $(a(\theta_2),b(\tau_4))$, $(a(\theta_3),b(\tau_4))$, and $(a(\theta_4),b(\tau_4))$.

Therefore, in the 16 RBs shown in FIG. 4, precoded reference signals carried on any two RBs in a same frequency domain group correspond to a same delay vector. For example, the frequency domain group #1 may correspond to the delay vector $b(\tau_1)$; the frequency domain group #2 may correspond to the delay vector $b(\tau_2)$; the frequency domain group #3 may correspond to the delay vector $b(\tau_3)$; and the frequency domain group #4 may correspond to the delay vector $b(\tau_4)$. It should be understood that a specific manner of loading the delay vector to each RB in the frequency domain group has been described above with reference to FIG. 3. For brevity, details are not described herein again.

Still referring to FIG. 5, the precoded reference signal carried on each RB is obtained through precoding based on four angle vectors and one delay vector. The figure is merely an example, and the delay vector is not shown. For example, the four angle vectors may be $a(\theta_1)$, $a(\theta_2)$, $a(\theta_3)$, and $a(\theta_4)$, respectively. Precoded reference signals on a same RB that are obtained through precoding based on a same angle vector occupy a same RE. Precoded reference signals obtained through precoding based on different angle vectors may be distinguished, for example, in the FDM manner, the TDM manner, and the CDM manner.

Precoded reference signals on a same frequency domain group that are obtained based on one angle vector and one delay vector may correspond to a same port. For example, precoded reference signals on the frequency domain group #1 that are obtained through precoding based on $(a(\theta_1),b(\tau_1))$ may correspond to a port #1; precoded reference signals on the frequency domain group #1 that are obtained through precoding based on $(a(\theta_2),b(\tau_1))$ may correspond to a port #2; precoded reference signals on the frequency domain group #1 that are obtained through precoding based on $(a(\theta_3),b(\tau_1))$ may correspond to a port #4; and precoded reference signals on the frequency domain group #1 that are obtained through precoding based on $(a(\theta_4),b(\tau_1))$ may correspond to the port #4.

Precoded reference signals on different frequency domain groups that are obtained based on a same angle vector and different delay vectors may correspond to different delay vectors. Port numbers corresponding to precoded reference signals carried on different frequency domain groups may be the same or may be different. For example, the precoded reference signals on the frequency domain group #1 that are obtained through precoding based on $(a(\theta_1),b(\tau_1))$ correspond to the port #1; precoded reference signals on the frequency domain group #2 that are obtained through precoding based on $(a(\theta_1),b(\tau_2))$ may correspond to the port #1, or may correspond to a port #5; precoded reference signals on the frequency domain group #3 that are obtained through precoding based on $(a(\theta_1),b(\tau_3))$ may correspond to the port #1, or may correspond to a port #9; and precoded reference signals on the frequency domain group #4 that is obtained through precoding based on $(a(\theta_1),b(\tau_4))$ may correspond to the port #1, or may correspond to a port #13.

It should be understood that, merely for ease of understanding, the foregoing lists, by using an example, a correspondence between a precoded reference signal on each frequency domain group and a port. A correspondence between each frequency domain group and a port number is merely an example, and shall not constitute any limitation on this application. The correspondence between each frequency domain group and a port number is not limited in this application.

It can be learned from the figure that, the precoded reference signals carried on each RB shown in the figure may correspond to four ports. The precoded reference signals of the four ports may be obtained through precoding based on four angle vector and one delay vector. The delay vector may be selected from four delay vectors. That is, K=4 and L=4. In other words, a quantity of ports corresponding to the precoded reference signals carried on each RB shown in FIG. 4 may be K.

It should be understood that loading one delay vector to each frequency domain group is merely an example for ease of understanding. A quantity of delay vectors loaded to each frequency domain group is not limited in this application. The quantity of delay vectors loaded to each frequency domain group may be less than L.

For example, the precoded reference signals carried on each RB shown in the figure may correspond to more ports, for example, eight ports. For example, the precoded reference signals of the eight ports may be obtained through precoding based on four angle vectors and two delay vectors. In this case, precoded reference signals carried on any two RBs in a same frequency domain group may correspond to two delay vectors, and delay vectors corresponding to precoded reference signals carried on any two RBs are the same. For example, precoded reference signals carried on any two RBs in the frequency domain group #1 all correspond to the delay vectors $b(\tau_1)$ and $b(\tau_2)$ The two delay vectors may be selected from eight delay vectors. That is, K=4 and L=8. In this case, a quantity of ports corresponding to the precoded reference signals carried on each RB may be 2K.

It should be understood that values of K and L that are listed above are merely examples, and shall not constitute any limitation on this application. The values of K and L are not limited in this application. It should be further understood that a correspondence among each frequency domain group, a delay vector, and an angle vector that is listed above is merely shown for ease of understanding, and shall not constitute any limitation on this application. The correspondence among each frequency domain group, a delay vector, and an angle vector is not limited in this application.

It may be understood that, when the quantity of delay vectors loaded to each frequency domain group is L, it is equivalent to describing that the RBs are not grouped.

It should be understood that FIG. 5 is merely an example for ease of understanding, and does not completely show all REs in an RB. A quantity of REs in each RB is not limited in this application. In addition, the port corresponding to the precoded reference signal carried on each RB and a specific resource multiplexing manner of the reference signals of the ports are not limited in this application.

Further, a length of the delay vector is $\lfloor N/M \rfloor$. $\lfloor N/M \rfloor$ elements in a delay vector corresponding to each port may be in a one-to-one correspondence with $\lfloor N/M \rfloor$ RBs. A value of a precoded reference signal of each port on an $n^{th}$ RB in an $m^{th}$ (1≤m≤M, and m is an integer) frequency domain group in M frequency domain groups is determined by using at least an $n^{th}$ element in an $m^{th}$ delay vector in M delay vectors.

Optionally, a length of the delay vector is $\lfloor N/L \rfloor$. $\lfloor N/L \rfloor$ elements in a delay vector corresponding to each port may be in a one-to-one correspondence with $\lfloor N/L \rfloor$ RBs. Therefore, a value of a precoded reference signal of each port on an $n^{th}$ RB in an $l^{th}$ (1≤l≤L, and l is an integer) frequency domain group in L frequency domain groups is determined by using at least an $n^{th}$ element in an $l^{th}$ delay vector in L delay vectors.

For example, a precoded reference signal carried on the first RB (namely, the RB #1) in the 16 RBs, that is, the first RB in the frequency domain group #1 is determined by using at least the first element in a delay vector corresponding to $b(\tau_1)$; a precoded reference signal carried on the fifth RB (namely, the RB #5) in the 16 RBs, that is, the second RB in the frequency domain group #1 is determined by using at least the second element in $b(\tau_1)$; a precoded reference signal carried on the ninth RB (namely, the RB #9) in the 16 RBs, that is, the third RB in the frequency domain group #1 is determined by using at least the third element in $b(\tau_1)$; and a precoded reference signal carried on the 13$^{th}$ RB (namely, the RB #14) in the 16 RBs, that is, the fourth RB in the frequency domain group #1 is determined by using at least the fourth element in $b(\tau_1)$. It should be understood that a correspondence between each RB in another frequency domain group #1 and each element in a delay vector is similar to this correspondence. For brevity, the correspondences are not listed one by one herein.

It should be noted that a length of each of the L delay vectors determined by the network device based on uplink channel measurement may be N. After the RBs are grouped, a length of a delay vector used to precode the reference signal is $\lfloor N/L \rfloor$. The network device may extract some elements from each delay vector based on the L delay vectors determined through uplink channel measurement, to form L new delay vectors. Herein, for ease of differentiation and description, the L delay vectors determined through uplink channel measurement are referred to as L original delay vectors.

Specifically, the N RBs are grouped into L frequency domain groups. An $l^{th}$ frequency domain group in the L frequency domain groups corresponds to an $l^{th}$ original delay vector in the L original delay vectors, and the first RB, the second RB, and the third RB to an $\lfloor N/L \rfloor^{th}$ RB respectively correspond to an $l^{th}$ element, an $(l+L)^{th}$ element, and an $(l+2L)^{th}$ element to an $(l+(\lfloor N/L \rfloor-1)\times L)^{th}$ element in the $l^{th}$ original delay vector. By analogy, an $n^{th}$ RB in the $l^{th}$ frequency domain group may correspond to an $(l+(n-1)\times L)^{th}$ element in the $l^{th}$ original delay vector.

It should be understood that the original delay vector is defined above merely for differentiation. In the following embodiments, the original delay vector is not involved. All delay vectors in the following embodiments may be understood as delay vectors used to perform frequency-domain precoding on a reference signal. A length of the delay vector may be N, or may be $\lfloor N/M \rfloor$.

It should be further understood that, merely for ease of understanding, the foregoing describes in detail, with reference to the accompanying drawings, a process of grouping the N RBs and performing frequency-domain precoding on reference signals on the L frequency domain groups based on the L delay vectors. However, this shall not constitute any limitation on this application. A grouping manner of the N RBs is not limited in this application. A correspondence between each frequency domain group and a delay vector is not limited in this application either. A correspondence between each RB in each frequency domain group and each element in a delay vector is not limited in this application either.

In another embodiment, the network device may group the N RBs based on different angle vectors. For example, a precoded reference signal carried on each frequency domain group may be obtained through precoding based on the L delay vectors and K/M angle vectors. Therefore, a quantity of ports corresponding to the precoded reference signal carried on each RB may be L×K/M. Angle vectors corresponding to precoded reference signals carried on different frequency domain groups are different.

Optionally, M=K. In other words, a quantity of frequency domain groups may be equal to a quantity of angle vectors. In this case, each frequency domain group may include $\lfloor N/L \rfloor$ RBs. A precoded reference signal carried on an RB included in the $l^{th}$ frequency domain group in the L frequency domain groups is determined based on at least an $l^{th}$ angle vector in L angle vectors. In this case, a quantity of ports corresponding to the precoded reference signal carried on each RB may be L.

The N RBs are grouped based on different angle vectors, and a correspondence among a precoded reference signal carried on each frequency domain group, an angle vector, and a delay vector are similar to the correspondences among a precoded reference signal carried on each frequency domain group, an angle vector, and a delay vector that are described above with reference to FIG. 4 and FIG. 5 when the N RBs are grouped based on different delay vectors. For example, in the accompanying drawings (including FIG. 4 and FIG. 5), the angle vector is replaced with the delay vector, and the delay vector is replaced with the angle vector. For brevity, details are not described herein with reference to the accompanying drawings.

For another example, it is assumed that delay vectors corresponding to at least two of the K angle vectors are different. The $k^{th}$ angle vector may correspond to the $L_k$ delay vectors. The network device may group the N RBs based on different angle vectors. A precoded reference signal carried on each frequency domain group may be obtained through precoding based on some of the K angle vectors and a delay vector corresponding to the some of the K angle vectors.

For example, K=4, $L_1=1$, $L_2=L_3=3$, and $L_4=2$. For example, the K angle vectors may include $a(\theta_1)$, $a(\theta_2)$, $a(\theta_3)$, and $a(\theta_4)$. For example, $L_1$ delay vectors corresponding to $a(\theta_1)$ may include $b(\tau_2)$. For example, $L_2$ delay vectors corresponding to $a(\theta_2)$ may include $b(\tau_1)$, $b(\tau_2)$, and $b(\tau_3)$. For example, $L_3$ delay vectors corresponding to $a(\theta_3)$ may include $b(\tau_1)$, $b(\tau_2)$, and $b(\tau_4)$. For example, $L_4$ delay vectors corresponding to $a(\theta_4)$ may include $b(\tau_2)$ and $b(\tau_3)$.

FIG. 6 shows another example in which precoded reference signals of a plurality of ports are carried on a plurality of RBs. As shown in the figure, a quantity of RBs is 16. In the 16 RBs shown in FIG. 6, precoded reference signals carried on each RB may correspond to two angle vectors. The 16 RBs may be grouped into two frequency domain groups. For example, an RB #1, an RB #3, an RB #5, an RB #7, an RB #9, an RB #11, an RB #13, and an RB #15 may be grouped into a frequency domain group #1, and an RB #2, an RB #4, an RB #6, an RB #8, an RB #10, an RB #12, an RB #14 and an RB #16 may be grouped into a frequency domain group #2. The 16 RBs may respectively belong to two reference signal resources. Each frequency domain group may belong to one reference signal resource.

Precoded reference signals carried on a same frequency domain group are obtained through precoding based on a same angle vector and a same delay vector. For example, K=4 and L=4. For example, the K angle vectors may include $a(\theta_1)$, $a(\theta_2)$, $a(\theta_3)$, and $a(\theta_4)$. For example, the L delay vectors corresponding to the angle vectors may include $b(\tau_1)$, $b(\tau_2)$, $b(\tau_3)$, and $b(\tau_4)$. For example, a delay vector corresponding to the angle vector $a(\theta_1)$ may include $b(\tau_2)$. For example, delay vectors corresponding to the angle vector $a(\theta_2)$ may include $b(\tau_1)$, $b(\tau_2)$, and $b(\tau_3)$. For example, delay vectors corresponding to the angle vector $a(\theta_3)$ may include $b(\tau_1)$, $b(\tau_2)$, and $b(\tau_4)$. For example, delay vectors corresponding to the angle vector $a(\theta_4)$ may include $b(\tau_2)$ and $b(\tau_3)$.

Precoded reference signals carried on the RB #1, the RB #3, the RB #5, the RB #7, the RB #9, the RB #11, the RB #13, and the RB #15 may be obtained based on two angle vectors and delay vectors corresponding to the two angle vectors, for example, $(a(\theta_1),b(\tau_2))$ obtained by combining $a(\theta_1)$ with a delay vector $b(\tau_2)$ corresponding to $a(\theta_1)$, and $(a(\theta_2),b(\tau_1))$, $(a(\theta_2),b(\tau_2))$, and $(a(\theta_2),b(\tau_3))$ obtained by separately combining $a(\theta_2)$ with $b(\tau_1)$, and $b(\tau_2)$, and $b(\tau_3)$ corresponding to $a(\theta_2)$. Precoded reference signals carried on the RB #2, the RB #4, the RB #6, the RB #8, the RB #10, the RB #12, the RB #14, and the RB #16 may be obtained based on the other two angle vectors and delay vectors corresponding to the other two angle vectors, for example, $(a(\theta_3),b(\tau_1))$, $(a(\theta_3),b(\tau_2))$, and $(a(\theta_3),b(\tau_4))$ obtained by combining $a(\theta_3)$ with delay vectors $b(\tau_1)$, $b(\tau_2)$, and $b(\tau_4)$ corresponding to $a(\theta_3)$, and $(a(\theta_4),b(\tau_2))$ $(a(\theta_4),b(\tau_3))$ obtained by separately combining $a(\theta_4)$ with $b(\tau_2)$ and $b(\tau_3)$ corresponding to $a(\theta_4)$.

It can be learned from the figure that, quantities of ports corresponding to precoded reference signals carried on RBs in different frequency domain groups may be different. For example, the precoded reference signals carried on the RBs in the frequency domain group #1 may correspond to four ports, and the precoded reference signals carried on the RBs in the frequency domain group #2 may correspond to five ports.

Certainly, the network device may alternatively evenly allocate the P combinations of angle vectors and delay vectors to the frequency domain groups based on a quantity of delay vectors corresponding to each angle vector. FIG. 7 shows still another example in which precoded reference signals of a plurality of ports are carried on a plurality of RBs. As shown in the figure, a quantity of RBs is still 16. In the 16 RBs shown in FIG. 7, precoded reference signals carried on each RB may still correspond to two angle vectors. The 16 RBs may be grouped into three frequency domain groups. For example, an RB #1, an RB #4, an RB #7, an RB #10, an RB #13, and an RB #16 may be grouped into a frequency domain group #1; an RB #2, an RB #5, an RB #8, an RB #11, and an RB #14 may be grouped into a frequency domain group #2, and an RB #3, an RB #6, an RB #9, an RB #12, and an RB #15 may be grouped into a frequency domain group #3. The 16 RBs may respectively belong to three reference signal resources. Each frequency domain group may belong to one reference signal resource.

Precoded reference signals carried on a same frequency domain group are obtained through precoding based on a same angle vector and a same delay vector. For example, K=4 and L=4. Each angle vector and a delay vector corresponding to the angle vector may be listed above. For brevity, details are not described herein again. Based on each angle vector and the delay vector corresponding to the angle vector, nine different combinations of angle vectors and delay vectors may be obtained. The network device may evenly allocate the nine combinations to the three frequency domain groups.

For example, precoded reference signals carried on the RB #1, the RB #4, the RB #7, the RB #10, the RB #13, and RB #16 may be obtained through precoding based on $(a(\theta_1), b(\tau_2))$ obtained by combining the angle vector $a(\theta_1)$ with the delay vector $b(\tau_2)$ corresponding to the angle vector $a(\theta_1)$, and $(a(\theta_2), b(\tau_1))$ $(a(\theta_2), b(\tau_2))$ obtained by combining the angle vector $a(\theta_2)$ with the delay vectors $b(\tau_1)$ and $b(\tau_2)$ corresponding to the angle vector $a(\theta_2)$; precoded reference signals carried on the RB #2, the RB #5, the RB #8, the RB #11, and the RB #14 may be obtained through precoding based on $(a(\theta_3), b(\tau_1))$ and $(a(\theta_3), b(\tau_2))$ obtained by combining the angle vector $a(\theta_3)$ with the delay vectors $b(\tau_1)$ and $b(\tau_2)$ corresponding to the angle vector $a(\theta_3)$, and $(a(\theta_4), b(\tau_2))$ obtained by combining the angle vector $a(\theta_4)$ with the delay vector $b(\tau_2)$ corresponding to the angle vector $a(\theta_4)$; and precoded reference signals carried on the RB #3, the RB #6, the RB #9, the RB #12, and the RB #15 may be obtained through precoding based on $(a(\theta_2), b(\tau_3))$ obtained by combining the angle vector $a(\theta_2)$ with the delay vector $b(\tau_3)$ corresponding to the angle vector $a(\theta_2)$, $(a(\theta_3), b(\tau_4))$ obtained by combining the angle vector $a(\theta_3)$ with the delay vector $b(\tau_4)$ corresponding to the angle vector $a(\theta_3)$, and $(a(\theta_4), b(\tau_3))$ obtained by combining the angle vector $a(\theta_4)$ with the delay vector $b(\tau_3)$ corresponding to the angle vector $a(\theta_4)$.

It can be learned from the figure that, quantities of ports corresponding to precoded reference signals carried on RBs in different frequency domain groups may be the same. For example, the precoded reference signals carried on each RB in each frequency domain group shown in FIG. 7 above may correspond to three ports.

For another example, angle vectors corresponding to at least two of the L delay vectors are different. The network device may group the N RBs based on different delay vectors. A precoded reference signal carried on each frequency domain group may be obtained through precoding based on some of the L delay vectors and an angle vector corresponding to the some of the L delay vectors. The N RBs are grouped based on different delay vectors, and a correspondence among a precoded reference signal carried on each frequency domain group, an angle vector, and a delay vector are similar to the correspondences among a precoded reference signal carried on each frequency domain group, an angle vector, and a delay vector that are described above with reference to FIG. 6 and FIG. 7 when the N RBs are grouped based on different delay vectors. For example, in the accompanying drawings (including FIG. 6 and FIG. 7), the angle vector is replaced with the delay vector, and the delay vector is replaced with the angle vector. For brevity, details are not described herein with reference to the accompanying drawings.

It should be understood that the foregoing merely shows several examples of grouping a plurality of RBs for ease of understanding. However, this shall not constitute any limitation on this application. A quantity of frequency domain groups, a quantity of RBs in each frequency domain group, a quantity of ports corresponding to a precoded reference signal carried on each RB, and a corresponding delay vector and angle vector are not limited in this application.

It should be further understood that, merely for ease of understanding, the foregoing lists the correspondence between a precoded reference signal carried on each RB and a port. However, this shall not constitute any limitation on this application. In this application, a correspondence among a precoded reference signal carried on each RB, a delay, an angle, and a port not limited.

It should be further understood that, merely for ease of understanding, the foregoing describes, with reference to the accompanying drawings, a specific process of precoding a reference signal based on a plurality of angle vectors and a plurality of delay vectors and mapping the reference signal to an RB. However, this shall not constitute any limitation on this application. A quantity of RBs, a quantity of delay vectors, a quantity of angle vectors, and a quantity of ports are not limited in this application. A position of an RE corresponding to each port on each RB is not limited in this application either. In other words, a pilot pattern is not limited in this application.

It should be further understood that the foregoing definition of the quantity of ports based on each RB is merely a possible implementation, and shall not constitute any limitation on this application. This application further provides a method for defining a quantity of ports. To be specific, the quantity of ports may be a quantity of ports corresponding to a precoded reference signal carried on each reference signal resource. In other words, the quantity of ports may be defined across RBs.

Such a manner of defining the quantity of ports may be applied to a case in which RBs are grouped.

Optionally, the method 200 further includes: The terminal device receives third indication information, where the third indication information is used to configure one reference signal resource. Correspondingly, the network device sends the third indication information.

The reference signal resource configured by using the third indication information may be used to carry a precoded reference signal, and the precoded reference signal carried on the reference signal resource may be a reference signal obtained through precoding based on the K angle vectors and the L delay vectors. In addition, in the reference signal resource, precoded reference signals carried on at least two RBs are obtained through precoding based on different angle-delay pairs. In other words, the precoded reference signals carried on the at least two RBs correspond to different port numbers. Therefore, in a same reference signal resource, ports corresponding to precoded reference signals carried on RBs are not necessarily the same.

In this embodiment, for example, the reference signal resource may include the 16 RBs described above with reference to any one of FIG. 4 to FIG. 7, that is, may include a plurality of frequency domain groups. The precoded reference signals carried on the reference signal resource may correspond to P ports.

It should be noted that, when the network device groups RBs, to precode, by using different delay vectors, reference signals carried on different RBs, the network device may transmit the precoded reference signal based on the plurality of reference signal resources configured by using the second indication information, or may transmit the precoded reference signal based on the one reference signal resource configured by using the third indication information. This is not limited in this application.

Step 220: The terminal device generates first indication information, where the first indication information may be used to indicate P weighting coefficients corresponding to P angle-delay pairs.

Specifically, the P angle-delay pairs and the P corresponding weighting coefficients may be used to determine a precoding matrix. For example, the P angle-delay pairs may be used to determine P spatial-frequency component matrices or spatial-frequency component vectors, and a weighted sum of the P spatial-frequency component matrices or spatial-frequency component vectors may be used to determine the precoding matrix.

Each angle-delay pair may include one of the K angle vectors and one of the L delay vectors. In other words, each angle-delay pair is uniquely determined by using one of the K angle vectors and one of the L delay vectors. Angle vectors and/or delay vectors included in any two angle-delay pairs are different.

For ease of description, the following assumes that a $p^{th}$ angle-delay pair in the P angle-delay pairs includes the $k^{th}$ angle vector in the K angle vectors and the $l^{th}$ delay vector in the L delay vectors. $1 \leq p \leq P$, $1 \leq k \leq K$, $1 \leq l \leq L$, and p, k, and l are all integers.

The terminal device may perform downlink channel estimation on the received precoded reference signal, to determine the weighting coefficient of each of the P angle-delay pairs based on channel estimation values on the plurality of RBs.

It should be noted that when determining the P weighting coefficients corresponding to the P angle-delay pairs, the terminal device does not necessarily need to generate or determine the P angle-delay pairs. The terminal device may perform channel estimation on the received precoded reference signal on the plurality of RBs, to obtain a channel estimation value corresponding to each port on each RB.

The following describes in detail a specific process in which the terminal device determines the P weighting coefficients.

It should be noted that when receiving the precoded reference signal from the network device, the terminal device may determine a time-frequency resource of the precoded reference signal of each port based on a predefined pilot pattern, and may receive the precoded reference signal of each port on the corresponding time-frequency resource.

A port that can be identified by the terminal device is a port corresponding to the precoded reference signal. Therefore, the terminal device may perform channel estimation on the received precoded reference signal based on each port.

If precoding on a reference signal is not considered, for each receive antenna, dimensions of a downlink channel may be N×T. Dimensions of a downlink channel on each RB that is received through one receive antenna may be 1×T. Because the network device precodes the reference signal based on the angle vector and the delay vector, and dimensions of each angle vector may be T×1, after the reference signal is precoded by using the angle vector and the delay vector, dimensions of a downlink channel received by the terminal device on each RB through each receive antenna may be 1×1. An estimation value of the downlink channel whose dimensions are 1×1 is a channel estimation value obtained by performing channel estimation on the precoded reference signal on one RB.

Because the network device precodes the reference signal based on the K angle vectors and the L delay vectors, the precoded reference signal carried on each RB may correspond to one or more ports.

If the network device does not group the RBs, the precoded reference signal carried on each RB may correspond to P ports. For example, a precoded reference signal corresponding to a $p^{th}$ port in the P ports may be obtained by precoding the reference signal based on the $k^{th}$ angle vector and the $l^{th}$ delay vector. In other words, the precoded reference signal corresponding to the $p^{th}$ port may be used to determine a weighting coefficient of an angle-delay vector pair including the $k^{th}$ angle vector and the $l^{th}$ delay vector, that is, may be used to determine a weighting coefficient of the $p^{th}$ angle-delay pair. Therefore, the P ports may be in a one-to-one correspondence with the P angle-delay pairs.

For the precoded reference signal of the $p^{th}$ port, the terminal device may determine the weighting coefficient of the $p^{th}$ angle-delay pair based on N 1×1 downlink channels received on the N RBs. The weighting coefficient of the $p^{th}$ angle-delay pair may be obtained by performing superposition summation on N channel estimation values on the N RBs.

It is assumed that an estimation value that is of a downlink channel and that is obtained by the terminal device by performing channel estimation on the precoded reference signal of the $p^{th}$ port is denoted as $y_n^{(p)}$. In this case, a sum of a plurality of estimation values that are obtained by the terminal device by performing channel estimation on the precoded reference signal of the $p^{th}$ port on the N RBs may be represented as $$\sum_{n=1}^{N} y_n^{(p)} \cdot \sum_{n=1}^{N} y_n^{(p)}$$

is the weighting coefficient of the $p^{th}$ angle-delay pair. It may be understood that the weighting coefficient of the $p^{th}$ angle-delay pair is determined by using a precoded reference signal obtained through precoding based on the $k^{th}$ angle vector and the $l^{th}$ delay vector.

Based on the foregoing method, the terminal device may determine, based on the received precoded reference signals of the P ports, the P weighting coefficients corresponding to the P angle-delay pairs.

As described above, the spatial-frequency matrix $H_{DL}$ satisfies $H_{DL} = SC_{DL}F^H$. In this embodiment of this application, dimensions of $H_{DL}$ may be T×N. There may be K angle vectors, a length of each angle vector may be T, and dimensions of S may be T×K. There may be L delay vectors, a length of each delay vector may be N, and dimensions of F may be N×L. The foregoing formula is transformed to obtain $S^H H_{DL} = C_{DL}F^H$, and further obtain $(H_{DL}^H S)^H = C_{DL}F^H$. $H^H S$ is an actual channel on which space-domain precoding is performed, and may have dimensions of N×K in this embodiment. A coefficient matrix $C_{DL} = (H_{DL}^H S)^H F$ may be obtained through further transformation.

When performing space-domain precoding on the downlink reference signal based on the K angle vectors, the network device right-multiplies the actual channel by S to obtain $H_{DL}^H S$. When the network device performs, based on the L delay vectors, frequency-domain precoding on a reference signal on which space-domain precoding is performed, $(H_{DL}^H S)^H F$ may be used for representation. Therefore, each element in the coefficient matrix $C_{DL}$ may be determined by multiplying one row in $(H_{DL}^H S)^H$ by one column in F. In other words, each element in the coefficient matrix $C_{DL}$ may be obtained by multiplying one row in a conjugate transpose of the actual channel $H_{DL}^H S$ and one column in F.

For example, an element in an $l^{th}$ row and a $k^{th}$ column in the coefficient matrix $C_{DL}$ is obtained by multiplying an $l^{th}$ row in $(H_{DL}^H S)^H$ and a $k^{th}$ column in F. The element in the $l^{th}$ row and the $k^{th}$ column in the coefficient matrix $C_{DL}$ is a weighting coefficient corresponding to the $k^{th}$ angle vector and the $l^{th}$ delay vector.

It may be learned from a matrix multiplication operation that a quantity of elements included in each row vector in $(H_{DL}^H S)^H$ is the same as a quantity of elements included in each column vector in F. In this embodiment, both the quantity of elements included in each row vector in $(H_{DL}^H S)^H$ and the quantity of elements included in each column vector in F may be N. When the row vector is multiplied by the column vector, each element (for example, an $n^{th}$ element, where n is a value traversed from 1 to N) in the row vector needs to be multiplied by a corresponding element (for example, an $n^{th}$ element, where n is a value traversed from 1 to N) in the column vector, and then a sum is obtained. N elements in each row in $(H_{DL}^H S)^H$ correspond to N frequency domain units (for example, RBs or subbands). However, the network device cannot learn of a correlation between downlink channels in frequency domain units (for example, RBs) in advance, and therefore cannot complete an operation of $(H_{DL}^H S)^H F$ on a network device side, but only loads an element in each delay vector to each RB of the downlink channel.

For ease of understanding, it is assumed herein that the K angle vectors and the L delay vectors are all loaded to each of the N RBs. $C_{DL}=(H_{DL}^H S)^H F$ above is further transformed to obtain $C_{DL}=(F^H H_{DL}^H S)^H=(F^H H_{DL}' S)^H$. $H_{DL}'$ represents a spatial-frequency matrix determined by using an actual downlink channel. Because dimensions of the actual channel are R×T, dimensions of $H^{DL'}$ are N×T. The spatial-frequency matrix may include N row vectors whose dimensions are 1×T, for example, include $h_1$ to $h_N$, which respectively correspond to the first RB to an $N^{th}$ RB in the N RBs (namely, an example of the frequency domain unit).

It may be understood that, the spatial-frequency matrix $H_{DL}$ defined in this embodiment of this application and the spatial-frequency matrix $H_{DL}'$ determined by using the actual channel above satisfy $H_{DL}'=H_{DL}^H$. This is because the spatial-frequency matrix $H_{DL}$ defined in this application is determined by using the conjugate transpose of the actual channel.

After the angle and the delay are loaded, a channel observed by the terminal device may be represented as:

$$\begin{pmatrix} b(\tau_1)_1^H h_1 S & \cdots & b(\tau_L)_1^H h_1 S \\ \vdots & \ddots & \vdots \\ b(\tau_1)_N^H h_N S & \cdots & b(\tau_L)_N^H h_N S \end{pmatrix}^H.$$

$b(\tau_1)$ to $b(\tau_L)$ may represent L delay vectors in F; $b(\tau_1)_n$ may represent an $n^{th}$ element in N elements in $b(\tau_1)$, $b(\tau_L)_n$ may represent an $n^{th}$ element in N elements in $b(\tau_L)$ and n=1, 2, ..., or N; and S may represent a matrix that is constructed by the K angle vectors and whose dimensions are T×K.

Therefore, $b(\tau_1)_n^H h_n S$ (where n=1, 2, ..., or N, and l=1, 2, ..., or L) may be a row vector whose dimensions are 1×K.

In other words, an $n^{th}$ row in the matrix $$\begin{pmatrix} b(\tau_1)_1^H h_1 S & \cdots & b(\tau_L)_1^H h_1 S \\ \vdots & \ddots & \vdots \\ b(\tau_1)_N^H h_N S & \cdots & b(\tau_L)_N^H h_N S \end{pmatrix}$$

may represent a channel estimation value obtained by performing channel estimation, on the $n^{th}$ RB, on received precoded reference signals of a plurality of ports. Each row in $$\begin{pmatrix} b(\tau_1)_1^H h_1 S & \cdots & b(\tau_L)_1^H h_1 S \\ \vdots & \ddots & \vdots \\ b(\tau_1)_N^H h_N S & \cdots & b(\tau_L)_N^H h_N S \end{pmatrix}$$

may include K×L elements, which may respectively correspond to K×L ports, or K×L angle-delay pairs.

Because the precoded reference signal received by the terminal device passes through the downlink channel, the terminal device can learn of a correlation between downlink channels in RBs, and can complete the foregoing summation operation. That is, a sum of elements in each column in the matrix $$\begin{pmatrix} b(\tau_1)_1^H h_1 S & \cdots & b(\tau_L)_1^H h_1 S \\ \vdots & \ddots & \vdots \\ b(\tau_1)_N^H h_N S & \cdots & b(\tau_L)_N^H h_N S \end{pmatrix}$$

is obtained. That is, a sum of elements that are in $$\begin{pmatrix} b(\tau_1)_1^H h_1 S & \cdots & b(\tau_L)_1^H h_1 S \\ \vdots & \ddots & \vdots \\ b(\tau_1)_N^H h_N S & \cdots & b(\tau_L)_N^H h_N S \end{pmatrix}$$

and that correspond to a same delay vector and a same angle vector is obtained, to obtain $(b(\tau_1)^H H_{DL}' S \cdots b(\tau_L)^H H_{DL}' S)^H$. This operation may be understood as summation of full-band channel estimation values.

$b(\tau_1)^H H_{DL}' S$ (where l=1, 2, ..., or L) may be a row vector whose dimensions are 1×K, and corresponds to the $l^{th}$ delay vector in the L delay vectors. A $k^{th}$ element in the row vector may correspond to the $k^{th}$ angle vector in the K angle vectors. Therefore, the $k^{th}$ element in $b(\tau_1)^H H_{DL}' S$ may correspond to an estimation value $y_n^{(p)}$ that is of a downlink channel and that is obtained by performing channel estimation on the precoded reference signal of the $p^{th}$ port above.

$(b(\tau_1)^H H_{DL}' S \cdots b(\tau_L)^H H_{DL}' S)^H$ is rearranged to obtain a coefficient matrix $C_{DL}$ whose dimensions are K×L, and $$C_{DL} = \begin{bmatrix} b(\tau_1)^H H_{DL}' S \\ \vdots \\ b(\tau_L)^H H_{DL}' S \end{bmatrix}^H.$$

An element in a $k^{th}$ row and an $l^{th}$ column in the coefficient matrix $C_{DL}$ corresponds to the $k^{th}$ angle vector and the $l^{th}$ delay vector, that is, corresponds to the weighting coefficient of the angle-delay pair including the $k^{th}$ angle vector and the $l^{th}$ delay vector.

Therefore, the terminal device may determine, by obtaining a sum of the full-band channel estimation values, the weighting coefficient corresponding to each angle-delay pair that is obtained by combining each angle vector and each delay vector.

It should be noted that, it can be learned from the formula $C_{DL}=(F^H H_{DL}'S)^H$ that, each element in the coefficient matrix $C_{DL}$ is used to determine a weighting coefficient that is in the spatial-frequency matrix $H_{DL}'$ and that corresponds to each angle-delay pair, but is not used to determine a weighting coefficient that is in the spatial-frequency matrix $H_{DL}$ and that corresponds to each angle-delay pair. On the contrary, the estimation value $y_n^{(p)}$ obtained when the terminal device performs channel estimation on the received precoded reference signal may be used to determine a weighting coefficient that is in the spatial-frequency matrix $H_{DL}'$ and that is of the $p^{th}$ angle-delay pair.

However, it may be understood that the spatial-frequency matrix $H_{DL}$ or $H_{DL}'$ may be obtained by performing weighted summation on the P angle-delay pairs. However, operations performed by the network device and the terminal device are different because of different definitions of the spatial-frequency matrix.

It should be understood that a relationship among the spatial-frequency matrix $H_{DL}$, the channel matrix V, and $H_{DL}'$ shown in this specification is merely an example. Different definition manners lead to different relationships among the three matrices. However, regardless of a definition, only internal implementation of the network device and the terminal device is affected. Therefore, this shall not constitute any limitation on this application. Internal implementation behaviors of the network device and the terminal device are not limited in this application.

If the network device groups the RBs, a quantity of ports corresponding to the precoded reference signal carried on each RB may be less than P. However, the terminal device may still perform channel estimation on the precoded reference signal of each port, to determine the P weighting coefficients corresponding to the P angle-delay pairs. In this case, the P weighting coefficients may be respectively determined based on precoded reference signals carried on frequency domain groups. The terminal device does not learn of an angle vector and a delay vector that are used by the network device to precode the reference signal, and does not learn of a correspondence between each frequency domain group and a combination of an angle vector and a delay vector. The terminal device only needs to perform, based on a predefined grouping rule, channel estimation on a precoded reference signal received on each frequency domain group.

The grouping manner shown in FIG. 4 is used as an example. The RB #1, the RB #5, the RB #9, and the RB #13 may be grouped into the frequency domain group #1; the RB #2, the RB #6, the RB #10, and the RB #14 may be grouped into the frequency domain group #2; the RB #3, the RB #7, the RB #11, and the RB #15 may be grouped into the frequency domain group #3; and the RB #4, the RB #8, the RB #12, and the RB #16 may be grouped into the frequency domain group #4.

In this case, the terminal device may determine weighting coefficients of K angle-delay pairs based on the precoded reference signals received on the RB #1, the RB #5, the RB #9, and the RB #13, and the K angle-delay pairs are K angle-delay pairs respectively formed by the K angle vectors and the delay vector $b(\tau_1)$; the terminal device may determine weighting coefficients of K angle-delay pairs based on the precoded reference signals received on the RB #2, the RB #6, the RB #10, and the RB #14, and the K angle-delay pairs are K angle-delay pairs respectively formed by the K angle vectors and the delay vector $b(\tau_2)$; the terminal device may determine weighting coefficients of K angle-delay pairs based on the precoded reference signals received on the RB #3, the RB #7, the RB #11, and the RB #15, and the K angle-delay pairs are K angle-delay pairs respectively formed by the K angle vectors and the delay vector $b(\tau_3)$; and the terminal device may determine weighting coefficients of K angle-delay pairs based on the precoded reference signals received on the RB #4, the RB #8, the RB #12, and the RB #16, and the K angle-delay pairs are K angle-delay pairs respectively formed by the K angle vectors and the delay vector $b(\tau_4)$.

When the network device groups the RBs, the terminal device needs to know the quantity of frequency domain groups in advance. Therefore, the network device may notify the terminal device of the quantity of frequency domain groups in advance by using signaling.

Optionally, the method further includes: The terminal device receives fourth indication information, where the fourth indication information is used to indicate the quantity of frequency domain groups. Correspondingly, the network device sends the fourth indication information.

As described above, the network device may preconfigure the quantity of ports by using higher layer signaling. Therefore, the terminal device may determine, based on existing signaling, the quantity of ports corresponding to the precoded reference signal carried on each RB. When the network device groups the RBs, the network device may further indicate the quantity of frequency domain groups by using the fourth indication information. The terminal device may determine an RB in each frequency domain group based on a same grouping rule, further estimate a downlink channel of each port, and determine the weighting coefficient of each angle-delay pair.

It should be noted that the terminal device and the network device may pre-agree on a grouping rule. The two parties may group the RBs based on the predefined grouping rule, so that quantities of RBs included in each frequency domain group and positions of an RB in each frequency domain group in a frequency domain resource that are determined by the two parties are the same.

In this embodiment, the quantity of frequency domain groups may be equal to the quantity of delay vectors. Optionally, the fourth indication information is used to indicate the value of L. In addition, because P=K×L, when the RBs are grouped, the quantity of ports corresponding to the precoded reference signal carried on each RB is K, and the terminal device may calculate L based on P and K. Therefore, the fourth indication information may directly indicate the value of L. or may indicate the value of L by indicating the value of P. This is not limited in this application. In other words, the fourth indication information may be used to indicate either of L and P.

After determining the P weighting coefficients corresponding to the P angle-delay pairs, the terminal device may generate the first indication information to indicate the P weighting coefficients.

For example, the P weighting coefficients may be indicated by the terminal device in a normalized manner.

For example, the terminal device may determine a weighting coefficient with a largest modulus (for example, denoted as a maximum weighting coefficient) from the P weighting coefficients, and indicate a position of the maximum weighting coefficient in the P weighting coefficients. The terminal device may further indicate relative values of P−1 remaining weighting coefficients relative to the maximum weighting coefficient. The terminal device may indicate the P−1 weighting coefficients by using quantized value indexes of the relative values. For example, the network device and the terminal device may predefine a one-to-one correspondence between a plurality of quantized values and a plurality of indexes, and the terminal device may feed back the relative values of the weighting coefficients relative to the maximum weighting coefficient to the network device based on the one-to-one correspondence. Because the terminal device quantizes the weighting coefficients, and a quantized value may be the same as or close to an actual value, the quantized value is referred to as a quantized value of the weighting coefficient.

When indicating the P weighting coefficients by using the first indication information, the terminal device may construct, based on the K angle vectors and the L delay vectors, a matrix whose dimensions are K×L. An element in a $k^{th}$ row and an $l^{th}$ column in the matrix may be a weighting coefficient corresponding to the $k^{th}$ angle vector and the $l^{th}$ delay vector, that is, the weighting coefficient of the $p^{th}$ angle-delay pair including the $k^{th}$ angle vector and the $l^{th}$ delay vector. The network device may restore, based on a same manner, the P weighting coefficients corresponding to the P angle-delay pairs.

Certainly, the terminal device may also construct, based on the L delay vectors and the K angle vectors, a matrix whose dimensions are L×K. A correspondence between each element in the matrix and an angle-delay pair is similar to that described above. An element in an $l^{th}$ row and a $k^{th}$ column in the matrix may be a weighting coefficient corresponding to the $l^{th}$ delay vector and the $k^{th}$ angle vector, that is, the weighting coefficient of the $p^{th}$ angle-delay pair including the $l^{th}$ delay vector and the $k^{th}$ angle vector. The network device may restore, based on a same manner, the P weighting coefficients corresponding to the P angle-delay pairs.

It should be understood that the P weighting coefficients are indicated by constructing a matrix, to indicate a correspondence among each weighting coefficient, an angle vector, and a delay vector. This is merely a possible implementation, and shall not constitute any limitation on this application. For example, the terminal device may alternatively sequentially indicate the P weighting coefficients in a pre-agreed sequence. For example, in a manner of first traversing the L delay vectors and then traversing the K angle vectors, or in a manner of first traversing the K angle vectors and then traversing the L delay vectors, the P weighting coefficients corresponding to the P angle-delay pairs are arranged into an ordered array, so that the network device determines a position of each weighting coefficient in the ordered array. The network device may restore, based on a same manner, the P weighting coefficients corresponding to the P angle-delay pairs.

It should be understood that indication of the weighting coefficients in the normalized manner that is listed above is merely a possible implementation, and shall not constitute any limitation on this application. A specific manner of indicating the weighting coefficient by the terminal device is not limited in this application. For example, a quantized value index of each of the Lx weighting coefficients may also be indicated.

It should be noted that the normalization mentioned above may be determining the maximum weighting coefficient by using each receive antenna as a unit, to perform normalization within a range of quantized information corresponding to each receive antenna. However, this shall not constitute any limitation on this application. For example, in this embodiment, the terminal device may alternatively determine the maximum weighting coefficient by using a plurality of receive antennas, one polarization direction, a plurality of polarization directions, or one port as a unit, to perform normalization within a range of quantized information corresponding to the plurality of receive antennas, each polarization direction, the plurality of polarization directions, or the port.

It should be further understood that when the first indication information is used to indicate the P weighting coefficients, a direct manner or an indirect manner may be used for indication. For example, for the maximum weighting coefficient, the position of the maximum weighting coefficient in the P weighting coefficients may be indicated. For another example, for a weighting coefficient whose quantized value is zero, a position of the weighting coefficient in the P weighting coefficients may also be indicated. In other words, the first indication information does not necessarily indicate each of the P weighting coefficients, provided that the network device can restore the P weighting coefficients based on the first indication information.

It should be noted that a specific process in which the terminal device generates the first indication information is described in detail above by using one polarization direction and one receive antenna as an example. In other words, the P weighting coefficients may be determined based on a precoded reference signal that is sent by a transmit antenna in one polarization direction and that is received by one receive antenna. However, this shall not constitute any limitation on this application.

When a plurality of receive antennas are configured for the terminal device, the receive antenna described above as an example may be any one of the plurality of receive antennas configured for the terminal device. In other words, the terminal device may determine the P weighting coefficients for each receive antenna based on the foregoing method.

When transmit antennas in a plurality of polarization directions are configured for the network device, the polarization direction described above as an example may be any one of the plurality of polarization directions. In other words, the terminal device may determine, based on the foregoing method, the P weighting coefficients based on a precoded reference signal sent by the transmit antenna in each polarization direction.

If a quantity of polarization directions is 1, a quantity of receive antennas is R, and R is an integer greater than 1, the first indication information may be used to indicate R groups of weighting coefficients corresponding to the R receive antennas, and each group of weighting coefficients may include P weighting coefficients. Herein, P weighting coefficients corresponding to one receive antenna are P weighting coefficients determined based on a precoded reference signal received on the receive antenna.

Optionally, the first indication information includes R sets of indication information, and each set of indication information corresponds to one receive antenna. Each set of indication information is used to indicate P weighting coefficients corresponding to the receive antenna.

The terminal device may indicate, in the normalized manner by using each receive antenna as a unit, the P weighting coefficients corresponding to each receive antenna.

Optionally, when the first indication information is used to indicate the R×P weighting coefficients of the R receive antennas, the normalized manner may be used for indication by using a plurality of receive antennas as a unit.

That is, a maximum weighting coefficient may be determined from the R×P weighting coefficients corresponding to the plurality of receive antennas, to indicate a position of the maximum weighting coefficient. The terminal device may further determine relative values of R×P−1 remaining weighting coefficients relative to the maximum weighting coefficient, to indicate the R×P−1 weighting coefficients by using quantized value indexes of the relative values.

It should be understood that a specific method for performing, by the terminal device, normalization within a range of quantized information of a plurality of receive antennas is the same as that for performing normalization within a range of quantized information of one receive antenna. For brevity, details are not described herein again.

It should be further understood that when indicating the weighting coefficients of the plurality of receive antennas in the normalized manner, the terminal device may sequentially indicate the weighting coefficients in a pre-agreed sequence. For example, weighting coefficients other than a normalization coefficient may be sequentially indicated in a predefined indication sequence of the R receive antennas. A sequence in which the terminal device indicates the weighting coefficients is not limited in this application, provided that the network device can restore, based on the first indication information, the R×P weighting coefficients corresponding to the R receive antennas.

If a quantity of receive antennas is 1, a quantity of polarization directions is J, and J is an integer greater than 1, the first indication information may be used to indicate J groups of weighting coefficients corresponding to the J polarization directions, and each group of weighting coefficients may include P weighting coefficients. Herein, P weighting coefficients corresponding to one polarization direction are P weighting coefficients determined based on a precoded reference signal transmitted in the polarization direction.

Optionally, the first indication information includes J sets of indication information, and each set of indication information corresponds to one polarization direction. Each set of indication information is used to indicate P weighting coefficients corresponding to the polarization direction.

The terminal device may indicate, in the normalized manner by using each polarization direction as a unit, the P weighting coefficients corresponding to each polarization direction.

Optionally, when the first indication information is used to indicate the J×P weighting coefficients in the J polarization directions, the normalized manner may be used for indication by using the J polarization directions as a unit.

That is, a maximum weighting coefficient may be determined from the J×P weighting coefficients corresponding to the plurality of polarization directions, to indicate a position of the maximum weighting coefficient. The terminal device may further determine relative values of J×P−1 remaining weighting coefficients relative to the maximum weighting coefficient, to indicate the J×P−1 weighting coefficients by using quantized value indexes of the relative values.

It should be understood that a specific method for performing, by the terminal device, normalization within a range of quantized information in a plurality of polarization directions is the same as that for performing normalization within a range of quantized information in one polarization direction. For brevity, details are not described herein again.

It should be further understood that when indicating the weighting coefficients in the plurality of polarization directions in the normalized manner, the terminal device may sequentially indicate the weighting coefficients in a pre-agreed sequence. For example, weighting coefficients other than a normalization coefficient may be sequentially indicated in a predefined indication sequence of the J polarization directions. A sequence in which the terminal device indicates the weighting coefficients is not limited in this application, provided that the network device can restore, based on the first indication information, the J×P weighting coefficients corresponding to the J polarization directions.

If a quantity of receive antennas is R and a quantity of polarization directions is J, the first indication information may be used to indicate J×R×P weighting coefficients corresponding to the J polarization directions and the R receive antennas.

A weighting coefficient corresponding to one polarization direction and one receive antenna may be a weighting coefficient determined based on a precoded reference signal that is sent by a transmit antenna in the polarization direction and that is received on the receive antenna.

Optionally, when the first indication information is used to indicate the J×R×P weighting coefficients corresponding to the J polarization directions and the R receive antennas, the normalized manner may be used for indication by using the J polarization directions and the R receive antennas as a unit.

Alternatively, when the first indication information is used to indicate the J×R×P weighting coefficients corresponding to the J polarization directions and the R receive antennas, the normalized manner may be used for indication by using one polarization direction and the R receive antennas as a unit. For example, the first indication information includes 1 sets of indication information, and each set of indication information corresponds to one polarization direction and R receive antennas. Each set of indication information is used to indicate R×P weighting coefficients corresponding to the polarization direction and the R receive antennas.

Optionally, when the first indication information is used to indicate the J×R×P weighting coefficients corresponding to the J polarization directions and the R receive antennas, the normalized manner may be used for indication by using the J polarization directions and one receive antenna as a unit. For example, the first indication information includes R sets of indication information, and each set of indication information corresponds to one receive antenna and J polarization directions. Each set of indication information is used to indicate J×P weighting coefficients corresponding to the receive antenna and the J polarization directions.

Optionally, when the first indication information is used to indicate the J×R×P weighting coefficients corresponding to the J polarization directions and the R receive antennas, the normalized manner may be used for indication by using one polarization direction and one receive antenna as a unit. For example, the first indication information includes J×R sets of indication information, and each set of indication information corresponds to one polarization direction. Each set of indication information is used to indicate P weighting coefficients corresponding to the polarization direction and the receive antenna.

A unit for normalization and a specific indication manner are not limited in this application.

It should be understood that a specific method for indicating the plurality of weighting coefficients by the terminal device in the normalized manner has been described in detail above. For brevity, details are not described herein again.

It should be further understood that when indicating the weighting coefficients of the plurality of receive antennas in the plurality of polarization directions in the normalized manner, the terminal device may sequentially indicate the weighting coefficients in a pre-agreed sequence. For example, weighting coefficients other than a normalization coefficient may be sequentially indicated in a predefined indication sequence of the J polarization directions and the R receive antennas. A sequence of indicating the weighting coefficients by the terminal device is not limited in this application, provided that the network device can restore, based on the first indication information, the J×R×P weighting coefficients of the J polarization directions and the R receive antennas.

It should be further understood that indication of the weighting coefficients in the normalized manner is merely a possible implementation, and shall not constitute any limitation on this application. A specific manner of indicating the weighting coefficients by using the first indication information is not limited in this application.

When a weighting coefficient is fed back based on a receive antenna, the terminal device may further indicate a quantity of receive antennas. Optionally, the method 200 further includes: The terminal device sends seventh indication information, where the seventh indication information is used to indicate the quantity of receive antennas. Correspondingly, the network device receives the seventh indication information.

The seventh indication information and the first indication information may be carried in same signaling, for example, a precoding matrix indicator (PMI) or CSI, for sending, or may be sent by using different signaling. This is not limited in this application.

It should be understood that the quantity of receive antennas of the terminal device may alternatively be predefined, for example, defined in a protocol. In this case, the terminal device may not indicate the quantity of receive antennas by using additional signaling.

Actually, that the terminal device feeds back a measurement result of a downlink channel is not limited to that the terminal device feeds back the measurement result of the downlink channel based on each receive antenna. The terminal device may alternatively feed back the measurement result of the downlink channel based on a transport layer.

After determining, based on the foregoing method, the weighting coefficient corresponding to each polarization direction and each receive antenna, the terminal device may further process the weighting coefficient, to obtain a weighting coefficient fed back based on each transport layer.

That the quantity of polarization directions is J and the quantity of receive antennas is R is still used as an example. The terminal device may construct a coefficient matrix based on the J×R×P weighting coefficients corresponding to the J polarization directions and the R receive antennas. The coefficient matrix may be a matrix with J×P rows and R columns, and elements in each column may be J×P weighting coefficients corresponding to one receive antenna.

An example of the coefficient matrix is shown below:

$$\begin{bmatrix} \alpha_{1,1} & \alpha_{1,2} & \cdots & \alpha_{1,R} \\ \vdots & \vdots & \cdots & \vdots \\ \alpha_{P,1} & \alpha_{P,2} & \cdots & \alpha_{P,R} \\ \alpha_{P+1,1} & \alpha_{P+1,2} & \cdots & \alpha_{P+1,R} \\ \vdots & \vdots & \cdots & \vdots \\ \alpha_{2P,1} & \alpha_{2P,2} & \cdots & \alpha_{2P,R} \end{bmatrix}.$$

The quantity J of polarization directions is equal to 2. The first row to a $P^{th}$ row in the coefficient matrix may include weighting coefficients corresponding to one polarization direction, and $\alpha_{p,r}$ may represent a weighting coefficient corresponding to a $p^{th}$ angle-delay pair and an $r^{th}$ receive antenna in a first polarization direction. A $(P+1)^{th}$ row to a $2P^{th}$ row in the coefficient matrix may include weighting coefficients corresponding to another polarization direction, and $\alpha_{P+p,r}$ may represent a weighting coefficient corresponding to a $p^{th}$ angle-delay pair and an $r^{th}$ receive antenna in a second polarization direction. p=1, 2, . . . , or P; and r=1, 2, . . . , or R.

The terminal device may perform singular value decomposition (SVD) on the coefficient matrix to obtain the weighting coefficient fed back based on the transport layer.

Assuming that a quantity of transport layers is Z, the weighting coefficient fed back based on the transport layer may include Z×P weighting coefficients.

The terminal device may indicate the Z×P weighting coefficients in the normalized manner. For example, the terminal device may indicate, in the normalized manner by using one transport layer as a unit, P weighting coefficients corresponding to each transport layer. Alternatively, the terminal device may indicate, in the normalized manner by using the Z transport layers as a unit, the Z×P weighting coefficients corresponding to the Z transport layers.

It should be understood that a specific method for indicating the plurality of weighting coefficients by the terminal device in the normalized manner has been described in detail above. For brevity, details are not described herein again.

It should be further understood that indication of the weighting coefficients in the normalized manner is merely a possible implementation, and shall not constitute any limitation on this application. A specific manner of indicating the weighting coefficients by using the first indication information is not limited in this application.

When a weighting coefficient is fed back based on a transport layer, the terminal device may further indicate a quantity of transport layers. Optionally, the method 200 further includes: The terminal device sends eighth indication information, where the eighth indication information is used to indicate the quantity of transport layers. Correspondingly, the network device receives the eighth indication information.

Optionally, the eighth indication information is a rank indicator (RI).

It should be understood that the RI is merely an example of the eighth indication information, and shall not constitute any limitation on this application. A specific form of the sixth indication information is not limited in this application.

It should be further understood that the eighth indication information and the first indication information may be carried in same signaling, for example, CSI, for sending, or may be sent by using different signaling. This is not limited in this application.

It should be further understood that the method for constructing a coefficient matrix and performing SVD on the coefficient matrix to determine a weighting coefficient corresponding to each transport layer that is listed above is merely an example, and shall not constitute any limitation on this application. A specific method for determining the weighting coefficient of each transport layer is not limited in this application.

Step 230: The terminal device sends the first indication information. Correspondingly, the network device receives the first indication information.

Specifically, the first indication information may be, for example, CSI, or may be some information elements in CSI, or may be other information. This is not limited in this application. The first indication information may be carried in one or more messages in the conventional technology and sent by the terminal device to the network device, or may be carried in one or more newly designed messages and sent by the terminal device to the network device. For example, the terminal device may send the first indication information to the network device by using a physical uplink resource such as a physical uplink shared channel (PUSCH) or a physical uplink control channel (PUCCH), so that the network device determines the precoding matrix based on the first indication information.

A specific method for sending the first indication information by the terminal device to the network device by using the physical uplink resource may be the same as that in the conventional technology. For brevity, detailed descriptions of a specific process are omitted herein.

Step 240: The network device determines the precoding matrix based on the first indication information.

As described above, the terminal device may feed back the weighting coefficient based on the receive antenna, or may feed back the weighting coefficient based on the transport layer. The network device may determine the precoding matrix based on the first indication information and based on different feedback granularities.

If the terminal device feeds back the weighting coefficient based on the receive antenna, the weighting coefficient indicated by the first indication information may include a weighting coefficient corresponding to one or more receive antennas. The network device may reconstruct a downlink channel based on a weighting coefficient corresponding to each receive antenna and an angle-delay pair corresponding to each weighting coefficient, to further determine a precoding matrix of each RB.

Specifically, P weighting coefficients corresponding to each receive antenna may be in a one-to-one correspondence with P angle-delay pairs. The network device may construct, based on the P weighting coefficients corresponding to each receive antenna and an angle vector and a delay vector that are included in each of the P angle-delay pairs, a spatial-frequency matrix corresponding to each receive antenna.

In this embodiment, a spatial-frequency matrix corresponding to an $r^{th}$ receive antenna may be determined by using P angle-delay pairs and P weighting coefficients corresponding to the $r^{th}$ receive antenna. The P angle-delay pairs may be used to construct P spatial-frequency component matrices. As described above, the spatial-frequency component matrix $a(\theta_k) \times b(\tau_l)^H$ may be constructed by using the $k^{th}$ angle vector $a(\theta_k)$ in the K angle vectors and the $l^{th}$ delay vector $b(\tau_l)$ in the L delay vectors. The spatial-frequency matrix $H_{DL}^{(r)}$ corresponding to the $r^{th}$ receive antenna may be a weighted sum of the P spatial-frequency component matrices. That is, $$H_{DL}^{(r)} = \sum_{l=1}^{L}\sum_{k=1}^{K} \alpha_{k,l}^{(r)} a(\theta_k) \times b(\tau_l)^H \cdot \alpha_{k,l}^{(r)}$$

$\alpha_{k,l}^{(r)}$ represents a weighting coefficient that is fed back based on the $r^{th}$ receive antenna and that corresponds to the $k^{th}$ angle vector and the $l^{th}$ delay vector. Dimensions of the spatial-frequency matrix may be T×N.

It is assumed that in the calculation formula of the spatial-frequency matrix $H_{DL}^{(r)}$, the K angle vectors and the L delay vectors are shared by each other. When delay vectors corresponding to at least two angle vectors are different, the foregoing formula may be transformed into:

$$H_{DL}^{(r)} = \sum_{l_k=1}^{L_k}\sum_{k=1}^{K} \alpha_{k,l_k}^{(r)} a(\theta_k) \times b(\tau_{l_k})^H.$$

Alternatively, when angle vectors corresponding to at least two delay vectors are different, the foregoing formula may be transformed into:

$$H_{DL}^{(r)} = \sum_{l=1}^{L}\sum_{k_l=1}^{K_l} \alpha_{k_l,l}^{(r)} a(\theta_{k_l}) \times b(\tau_l)^H.$$

For ease of description, $$H_{DL}^{(r)} = \sum_{l=1}^{L}\sum_{k=1}^{K} \alpha_{k,l}^{(r)} a(\theta_k) \times b(\tau_l)^H$$

is used as an example for description below. It may be understood that regardless of whether delay vectors corresponding to angle vectors are the same, or whether angle vectors corresponding to delay vectors are the same, determining of the precoding matrix is not affected.

It should be noted that, for ease of understanding, the foregoing uses one polarization direction of the transmit antenna as an example to describe a specific process of determining the spatial-frequency matrix corresponding to the receive antenna. However, this shall not constitute any limitation on this application. When the quantity of polarization directions of the transmit antenna is greater than 1, the network device may still determine, based on the foregoing method, the spatial-frequency matrix corresponding to each receive antenna.

For example, if the quantity of polarization directions is 2, the spatial-frequency matrix corresponding to the $r^{th}$ receive antenna may be determined by using the following calculation formula $$H_{DL}^{(r)} = \begin{bmatrix} \sum_{l=1}^{L}\sum_{k=1}^{K} \alpha_{k,l,1}^{(r)} a(\theta_k) \times b(\tau_l)^H \\ \sum_{l=1}^{L}\sum_{k=1}^{K} \alpha_{k,l,2}^{(r)} a(\theta_k) \times b(\tau_l)^H \end{bmatrix}.$$

$\alpha_{k,l,1}^{(r)}$ represents a weighting coefficient that is fed back based on the $r^{th}$ receive antenna and that corresponds to the $k^{th}$ angle vector and the $l^{th}$ delay vector in the first polarization direction; and $\alpha_{k,l,2}^{(r)}$ represents a weighting coefficient that is fed back based on the $r^{th}$ receive antenna and that corresponds to the $k^{th}$ angle vector and the $l^{th}$ delay vector in the second polarization direction.

It should be understood that the foregoing calculation formula of the spatial-frequency matrix $H_{DL}^{(r)}$ that is defined for the two polarization directions is merely an example, and shall not constitute any limitation on this application. For example, quantities of delay vectors and/or angle vectors loaded in different polarization directions may be the same or may be different, and delay vectors and/or angle vectors loaded in different polarization directions may be the same or may be different.

For the R receive antennas, the network device may determine spatial-frequency matrices $H_{DL}^{(1)}$ and $H_{DL}^{(2)}$ to $H_{DL}^{(R)}$ based on the P weighting coefficients corresponding to each receive antenna. Therefore, the network device may determine a downlink channel matrix corresponding to each RB.

The $n^{th}$ RB in the N RBs is used as an example. The network device may determine a conjugate transpose $(V^{(n)})^H$ of a downlink channel matrix corresponding to the $n^{th}$ RB. The matrix $(V^{(n)})^H$ may be determined by using an $n^{th}$ column vector in each of the R spatial-frequency matrices $H_{DL}^{(1)}$ and $H_{DL}^{(2)}$ to $H_{DL}^{(R)}$ that are respectively determined based on the R receive antennas. For example, an $n^{th}$ column in $H_{DL}^{(1)}$ is used as the first column in the matrix $(V^{(n)})^H$, an $n^{th}$ column in $H_{DL}^{(2)}$ is used as the second column in the matrix $(V_{(n)})^H$, and by analogy, an $n^{th}$ column in $H_{DL}^{(r)}$ may be used as an $r^{th}$ column in the matrix $(V^{(n)})^H$. Therefore, a matrix $(V^{(n)})^H$ may be obtained, to determine a downlink channel matrix $V^{(n)}$ corresponding to the $n^{th}$ RB.

The downlink channel matrix corresponding to each RB may be determined based on the foregoing method.

The network device may further determine the precoding matrix of each RB based on the downlink channel matrix of each RB. For example, the network device may determine the precoding matrix by performing SVD on the downlink channel matrix or a covariance matrix of the channel matrix, or may determine the precoding matrix by performing eigenvalue decomposition (EVD) on a covariance matrix of the downlink channel matrix.

It should be understood that, for a specific manner of determining the precoding matrix by the network device based on the channel matrix, refer to the conventional technology. A manner of determining the precoding matrix is not limited in this application.

It should be further understood that, merely for ease of understanding, the foregoing shows a specific process in which the network device determines the downlink channel matrix based on the spatial-frequency matrix, to further determine the precoding matrix. However, this shall not constitute any limitation on this application. Alternatively, the network device may directly determine the precoding matrix based on the spatial-frequency matrix.

If the terminal device feeds back the weighting coefficient based on the transport layer, the weighting coefficient indicated by the first indication information may include a weighting coefficient of one or more transport layers. The network device may determine, based on a weighting coefficient corresponding to each transport layer and an angle-delay pair corresponding to each weighting coefficient, a spatial-frequency matrix corresponding to each transport layer, to further determine a precoding matrix of each RB.

Specifically, P weighting coefficients corresponding to each transport layer may be in a one-to-one correspondence with P angle-delay pairs. The network device may construct, based on the P weighting coefficients corresponding to each transport layer and an angle vector and a delay vector that are included in each of the P angle-delay pairs, a precoding vector corresponding to the transport layer.

In this embodiment, a spatial-frequency matrix $H_{DL}^{(z)}$ corresponding to a $z^{th}$ transport layer may be determined by using P angle-delay pairs and P weighting coefficients corresponding to the $z^{th}$ transport layer. The P angle-delay pairs may be used to construct P spatial-frequency component matrices. A precoding vector corresponding to the $z^{th}$ transport layer may be a weighted sum of the P spatial-frequency component matrices. That is, $$H_{DL}^{(z)} = \sum_{l=1}^{L}\sum_{k=1}^{K}\alpha_{k,l}^{(z)}a(\theta_k)\times b(\tau_l)^H \cdot \alpha_{k,l}^{(r)}$$

$\alpha_{k,l}^{(r)}$ represents a weighting coefficient that is fed back based on the $r^{th}$ receive antenna and that corresponds to the $k^{th}$ angle vector and the $l^{th}$ delay vector. Dimensions of the spatial-frequency matrix may be T×N.

It is assumed that in the calculation formula of the spatial-frequency matrix $H_{DL}^{(z)}$, the K angle vectors and the L delay vectors are shared by each other. When delay vectors corresponding to at least two angle vectors are different, the foregoing formula may be transformed into:

$$H_{DL}^{(z)} = \sum_{l_k=1}^{L_k}\sum_{k=1}^{K}\alpha_{k,l_k}^{(z)}a(\theta_k)\times b(\tau_{l_k})^H.$$

Alternatively, when angle vectors corresponding to at least two delay vectors are different, the foregoing formula may be transformed into:

$$H_{DL}^{(z)} = \sum_{l=1}^{L}\sum_{k_l=1}^{K_l}\alpha_{k_l,l}^{(z)}a(\theta_{k_l})\times b(\tau_l)^H.$$

For ease of description, $$H_{DL}^{(z)} = \sum_{l=1}^{L}\sum_{k=1}^{K}\alpha_{k,l}^{(z)}a(\theta_k)\times b(\tau_l)^H.$$

is used as an example for description below. It may be understood that regardless of whether delay vectors corresponding to angle vectors are the same, or whether angle vectors corresponding to delay vectors are the same, determining of the precoding matrix is not affected.

It should be noted that, for ease of understanding, the foregoing uses one polarization direction of the transmit antenna as an example to describe a specific process of determining the spatial-frequency matrix corresponding to the receive antenna. However, this shall not constitute any limitation on this application. When the quantity of polarization directions of the transmit antenna is greater than 1, the network device may still determine, based on the foregoing method, the spatial-frequency matrix corresponding to each receive antenna.

For example, if the quantity of polarization directions is 2, the spatial-frequency matrix corresponding to the $r^{th}$ receive antenna may be determined by using the following calculation formula:

$$H_{DL}^{(z)} = \begin{bmatrix} \sum_{l=1}^{L}\sum_{k=1}^{K}\alpha_{k,l,1}^{(z)}a(\theta_k)\times b(\tau_l)^H \\ \sum_{l=1}^{L}\sum_{k=1}^{K}\alpha_{k,l,2}^{(z)}a(\theta_k)\times b(\tau_l)^H \end{bmatrix}.$$

$\alpha_{k,l,1}^{(z)}$ represents a weighting coefficient that is fed back based on the $z^{th}$ transport layer and that corresponds to the $k^{th}$ angle vector and the $l^{th}$ delay vector in the first polarization direction; and $\alpha_{k,l,2}^{(z)}$ represents a weighting coefficient that is fed back based on the $z^{th}$ transport layer and that corresponds to the $k^{th}$ angle vector and the $l^{th}$ delay vector in the second polarization direction.

It should be understood that the foregoing calculation formula of the spatial-frequency matrix $H_{DL}^{(z)}$ that is defined for the two polarization directions is merely an example, and shall not constitute any limitation on this application. For example, quantities of delay vectors and/or angle vectors loaded in different polarization directions may be the same or may be different, and delay vectors and/or angle vectors loaded in different polarization directions may be the same or may be different.

For the Z transport layers, the network device may determine, based on the P weighting coefficients corresponding to each transport layer, spatial-frequency matrices $H_{DL}^{(1)}$ and $H_{DL}^{(2)}$ to $H_{DL}^{(Z)}$ corresponding to the transport layers. Therefore, the network device may determine a precoding matrix $W^{(n)}$ corresponding to each RB. The precoding matrix $W^{(n)}$ corresponding to the $n^{th}$ RB may be constructed by using an $n^{th}$ column vector in each of the Z spatial-frequency matrices $H_{DL}^{(1)}$ and $H_{DL}^{(2)}$ to $H_{DL}^{(Z)}$ that are respectively determined based on the Z transport layers. For example, an $n^{th}$ column in $H_{DL}^{(1)}$ is used as the first column in the downlink channel matrix $W^{(n)}$, an $n^{th}$ column in $H_{DL}^{(2)}$ is used as a second column in the downlink channel matrix $W^{(n)}$, and by analogy, an $n^{th}$ column in $H_{DL}^{(z)}$ is used as a $z^{th}$ column in the downlink channel matrix $W^{(n)}$. The precoding matrix corresponding to each RB may be determined based on the foregoing method.

It should be understood that, merely for ease of understanding, the foregoing describes in detail a specific process of determining the precoding matrix by the network device by using the spatial-frequency component matrix as an example. However, this shall not constitute any limitation on this application. Alternatively, the network device may determine P spatial-frequency component vectors based on the P angle-delay pairs, to further determine the precoding matrix. A person skilled in the art may construct P spatial-frequency basic units in different forms based on the P angle-delay pairs, to further determine the precoding matrix. A manner of constructing the P spatial-frequency basic units in different forms based on the P angle-delay pairs, and then determining the precoding matrix based on a weighted sum of the P spatial-frequency basic units shall fall within the protection scope claimed in this application.

It should be further understood that the foregoing is merely an example, and shows a possible implementation in which the network device determines the precoding matrix based on the first indication information. However, this shall not constitute any limitation on this application. A specific implementation in which the network device determines the precoding matrix based on the first indication information is not limited in this application. Based on a same concept, a person skilled in the art performs transformation or equivalent replacement on the foregoing listed matrix operation, and a method for determining a precoding matrix shall fall within the protection scope of this application.

It should be further understood that the precoding matrix determined above is a precoding matrix corresponding to an RB. Herein, the RB is an example of a frequency domain unit. The precoding matrix corresponding to the RB may be a precoding matrix determined at a granularity of an RB based on a channel matrix corresponding to the RB, or a precoding matrix determined based on a precoded reference signal received on the RB, and may be used to precode data transmitted by using the RB. A downlink channel corresponding to the RB may be a downlink channel determined based on the precoded reference signal received on the RB, and may be used to determine the precoding matrix corresponding to the RB.

When the granularity of the frequency domain unit is relatively large, for example, when the frequency domain unit is a subband, a PRG, or a PRB, the network device may determine the precoding matrix for the frequency domain unit based on the precoding matrix corresponding to each RB in each frequency domain unit.

If each frequency domain unit includes one RB used to carry a reference signal, the network device may use a precoding matrix corresponding to the RB as a precoding matrix corresponding to the frequency domain unit to which the RB belongs. If each frequency domain unit includes a plurality of RBs used to carry a reference signal, the network device may perform, for example, SVD after averaging correlation matrices of precoding matrices corresponding to a plurality of RBs in a same frequency domain unit, to determine a precoding matrix corresponding to the frequency domain unit. For another example, the network device may use an average of precoding matrices corresponding to a plurality of RBs in a same frequency domain unit as a precoding matrix corresponding to the frequency domain unit.

It should be understood that, for a specific method for determining, by the network device, the precoding matrix of the frequency domain unit based on the precoding matrices corresponding to the plurality of RBs in the frequency domain unit, refer to the technology, and the method is not limited to the foregoing enumerated method. A specific method for determining, by the network device, the precoding matrices corresponding to the plurality of RBs in the frequency domain unit is not limited in this application.

It should be further understood that the weighting coefficient that is mentioned in the foregoing descriptions and that corresponds to an angle vector and a delay vector is a weighting coefficient corresponding to an angle-delay pair including the angle vector and the delay vector. For example, the weighting coefficient corresponding to the $k^{th}$ angle vector and the $l^{th}$ delay vector is the weighting coefficient corresponding to the angle-delay pair including the $k^{th}$ angle vector and the $l^{th}$ delay vector. For brevity, examples are not described one by one herein.

In the embodiments of this application, the network device may precode a downlink reference signal based on an angle and a delay that are determined through uplink channel measurement, so that the terminal device performs downlink channel measurement based on the precoded reference signal. Because the network device precodes the reference signal based on reciprocity between angles and delays on uplink and downlink channels, information about the downlink channel detected by the terminal device is information that has no reciprocity. Therefore, the terminal device may not need to feed back a space domain vector and a frequency domain vector (for example, the foregoing angle vector and delay vector), but only needs to feed back a weighting coefficient corresponding to each angle-delay pair, thereby greatly reducing feedback overheads of the terminal device. In addition, a downlink channel measurement process of the terminal device is simplified, and calculation complexity of the terminal device in the channel measurement process is reduced by using the reciprocity between the uplink and downlink channels. In addition, a precoding matrix is constructed through linear superposition of a plurality of space domain vectors and a plurality of frequency domain vectors, so that the precoding matrix determined by the network device can adapt to a downlink channel, thereby still ensuring relatively high feedback precision while reducing the feedback overheads. Further, space-domain precoding is performed on the downlink reference signal, so that a quantity of ports for a reference signal can be reduced, thereby reducing pilot overheads.

It should be understood that, in the embodiments of this application, merely for ease of understanding, a specific process of performing downlink channel measurement and determining the precoding matrix when the spatial-frequency matrix is obtained based on the conjugate transpose of the actual channel is shown. However, this shall not constitute any limitation on this application. A relationship between the actual channel and the spatial-frequency matrix $H_{DL}$ is not fixed. Different definitions of the spatial-frequency matrix and the spatial-frequency component matrix may change the relationship between the actual channel and the spatial-frequency matrix $H_{DL}$. For example, the spatial-frequency matrix $H_{DL}$ may be obtained based on the conjugate transpose of the actual channel, or may be obtained based on a transpose of the actual channel.

When a relationship between the spatial-frequency matrix and the channel matrix is defined differently, operations performed by the network device when the delay and the angle are loaded are also different, and operations performed by the terminal device when the terminal device performs channel measurement and performs feedback correspondingly change. However, these are only implementation behaviors of the terminal device and the network device, and shall not constitute any limitation on this application. The definition of the channel matrix, the dimensions and the definition of the spatial-frequency matrix, and a transformation relationship between the channel matrix and the spatial-frequency matrix are not limited in this application. Similarly, a transformation relationship between the spatial-frequency matrix and the precoding matrix is not limited in this application either.

In the foregoing method embodiments, the channel measurement method provided in this application is described in detail by using an example in which the reference signal is precoded based on the angle vector and the delay vector. However, this shall not constitute any limitation on this application. Alternatively, the network device may precode the reference signal based on only the delay vector, so that the terminal device performs downlink channel measurement based on the precoded reference signal.

For ease of understanding, in the embodiments shown below, a polarization direction is first used as an example to describe in detail a channel measurement method 300 provided in the embodiments of this application. It should be understood that the polarization direction may be any one of one or more polarization directions of a transmit antenna that are configured by a network device. In other words, for a precoded reference signal transmitted by a transmit antenna in any polarization direction, a terminal device may perform channel measurement based on the method 300 provided in the embodiments of this application, or the network device may determine a precoding matrix based on the method 300 provided in the embodiments of this application. It should be further understood that a quantity of polarization directions of a transmit antenna is not limited in this application. For example, there may be one polarization direction, namely, a single polarization direction, or there may be a plurality of polarization directions, for example, dual polarization directions.

Figure 8:
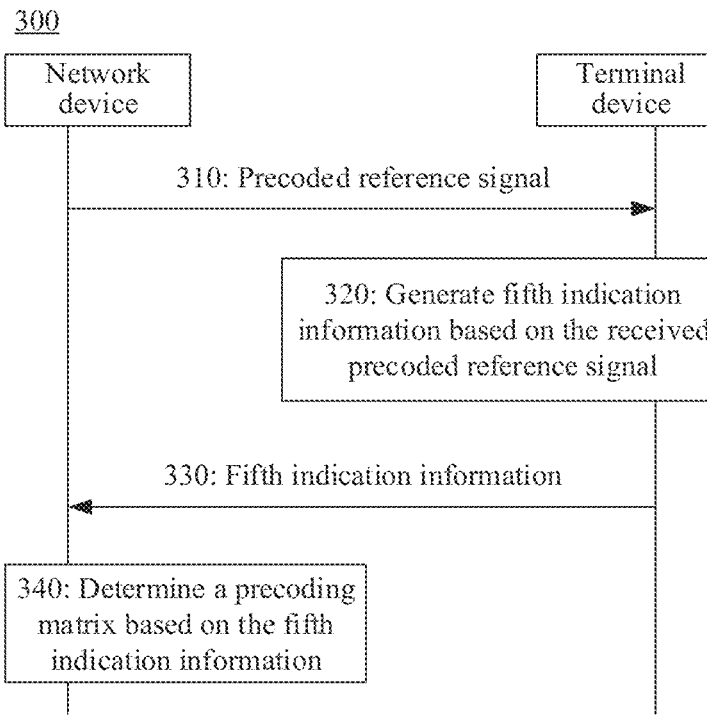
FIG. 8 is a schematic flowchart of a channel measurement method according to another embodiment of this application.

FIG. 8 is a schematic flowchart of the channel measurement method 300 from a perspective of device interaction according to an embodiment of this application. As shown in the figure, the method 300 may include step 310 to step 340. The following describes the steps in the method 300 in detail.

Step 310: The terminal device receives a precoded reference signal, where the precoded reference signal is obtained by precoding a reference signal based on L delay vectors. Correspondingly, the network device sends the precoded reference signal. L≥1 and L is an integer.

In this embodiment, the network device may precode the reference signal based on the L delay vectors. Because space-domain precoding is not performed on the reference signal, before the reference signal is precoded based on the delay vector, the reference signal may correspond to T transmit antenna ports. T is a quantity of transmit antenna ports in one polarization direction, and T≥1 and T is an integer.

The reference signal is precoded based on the delay vector. Specifically, frequency-domain precoding is performed, and an obtained precoded reference signal may correspond to one or more groups of ports. Each group of ports may correspond to a precoded reference signal obtained by precoding reference signals of the T transmit antenna ports based on a same delay vector. Each group of ports may include a maximum of T ports, and the T ports may correspond to the T transmit antenna ports. Therefore, a precoded reference signal of each port may correspond to one delay vector and one transmit antenna port. In other words, each port may be a combination of a delay vector and a transmit antenna port.

In a possible implementation, the network device may traverse the L delay vectors, to obtain T×L different combinations, or T×L antenna-delay pairs. Because no space-domain precoding is involved, each combination may correspond to one delay vector. In other words, a total of T×L combinations of delay vectors and different transmit antenna ports may be obtained by loading the L delay vectors to reference signals of different transmit antenna ports.

In another possible implementation, delay vectors corresponding to at least two transmit antenna ports are different. A reference signal transmitted by the network device through a $l^{th}$ (1≤t≤T) transmit antenna port in the T transmit antenna ports may be obtained through precoding based on $L_t$ (1≤$L_k$≤L, and $L_k$ is an integer) delay vectors. L in the L delay vectors may satisfy:

$$L \leq \sum_{t=1}^{T} L_t.$$

Herein, that the delay vectors corresponding to the at least two transmit antenna ports are different may mean that delay vectors corresponding to at least two of the T transmit antenna ports are different, and delay vectors corresponding to other transmit antenna ports may be the same or may be different. This is not limited in this application. In other words, delay vectors corresponding to the transmit antenna ports are partially or completely different.

That delay vectors corresponding to two transmit antenna ports are different may mean that the delay vectors corresponding to the two transmit antenna ports are completely different, that is, the delay vectors corresponding to the two transmit antenna ports are not repeated, or have no intersection. For example, a delay vector corresponding to a transmit antenna port #1 includes b($\tau_2$), and delay vectors corresponding to a transmit antenna port #2 include b($\tau_1$) and b($\tau_3$) That delay vectors corresponding to two transmit antenna ports are different may alternatively mean that the delay vectors corresponding to the two transmit antenna ports are partially different, that is, the delay vectors corresponding to the two transmit antenna ports are partially repeated but are not completely the same, or the delay vectors corresponding to the two transmit antenna ports have an intersection but are not completely the same. For example, a delay vector corresponding to a transmit antenna port #1 includes b($\tau_2$), and delay vectors corresponding to a transmit antenna port #2 includes b($\tau_1$), b($\tau_2$), and b($\tau_3$). When delay vectors corresponding to any two of the T transmit antenna ports are not repeated, $$L = \sum_{t=1}^{T} L_t.$$

When delay vectors corresponding to two or more of the T transmit antenna ports are partially repeated, $$L < \sum_{t=1}^{T} L_t.$$

Therefore, the network device may obtain $$\sum_{t=1}^{T} L_t$$

combinations of angle vectors and delay vectors based on the T transmit antenna ports and the L delay vectors.

It should be understood that, the foregoing lists a correspondence between a transmit antenna port and a delay vector merely for ease of understanding. However, this shall not constitute any limitation on this application. The correspondence between a transmit antenna port and a delay vector is not limited in this application.

For ease of description below, a quantity of combinations of transmit antenna ports and delay vectors that are determined by using the T transmit antenna ports and the L delay vectors is denoted as P. It may be understood that in different implementations, values of P are different. For example, P=T×L, or $$P = \sum_{t=1}^{T} L_t.$$

Because of reciprocity between delays on uplink and downlink channels, the L delay vectors may all be determined based on uplink channel measurement. A specific method for determining the L stronger delays by the network device based on uplink channel measurement has been described in detail in the foregoing method 200. For brevity, details are not described herein again.

It should be understood that determining the L delay vectors based on uplink channel measurement is not a unique implementation; and the L delay vectors may be, for example, predefined, for example, defined in a protocol, or may be determined through statistics collection based on a result fed back in one or more previous downlink channel measurements. This is not limited in this application.

In an FDD mode, delays on uplink and downlink channels may be reciprocal Therefore, the L delay vectors that are obtained through uplink channel measurement may be loaded to a downlink reference signal, so that the terminal device performs downlink channel measurement based on the received precoded reference signal.

The network device may precode the downlink reference signal such as a CSI-RS based on the L delay vectors, to obtain a precoded reference signal. The network device may transmit the precoded reference signal by using a preconfigured reference signal resource.

Optionally, the method 300 further includes: The terminal device receives second indication information, where the second indication information is used to configure one or more reference signal resources. Correspondingly, the network device sends the second indication information.

The one or more reference signal resources configured by using the second indication information may be used to carry the precoded reference signal. A precoded reference signal carried on a same reference signal resource may correspond to one or more same ports. When a plurality of reference signal resources are configured by using the second indication information, antenna-delay pairs corresponding to precoded reference signals carried on the reference signal resources may be different, and the reference signal resources do not overlap in frequency domain and/or time domain. In this embodiment, a precoded reference signal of each port corresponds to one transmit antenna port and one delay vector.

Herein, the antenna-delay pair corresponding to the precoded reference signal may include a delay vector used to precode the reference signal and a transmit antenna port used to transmit the reference signal. That the antenna-delay pairs corresponding to the precoded reference signals carried on the reference signal resources are different may mean that transmit antenna ports and/or delay vectors corresponding to the precoded reference signals carried on the reference signal resources are different. For example, one or more of the following cases may be included: Precoded reference signals carried on two reference signal resources may be obtained through precoding based on different delay vectors and transmitted through a same transmit antenna port; precoded reference signals carried on two reference signal resources may be obtained through precoding based on a same delay vector and transmitted through different transmit antenna ports; and precoded reference signals carried on two reference signal resources may be obtained through precoding based on different delay vectors and transmitted through different transmit antenna ports.

Specifically, that the antenna-delay pairs corresponding to the precoded reference signals carried on the reference signal resources are different may include one or more of the following cases: Precoded reference signals carried on two reference signal resources may be obtained through precoding based on different delay vectors and transmitted through a same transmit antenna port; precoded reference signals carried on two reference signal resources may be obtained through precoding based on a same delay vector and transmitted through different transmit antenna ports; and precoded reference signals carried on two reference signal resources may be obtained through precoding based on different delay vectors and transmitted through different transmit antenna ports.

In other words, precoded reference signals carried on any two reference signal resources may correspond to different antenna-delay pairs. That is, transmit antenna ports and/or delay vectors corresponding to the precoded reference signals carried on the any two reference signal resources are different. In other words, delay vectors corresponding to precoded reference signals carried on different reference signal resources may be repeated, or transmit antenna ports corresponding to precoded reference signals carried on different reference signal resources may be repeated, but formed antenna-delay pairs are different.

Because the second indication information has been described in detail above, for brevity, details are not described herein again.

In an implementation, the network device may traverse each of the L delay vectors to precode a reference signal on each transmit antenna port, to obtain a precoded reference signal. The reference signal resource used to transmit the precoded reference signal may be preconfigured by the network device by using higher layer signaling, for example, the second indication information. The reference signal resource may include one or more RBs, for example, N RBs. A precoded reference signal carried on each RB is obtained through precoding based on the L same delay vectors.

In this implementation, the network device may preconfigure one reference signal resource for the terminal device. A precoded reference signal carried on each RB in the reference signal resource may correspond to P ports. The precoded reference signal of each port may be obtained by precoding a reference signal of one transmit antenna port based on one of the L delay vectors. In other words, the precoded reference signal of each port may correspond to one antenna-delay pair.

In addition, because the L delay vectors are loaded to each RB in the reference signal resource, and each RB corresponds to a relatively large quantity of ports, relatively high pilot overheads may be caused. Therefore, the network device may configure a relatively small pilot density by using higher layer signaling, for example, the second indication information, to reduce the pilot overheads.

In another possible implementation, the network device may precode the reference signal based on the L delay vectors. Precoded reference signals obtained through precoding based on different delay vectors may be mapped to different RBs. The precoded reference signal carried on each RB may be obtained through precoding based on some of the L delay vectors. In the plurality of RBs, precoded reference signals carried on at least two RBs are obtained through precoding based on different delay vectors.

In this implementation, there may be a plurality of reference signal resources used to transmit the precoded reference signal. The network device may preconfigure a plurality of reference signal resources for the terminal device by using higher layer signaling, for example, the second indication information. Each of the plurality of reference signal resources may include one or more RBs. The precoded reference signal carried on each reference signal resource may correspond to one or more ports, and antenna-delay pairs corresponding to the precoded reference signals carried on the reference signal resources may be different. The precoded reference signal of each port may be obtained by precoding a reference signal of one transmit antenna port based on one of the L delay vectors. In addition, the reference signal resources do not overlap in frequency domain and/or time domain. For example, the reference signal resources are arranged in a staggered manner in frequency domain. Therefore, precoded reference signals obtained through precoding based on different delay vectors may be carried by using different time-frequency resources.

In this implementation, a quantity of ports to which a precoded reference signal carried on each RB may correspond may be less than P. For example, if one delay vector is loaded to each RB, the precoded reference signal carried on each RB may correspond to T ports, and precoded reference signals carried on at least two RBs correspond to different delay vectors.

It should be understood that the foregoing definition of the quantity of ports based on each RB is merely a possible implementation, and shall not constitute any limitation on this application. This application further provides a method for defining a quantity of ports. To be specific, the quantity of ports may be a quantity of ports corresponding to a precoded reference signal carried on each reference signal resource. In other words, the quantity of ports may be defined across RBs.

Such a manner of defining the quantity of ports may be applied to a case in which RBs are grouped.

Optionally, the method 300 further includes: The terminal device receives third indication information, where the third indication information is used to configure one reference signal resource. Correspondingly, the network device sends the third indication information.

The reference signal resource configured by using the third indication information may be used to carry a precoded reference signal, and the precoded reference signal carried on the reference signal resource may be a reference signal obtained through precoding based on the L delay vectors. In addition, in the reference signal resource, precoded reference signals carried on at least two RBs may be obtained through precoding based on different delay vectors, and/or precoded reference signals carried on at least two RBs may be transmitted through different transmit antenna ports. In other words, the precoded reference signals carried on the at least two RBs correspond to different ports. Therefore, in a same reference signal resource, ports corresponding to precoded reference signals carried on RBs are not necessarily the same.

With reference to FIG. 3 to FIG. 7, the foregoing has described in detail the correspondence between a precoded reference signal carried on each RB in each reference signal resource and a port when the RBs are grouped or are not grouped. In this embodiment, a correspondence between a precoded reference signal carried on each RB in each reference signal resource and a port is similar to this, and only the angle vector in the foregoing embodiment is replaced with a transmit antenna port. For brevity, details are not described herein with reference to the accompanying drawings.

Step 320: The terminal device generates fifth indication information, where the fifth indication information may be used to indicate P weighting coefficients corresponding to P antenna-delay pairs.

Specifically, the P antenna-delay pairs may be determined by using each of the T transmit antenna ports and one or more delay vectors corresponding to the precoded reference signal sent on each transmit antenna port. Each antenna-delay pair may include one of the T transmit antenna ports and one of the L delay vectors.

Because the reference signal is not precoded on the transmit antenna port, the P weighting coefficients corresponding to the P antenna-delay pairs may also be understood as P weighting coefficients corresponding to P delay vectors that are used to form the P antenna-delay pairs. Therefore, in this embodiment, the P antenna ports and the P weighting coefficients corresponding to the P antenna ports may be used to determine a precoding matrix, that is, a weighted sum of the P delay vectors may be used to determine the precoding matrix. It may be understood that the P delay vectors may include one or more repeated delay vectors.

In this embodiment, the terminal device may perform downlink channel estimation on the received precoded reference signal, to determine the weighting coefficient of each of the P antenna-delay pairs based on channel estimation values on the plurality of RBs.

The following describes in detail a specific process in which the terminal device determines the P weighting coefficients.

It should be noted that when receiving the precoded reference signal from the network device, the terminal device may determine a time-frequency resource of the precoded reference signal of each port based on a predefined pilot pattern, and may receive the precoded reference signal of each port on the corresponding time-frequency resource.

As described above, if precoding on a reference signal is not considered, for each receive antenna, dimensions of a downlink channel may be N×T. Dimensions of a downlink channel on one RB that is received through one receive antenna may be 1×T. Because the network device precodes the reference signal based on the delay vector, dimensions of a downlink channel received by the terminal device on each receive antenna may be 1×P. The downlink channel whose dimensions are 1×P is a channel estimation value obtained by performing channel estimation on the precoded reference signal on one RB. P elements in the downlink channel may correspond to P antenna-delay pairs. A $p^{th}$ element may represent a channel estimation value obtained by performing channel estimation on a precoded reference signal corresponding to a $p^{th}$ antenna-delay pair on one RB.

Because the precoded reference signal corresponds to P antenna-delay pairs, a precoded reference signal carried on each RB may correspond to one or more ports.

If the network device does not group the RBs, the precoded reference signal on each RB may correspond to P ports. For example, a precoded reference signal corresponding to a $p^{th}$ port in the P ports may be a precoded reference signal that is obtained by precoding the reference signal based on one delay vector, for example, an $l^{th}$ delay vector, and that is sent through one transmit antenna port, for example, a $t^{th}$ (1≤t≤T, and t is an integer) transmit antenna port. In other words, the precoded reference signal corresponding to the $p^{th}$ port may be used to determine a weighting coefficient of an antenna-delay pair including the $l^{th}$ delay vector and the $t_{th}$ transmit antenna port, that is, may be used to determine a weighting coefficient of the $p^{th}$ antenna-delay pair. Therefore, the P ports are in a one-to-one correspondence with the P antenna-delay pairs. It should be understood that a correspondence among the $p^{th}$ port, the $l^{th}$ delay vector, and the $t^{th}$ transmit antenna port that is listed above is merely an example, and shall not constitute any limitation on this application. The terminal device does not learn of a correspondence among each port, a delay vector, and a transmit antenna port. The terminal device only needs to receive a reference signal and perform channel estimation based on a time-frequency resource corresponding to each port.

For the precoded reference signal of the $p^{th}$ port, the terminal device may determine, based on downlink channels received on N RBs, the weighting coefficient of the $p^{th}$ antenna-delay pair. The weighting coefficient of the $p^{th}$ antenna-delay pair may be a $p^{th}$ element in a channel estimation value that is obtained by performing superposition summation on N channel estimation values on the N RBs and whose dimensions are 1×P.

It is assumed that an estimation value that is of a downlink channel and that is obtained by the terminal device by performing channel estimation on the precoded reference signal of the $p^{th}$ port is denoted as $y_n^{(p)}$. In this case, a sum of a plurality of estimation values that are obtained by the terminal device by performing channel estimation on the precoded reference signals of the P ports on the N RBs may be represented as $$\sum_{n=1}^{N} y_n^{(p)} \cdot \sum_{n=1}^{N} y_n^{(p)}$$

may be a vector whose dimensions are 1×P, and the vector includes P weighting coefficients corresponding to P antenna-delay pairs. It may be understood that a $p^{th}$ element in the vector is the weighting coefficient of the $p^{th}$ antenna-delay pair, and the weighting coefficient of the $p^{th}$ antenna-delay pair is determined by using the precoded reference signal that is obtained through precoding based on the $l^{th}$ delay vector and that is transmitted through the $t^{th}$ transmit antenna port.

Because the P ports include L groups of ports corresponding to the L delay vectors, the P weighting coefficients may be understood as L groups of weighting coefficients corresponding to the L delay vectors. Each group of weighting coefficients may include T weighting coefficients corresponding to a maximum of T transmit antenna ports.

When each group of ports includes T ports and corresponds to T transmit antenna ports, each of the L groups of weighting coefficients may include T weighting coefficients. In this case, the P weighting coefficients may be represented as, for example, a form of a matrix whose dimensions are T×L or L×T. The weighting coefficient that is in the P weighting coefficients and that corresponds to the $t^{th}$ transmit antenna port and the $l^{th}$ delay vector may be denoted as $\alpha_{t,l}$.

When delay vectors corresponding to at least two transmit antenna ports are different, transmit antenna ports corresponding to the at least two delay vectors are also different. In this case, each group of weighting coefficients includes a maximum of T weighting coefficients. In this case, there are $L_t$ delay vectors corresponding to the $t^{th}$ transmit antenna port in the P weighting coefficients, and a weighting coefficient corresponding to the $t^{th}$ transmit antenna port and an $l_t^{th}$ delay vector may be denoted as $\alpha_{t,l_t}$.

Based on the foregoing method, the terminal device may determine, based on the received precoded reference signals of the P ports, the P weighting coefficients corresponding to the P antenna-delay pairs.

A principle of determining the weighting coefficient corresponding to the P angle-delay pairs by performing full-band summation on the channel estimation values has been described in detail in the foregoing method 200. In this embodiment, based on the same principle, the terminal device may also determine the weighting coefficients corresponding to the P antenna-delay pairs. For brevity, details are not described herein again.

In addition, a correspondence between each element in a coefficient matrix $C_{DL}$ and each element in the channel estimation value $$\sum_{n=1}^{N} y_n^{(p)}$$

is similar to the correspondence between each element in the coefficient matrix $C_{DL}$ and each element in the channel estimation value $$\sum_{n=1}^{N} y_n^{(p)}$$

in the foregoing method 200. For brevity, details are not described herein again.

If the network device groups the RBs, a quantity of ports corresponding to a precoded reference signal carried on each RB may be less than P However, the terminal device may still perform channel estimation on the precoded reference signal of each port, to determine the P weighting coefficients corresponding to the P antenna-delay pairs. In this case, the P weighting coefficients may be respectively determined based on precoded reference signals carried on frequency domain groups. The terminal device does not learn of a delay vector used by the network device to precode the reference signal, and does not learn of a correspondence between each frequency domain group and a combination of a transmit antenna port and a delay vector. The terminal device only needs to perform, based on a predefined grouping rule, channel estimation on a precoded reference signal received on each frequency domain group.

The grouping manner shown in FIG. 4 is still used as an example. The RB #1, the RB #5, the RB #9, and the RB #13 may be grouped into the frequency domain group #1; the RB #2, the RB #6, the RB #10, and the RB #14 may be grouped into the frequency domain group #2; the RB #3, the RB #7, the RB #11, and the RB #15 may be grouped into the frequency domain group #3; and the RB #4, the RB #8, the RB #12, and the RB #16 may be grouped into the frequency domain group #4.

The terminal device may determine weighting coefficients of T antenna-delay pairs based on the precoded reference signals received on the RB #1, the RB #5, the RB #9, and the RB #13, and the T antenna-delay pairs are T antenna-delay pairs respectively formed by the T transmit antenna ports and the delay vector $b(\tau_1)$; the terminal device may determine weighting coefficients of T antenna-delay pairs based on the precoded reference signals received on the RB #2, the RB #6, the RB #10, and the RB #14, and the T antenna-delay pairs are T antenna-delay pairs respectively formed by the T transmit antenna ports and the delay vector $b(\tau_2)$; the terminal device may determine weighting coefficients of T antenna-delay pairs based on the precoded reference signals received on the RB #3, the RB #7, the RB #11, and the RB #15, and the T antenna-delay pairs are T antenna-delay pairs respectively formed by the T transmit antenna ports and the delay vector $b(\tau_3)$; and the terminal device may determine weighting coefficients of T antenna-delay pairs based on the precoded reference signals received on the RB #4, the RB #8, the RB #12, and the RB #16, and the T antenna-delay pairs are T antenna-delay pairs respectively formed by the T transmit antenna ports and the delay vector $b(\tau_4)$.

When the network device groups the RBs, the terminal device needs to know a quantity of frequency domain groups in advance. Therefore, the network device may notify the terminal device of the quantity of frequency domain groups in advance by using signaling.

Optionally, the method further includes: The terminal device receives fourth indication information, where the fourth indication information is used to indicate the quantity of frequency domain groups. Correspondingly, the network device sends the fourth indication information.

As described above, the network device may preconfigure the quantity of ports by using higher layer signaling. Therefore, the terminal device may determine, based on existing signaling, the quantity of ports corresponding to the precoded reference signal carried on each RB. When the network device groups the RBs, the network device may further indicate the quantity of frequency domain groups by using the fourth indication information. The terminal device may determine an RB in each frequency domain group based on a same grouping rule, further estimate a downlink channel of each port, and determine the weighting coefficient of each antenna-delay pair.

It should be noted that the terminal device and the network device may pre-agree on a grouping rule of RBs. The two parties may group the RBs based on the predefined grouping rule, so that RBs included in each frequency domain group that are determined by the two parties are the same.

In this embodiment, the quantity of frequency domain groups may be equal to a quantity of delay vectors. Optionally, the fourth indication information is used to indicate a value of L. In addition, because P=T×L, when the RBs are grouped, the quantity of ports corresponding to the precoded reference signal carried on each RB is K, the terminal device may calculate L based on P and K. Therefore, the fourth indication information may directly indicate the value of L, or may indicate the value of L by indicating the value of P. This is not limited in this application. In other words, the fourth indication information may be used to indicate either of L and P.

After determining the P weighting coefficients corresponding to the P antenna-delay pairs, the terminal device may generate fifth indication information to indicate the P weighting coefficients.

A specific method for indicating the P weighting coefficients by the terminal device by using the fifth indication information has been described in detail in the foregoing method 200. In this embodiment, a method for indicating the P weighting coefficients by the terminal device by using the fifth indication information may be similar to this. For brevity, details are not described herein again.

It should be noted that a specific process in which the terminal device generates the fifth indication information is described in detail above by using one polarization direction and one receive antenna as an example. In other words, the P weighting coefficients may be determined based on a precoded reference signal that is sent by a transmit antenna in one polarization direction and that is received by one receive antenna. However, this shall not constitute any limitation on this application.

When a plurality of receive antennas are configured for the terminal device, the receive antenna described above as an example may be any one of the plurality of receive antennas configured for the terminal device. In other words, the terminal device may determine the P weighting coefficients for each receive antenna based on the foregoing method.

When transmit antennas in a plurality of polarization directions are configured for the network device, the polarization direction described above as an example may be any one of the plurality of polarization directions. In other words, the terminal device may determine, based on the foregoing method, the P weighting coefficients based on a precoded reference signal sent by the transmit antenna in each polarization direction.

If a quantity of polarization directions is 1, a quantity of receive antennas is R, and R is an integer greater than 1, the fifth indication information may be used to indicate R groups of weighting coefficients corresponding to the R receive antennas, and each group of weighting coefficients may include P weighting coefficients. Herein, P weighting coefficients corresponding to one receive antenna are P weighting coefficients determined based on a precoded reference signal received on the receive antenna.

Specific content in the first indication information in this case has been described in detail in the foregoing method 200. Specific content included in the fifth indication information may be similar to that of the first indication information. For brevity, details are not described herein again.

If a quantity of receive antennas is 1, a quantity of polarization directions is J, and J is an integer greater than 1, the fifth indication information may be used to indicate J groups of weighting coefficients corresponding to the J polarization directions, and each group of weighting coefficients may include P weighting coefficients. Herein, P weighting coefficients corresponding to one polarization direction are P weighting coefficients determined based on a precoded reference signal transmitted in the polarization direction.

Specific content in the first indication information in this case has been described in detail in the foregoing method 200. Specific content included in the fifth indication information may be similar to that of the first indication information. For brevity, details are not described herein again.

If a quantity of receive antennas is R and a quantity of polarization directions is J, the fifth indication information may be used to indicate J×R×P weighting coefficients corresponding to the J polarization directions and the R receive antennas.

Specific content in the first indication information in this case has been described in detail in the foregoing method 200. Specific content included in the fifth indication information may be similar to that of the first indication information. For brevity, details are not described herein again.

In addition, when a weighting coefficient is fed back based on a receive antenna, the terminal device may further indicate a quantity of receive antennas. Optionally, the method 200 further includes: The terminal device sends seventh indication information, where the seventh indication information is used to indicate the quantity of receive antennas. Correspondingly, the network device receives the seventh indication information.

The seventh indication information and the first indication information may be carried in same signaling, for example, a PMI or CSI, for sending, or may be sent by using different signaling. This is not limited in this application.

It should be understood that a quantity of receive antennas of the terminal device may also be predefined, for example, defined in a protocol. In this case, the terminal device may not indicate the quantity of receive antennas by using additional signaling.

Actually, that the terminal device feeds back a measurement result of a downlink channel is not limited to that the terminal device feeds back the measurement result of the downlink channel based on each receive antenna. The terminal device may alternatively feed back the measurement result of the downlink channel based on a transport layer.

In this embodiment, after determining, based on the foregoing method, the weighting coefficient corresponding to each polarization direction and each receive antenna, the terminal device may further process the weighting coefficient, to obtain a weighting coefficient fed back based on each transport layer.

A specific method for determining, by the terminal device, the P weighting coefficients corresponding to each transport layer is described in detail in the foregoing method 200, and a specific method for indicating, by the terminal device by using the first indication information, the weighting coefficient corresponding to each transport layer is also described in detail. In this embodiment, a specific method for determining, by the terminal device, the P weighting coefficients corresponding to each transport layer and a specific method for indicating, by using the fifth indication information, the P weighting coefficients corresponding to each transport layer may be similar to the foregoing methods. For brevity, details are not described herein again.

When a weighting coefficient is fed back based on a transport layer, the terminal device may further indicate a quantity of transport layers.

Optionally, the method 300 further includes: The terminal device sends eighth indication information, where the eighth indication information is used to indicate a quantity of transport layers. Correspondingly, the network device receives the eighth indication information.

Optionally, the eighth indication information is an RI.

It should be understood that the RI is merely an example of the eighth indication information, and shall not constitute any limitation on this application. A specific form of the eighth indication information is not limited in this application.

It should be further understood that the eighth indication information and the first indication information may be carried in same signaling, for example, CSI, for sending, or may be sent by using different signaling. This is not limited in this application.

It should be further understood that the method for constructing a coefficient matrix and performing SVD on the coefficient matrix to determine a weighting coefficient corresponding to each transport layer that is listed above is merely an example, and shall not constitute any limitation on this application. A specific method for determining the weighting coefficient of each transport layer is not limited in this application. Step 330: The terminal device sends the fifth indication information. Correspondingly, the network device receives the fifth indication information.

It should be understood that a specific process of step 330 is the same as that of step 230 in the method 200. Because step 230 has been described in detail in the foregoing method 200, for brevity, details are not described herein again.

Step 340: The network device determines the precoding matrix based on the fifth indication information.

As described above, the terminal device may feed back the weighting coefficient based on the receive antenna, or may feed back the weighting coefficient based on the transport layer. The network device may determine the precoding matrix based on the fifth indication information and based on different feedback granularities.

If the terminal device feeds back the weighting coefficient based on the receive antenna, the weighting coefficient indicated by the fifth indication information may include a weighting coefficient corresponding to one or more receive antennas. The network device may reconstruct a downlink channel based on a weighting coefficient corresponding to each receive antenna and an antenna-delay pair corresponding to each weighting coefficient, to further determine a precoding matrix of each RB.

Specifically, P weighting coefficients corresponding to each receive antenna may be in a one-to-one correspondence with P antenna-delay pairs. Because space-domain precoding is not performed on the reference signal, the network device may construct, based on the P weighting coefficients corresponding to each receive antenna and one or more delay vectors that are in the P antenna-delay pairs and that correspond to each transmit antenna port, a spatial-frequency matrix corresponding to each receive antenna, and reconstruct, based on the spatial-frequency matrix corresponding to each receive antenna, a downlink channel matrix corresponding to each RB, to determine the precoding matrix corresponding to each RB.

It may be understood that because the P weighting coefficients are in a one-to-one correspondence with the P antenna-delay pairs, the P weighting coefficients are also in a one-to-one correspondence with the delay vectors included in the P antenna-delay pairs.

There are $L_t$ delay vectors corresponding to the $t^{th}$ transmit antenna port in the T transmit antenna ports, and the delay vector corresponding to the $r^{th}$ transmit antenna port is denoted as $b(\tau_{l_t})$, where $l_t=1, 2, \ldots$, or $L_t$. A spatial-frequency matrix $H_{DL}^{(r)}$ corresponding to an $r^{th}$ receive antenna may be a matrix whose dimensions are T×N, a $t^{th}$ row in the spatial-frequency matrix may be a spatial-frequency vector $h_t^{(r)}$, and $$h_t^{(r)} = \sum_{l_t=1}^{L_t} \alpha_{t,l_t}^{(r)} (b(\tau_{l_t}))^H.$$

Therefore, a spatial-frequency matrix corresponding to the $r^{th}$ receive antenna may be obtained:

$$H_{DL}^{(r)} = \begin{bmatrix} h_1^{(r)} \\ h_2^{(r)} \\ \vdots \\ h_T^{(r)} \end{bmatrix}.$$

$\alpha_{t,l_t}^{(r)}$ represents a weighting coefficient that is fed back based on the $r^{th}$ receive antenna and that corresponds to the $t^{th}$ transmit antenna port and the $l_t^{th}$ delay vector.

It may be understood that if any two of the T transmit antenna ports correspond to the L same delay vectors, the spatial-frequency vector $h_t^{(r)}$ may be expressed as $$h_t^{(r)} = \sum_{l=1}^{L} \alpha_{t,l}^{(r)} (b(\tau_l))^H.$$

$\alpha_{t,l}^{(r)}$ represents the weighting coefficient corresponding to the $t^{th}$ transmit antenna port and the $l^{th}$ delay vector.

For ease of description, $$h_t^{(r)} = \sum_{l=1}^{L} \alpha_{t,l}^{(r)} (b(\tau_l))^H$$

is used as an example for description below. It may be understood that, regardless of whether delay vectors corresponding to transmit antenna ports are the same, determining of the precoding matrix is not affected.

It should be noted that, for ease of understanding, the foregoing uses one polarization direction of the transmit antenna as an example to describe a specific process of determining the spatial-frequency matrix corresponding to the receive antenna. However, this shall not constitute any limitation on this application. When the quantity of polarization directions of the transmit antenna is greater than 1, the network device may still determine, based on the foregoing method, the spatial-frequency matrix corresponding to each receive antenna.

For example, the quantity of polarization directions is 2. Each spatial-frequency vector in the spatial-frequency matrix that corresponds to the $r^{th}$ receive antenna in a first polarization direction may be determined by using a calculation formula $$h_{t,1}^{(r)} = \sum_{l=1}^{L} \alpha_{t,l,1}^{(r)} (b(\tau_l))^H.$$

Each spatial-frequency vector in the spatial-frequency matrix that corresponds to the $r^{th}$ receive antenna in the second polarization direction may be determined by using a calculation formula $$h_{t,2}^{(r)} = \sum_{l=1}^{L} \alpha_{t,l,2}^{(r)} (b(\tau_l))^H.$$

$h_{t,1}^{(r)}$ represents a spatial-frequency vector that is fed back based on the $r^{th}$ receive antenna in the first polarization direction; $\alpha_{t,l,1}^{(r)}$ represents a weighting coefficient that is fed back based on the $r^{th}$ receive antenna and that corresponds to the $t^{th}$ transmit antenna port and the $l^{th}$ delay vector in the first polarization direction; $h_{t,2}^{(r)}$ represents a spatial-frequency vector that is fed back based on the $r^{th}$ receive antenna in the second polarization direction, and $\alpha_{t,l,2}^{(r)}$ represents a weighting coefficient that is fed back based on the $r^{th}$ receive antenna and that corresponds to the $t^{th}$ transmit antenna port and the $l^{th}$ delay vector in the second polarization direction.

It should be understood that the foregoing calculation formulas of the spatial-frequency vectors $h_{t,1}^{(r)}$ and $h_{t,2}^{(r)}$ that are defined for the two polarization directions are merely examples, and shall not constitute any limitation on this application. For example, quantities of delay vectors and/or angle vectors loaded in different polarization directions may be the same or may be different, and delay vectors and/or angle vectors loaded in different polarization directions may be the same or may be different.

For the R receive antennas, the network device may determine spatial-frequency matrices $H_{DL}^{(1)}$ and $H_{DL}^{(2)}$ to $H_{DL}^{(R)}$ based on the P weighting coefficients corresponding to each receive antenna. Therefore, the network device may determine a downlink channel matrix corresponding to each RB.

It should be understood that a specific process in which the network device determines, based on the spatial-frequency matrix corresponding to each receive antenna, the downlink channel matrix corresponding to each RB is described in detail in the foregoing method 200. For brevity, details are not described herein again.

It should be noted that, as described above, a channel matrix determined based on a spatial-frequency matrix obtained by performing weighted summation on the angle-delay pairs is a conjugate transpose of an actual channel matrix.

The network device may further determine the precoding matrix of each RB based on the downlink channel matrix corresponding to each RB. For example, the network device may determine the precoding matrix by performing SVD on the downlink channel matrix or a covariance matrix of the channel matrix, or may determine the precoding matrix by performing eigenvalue decomposition (EVD) on a covariance matrix of the downlink channel matrix.

It should be understood that, for a specific manner of determining the precoding matrix by the network device based on the channel matrix, refer to the conventional technology. A manner of determining the precoding matrix is not limited in this application.

It should be further understood that, merely for ease of understanding, the foregoing shows a specific process in which the network device determines the downlink channel matrix based on the spatial-frequency matrix, to further determine the precoding matrix. However, this shall not constitute any limitation on this application. Alternatively, the network device may directly determine the precoding matrix based on the spatial-frequency matrix. For example, the matrix $V^{(n)}$ may be determined based on the spatial-frequency matrix, and the network device may determine the precoding matrix in a manner of performing SVD on $(V^{(n)})*(V^{(n)})^T$ and then taking a right eigenvector.

If the terminal device feeds back the weighting coefficient based on the transport layer, the weighting coefficient indicated by the fifth indication information may include a weighting coefficient of one or more transport layers. The network device may determine, based on a weighting coefficient corresponding to each transport layer and an antenna-delay pair corresponding to each weighting coefficient, a spatial-frequency matrix corresponding to each transport layer, to further determine a precoding matrix of each RB.

Specifically, P weighting coefficients corresponding to each transport layer may be in a one-to-one correspondence with P antenna-delay pairs. The network device may construct, based on the P weighting coefficients corresponding to each transport layer and one or more delay vectors that are in the P antenna-delay pairs and that correspond to each transmit antenna port, a spatial-frequency matrix corresponding to the transport layer.

There are $L_t$ delay vectors corresponding to the $t^{th}$ transmit antenna port in the T transmit antenna ports, and the delay vector corresponding to the $t^{th}$ transmit antenna port is denoted as $b(\tau_{l_t})$, where $l_t=1, 2, \ldots,$ or $L_t$. The spatial-frequency matrix $H_{DL}^{(z)}$ corresponding to the $z^{th}$ transport layer may be a matrix whose dimensions are T×N, a $t^{th}$ row in the spatial-frequency matrix may be a spatial-frequency vector $h_t^{(z)}$, and $$h_t^{(z)} = \sum_{l_t=1}^{L_t} \alpha_{t,l_t}^{(z)} (b(\tau_{l_t}))^H.$$

Therefore, the spatial-frequency matrix corresponding to the $z^{th}$ transport layer may be obtained:

$$H_{DL}^{(z)} = \begin{bmatrix} h_1^{(z)} \\ h_2^{(z)} \\ \vdots \\ h_T^{(z)} \end{bmatrix}.$$

$\alpha_{t,l_t}^{(z)}$ represents a weighting coefficient that is fed back based on the $z^{th}$ transport layer and that corresponds to the $t^{th}$ transmit antenna port and the $l_t^{th}$ delay vector.

It may be understood that if any two of the T transmit antenna ports correspond to the L same delay vectors, the spatial-frequency vector $h_t^{(z)}$ may be expressed as $$h_t^{(z)} = \sum_{l=1}^{L} \alpha_{t,l}^{(z)} (b(\tau_l))^H.$$

$\alpha_{t,l}^{(z)}$ represents a weighting coefficient that is fed back based on the $z^{th}$ transport layer and that corresponds to the $t^{th}$ transmit antenna port and the $l^{th}$ delay vector.

For ease of description, $$h_t^{(r)} = \sum_{l=1}^{L} \alpha_{t,l}^{(r)} (b(\tau_l))^H$$

is used as an example for description below. It may be understood that, regardless of whether delay vectors corresponding to transmit antenna ports are the same, determining of the precoding matrix is not affected.

It should be noted that, for ease of understanding, the foregoing uses one polarization direction of the transmit antenna as an example to describe a specific process of determining the spatial-frequency matrix corresponding to the receive antenna. However, this shall not constitute any limitation on this application. When the quantity of polarization directions of the transmit antenna is greater than 1, the network device may still determine, based on the foregoing method, the spatial-frequency matrix corresponding to each receive antenna.

For example, the quantity of polarization directions is 2. Each spatial-frequency vector in the spatial-frequency matrix that corresponds to the $z^{th}$ transport layer in a first polarization direction may be determined by using a calculation formula $$h_{t,1}^{(z)} = \sum_{l=1}^{L} \alpha_{t,l,1}^{(z)} (b(\tau_l))^H.$$

Each spatial-frequency vector in the spatial-frequency matrix that corresponds to the $z^{th}$ transport layer in the second polarization direction may be determined by using a calculation formula $$h_{t,2}^{(z)} = \sum_{l=1}^{L} \alpha_{t,l,2}^{(z)} (b(\tau_l))^H.$$

$h_{t,1}^{(z)}$ represents a spatial-frequency vector that is fed back based on the $z^{th}$ transport layer in the first polarization direction; $\alpha_{t,l,1}^{(z)}$ represents a weighting coefficient that is fed back based on the $z^{th}$ transport layer and that corresponds to the $t^{th}$ transmit antenna port and the $l^{th}$ delay vector in the first polarization direction; $h_{t,2}^{(z)}$ represents a spatial-frequency vector that is fed back based on the $z^{th}$ transport layer in the second polarization direction; and $\alpha_{t,l,2}^{(z)}$ represents a weighting coefficient that is fed back based on the $z^{th}$ transport layer and that corresponds to the $i^{th}$ transmit antenna port and the $l^{th}$ delay vector in the second polarization direction.

It should be understood that the foregoing calculation formulas of the spatial-frequency vectors $h_{t,1}^{(z)}$ and $h_{t,2}^{(z)}$ that are defined for the two polarization directions are merely examples, and shall not constitute any limitation on this application. For example, quantities of delay vectors and/or angle vectors loaded in different polarization directions may be the same or may be different, and delay vectors and/or angle vectors loaded in different polarization directions may be the same or may be different.

For the Z transport layers, the network device may determine, based on the P weighting coefficients corresponding to each transport layer, spatial-frequency matrices $H_{DL}^{(1)}$ and $H_{DL}^{(2)}$ to $H_{DL}^{(Z)}$ corresponding to the transport layers. Therefore, the network device may determine a precoding matrix corresponding to each RB. It should be understood that a specific process in which the network device determines, based on the spatial-frequency matrix corresponding to each transport layer, the precoding matrix corresponding to each RB is described in detail in the foregoing method 200. For brevity, details are not described herein again.

It should be further understood that the foregoing is merely an example, and shows a possible implementation in which the network device determines the precoding matrix based on the fifth indication information. However, this shall not constitute any limitation on this application. A specific implementation in which the network device determines the precoding matrix based on the fifth indication information is not limited in this application. Based on a same concept, a person skilled in the art performs transformation or equivalent replacement on the foregoing listed matrix operation, and a method for determining a precoding matrix shall fall within the protection scope of this application.

It should be further understood that the precoding matrix determined above is a precoding matrix corresponding to an RB. Herein, the RB is an example of a frequency domain unit. The precoding matrix corresponding to the RB may be a precoding matrix determined at a granularity of an RB based on a channel matrix corresponding to the RB, or a precoding matrix determined based on a precoded reference signal received on the RB, and may be used to precode data transmitted by using the RB. A downlink channel corresponding to the RB may be a downlink channel determined based on the precoded reference signal received on the RB, and may be used to determine the precoding matrix corresponding to the RB.

When the granularity of the frequency domain unit is relatively large, for example, when the frequency domain unit is a subband, a PRG, or a PRB, the network device may determine the precoding matrix for the frequency domain unit based on the precoding matrix corresponding to each RB in each frequency domain unit. A specific method for determining, by the network device, the precoding matrix of each frequency domain unit based on the precoding matrix corresponding to each RB in the frequency domain unit has been described in detail in the foregoing method 200. For brevity, details are not described herein again.

It should be further understood that the weighting coefficient that is mentioned above and that corresponds to a transmit antenna port and a delay vector is a weighting coefficient corresponding to an antenna-delay pair including the transmit antenna port and the delay vector. For example, the weighting coefficient corresponding to the $t^{th}$ transmit antenna port and the $l^{th}$ delay vector is the weighting coefficient corresponding to the antenna-delay pair including the $t^{th}$ transmit antenna port and the $l^{th}$ delay vector. For brevity, examples are not described one by one herein.

In the embodiments of this application, the network device may precode a downlink reference signal based on a delay that is determined through uplink channel measurement, so that the terminal device performs downlink channel measurement based on the precoded reference signal. Because the network device precodes the reference signal based on reciprocity between delays on uplink and downlink channels, information about the downlink channel detected by the terminal device is information that has no reciprocity. Therefore, the terminal device may not need to feed back a space domain vector and a frequency domain vector (for example, the foregoing transmit antenna port and delay vector), but only needs to feed back a weighting coefficient corresponding to each antenna-delay pair, thereby greatly reducing feedback overheads of the terminal device. In addition, a downlink channel measurement process of the terminal device is simplified, and calculation complexity of the terminal device in the channel measurement process is reduced by using the reciprocity between the uplink and downlink channels. In addition, a precoding matrix is constructed through linear superposition of a plurality of space domain vectors and a plurality of frequency domain vectors, so that the precoding matrix determined by the network device can adapt to a downlink channel, thereby still ensuring relatively high feedback precision while reducing the feedback overheads.

It should be understood that, in the embodiments of this application, merely for ease of understanding, a specific process of performing downlink channel measurement and determining the precoding matrix when the spatial-frequency matrix is obtained based on the conjugate transpose of the actual channel is shown. However, this shall not constitute any limitation on this application. A relationship between the actual channel and the spatial-frequency matrix $H_{DL}$ is not fixed. Different definitions of the spatial-frequency matrix and the spatial-frequency component matrix may change the relationship between the actual channel and the spatial-frequency matrix $H_{DL}$. For example, the spatial-frequency matrix $H_{DL}$ may be obtained based on the conjugate transpose of the actual channel, or may be obtained based on a transpose of the actual channel.

When a relationship between the spatial-frequency matrix and the channel matrix is defined differently, operations performed by the network device when the delay and the angle are loaded are also different, and operations performed by the terminal device when the terminal device performs channel measurement and performs feedback correspondingly change. However, these are only implementation behaviors of the terminal device and the network device, and shall not constitute any limitation on this application. The definition of the channel matrix, the dimensions and the definition of the spatial-frequency matrix, and a transformation relationship between the channel matrix and the spatial-frequency matrix are not limited in this application. Similarly, a transformation relationship between the spatial-frequency matrix and the precoding matrix is not limited in this application either.

It should be further understood that sequence numbers of the processes do not mean execution sequences in the foregoing embodiments. The execution sequences of the processes should be determined based on functions and internal logic of the processes, and shall not constitute any limitation on the implementation processes of the embodiments of this application.

The foregoing describes in detail, with reference to FIG. 2 to FIG. 8, the precoding vector indication and determining method provided in the embodiments of this application. The following describes in detail communications apparatuses provided in the embodiments of this application with reference to FIG. 9 to FIG. 11.

Figure 9:
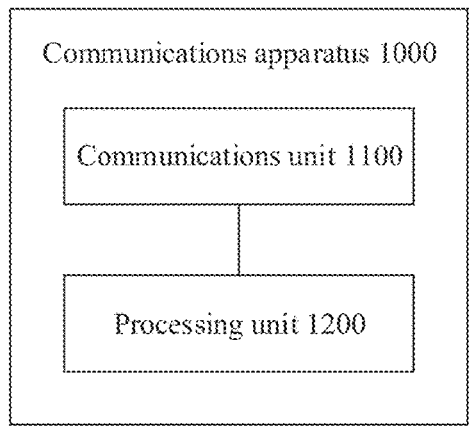
FIG. 9 is a schematic block diagram of a communications apparatus according to an embodiment of this application.

FIG. 9 is a schematic block diagram of a communications apparatus according to an embodiment of this application. As shown in the figure, the communications apparatus 1000 may include a communications unit 1100 and a processing unit 1200.

In a possible design, the communications apparatus 1000 may correspond to the terminal device in the foregoing method embodiments, for example, may be the terminal device, or may be a chip disposed in the terminal device.

Specifically, the communications apparatus 1000 may correspond to the terminal device in the method 200 or the method 300 according to the embodiments of this application. The communications apparatus 1000 may include units configured to perform the method performed by the terminal device in the method 200 in FIG. 2 or the method 300 in FIG. 8. In addition, the units in the communications apparatus 1000 and the foregoing other operations and/or functions are separately intended to implement corresponding procedures of the method 200 in FIG. 2 or the method 300 in FIG. 8.

When the communications apparatus 1000 is configured to perform the method 200 in FIG. 2, the communications unit 1100 may be configured to perform step 210 and step 230 in the method 200, and the processing unit 1200 may be configured to perform step 220 in the method 200.

When the communications apparatus 1000 is configured to perform the method 300 in FIG. 8, the communications unit 1100 may be configured to perform step 310 and step 330 in the method 30), and the processing unit 1200 may be configured to perform step 340 in the method 300.

It should be understood that a specific process in which each unit performs the foregoing corresponding step is described in detail in the foregoing method embodiments. For brevity, details are not described herein again.

Figure 10:
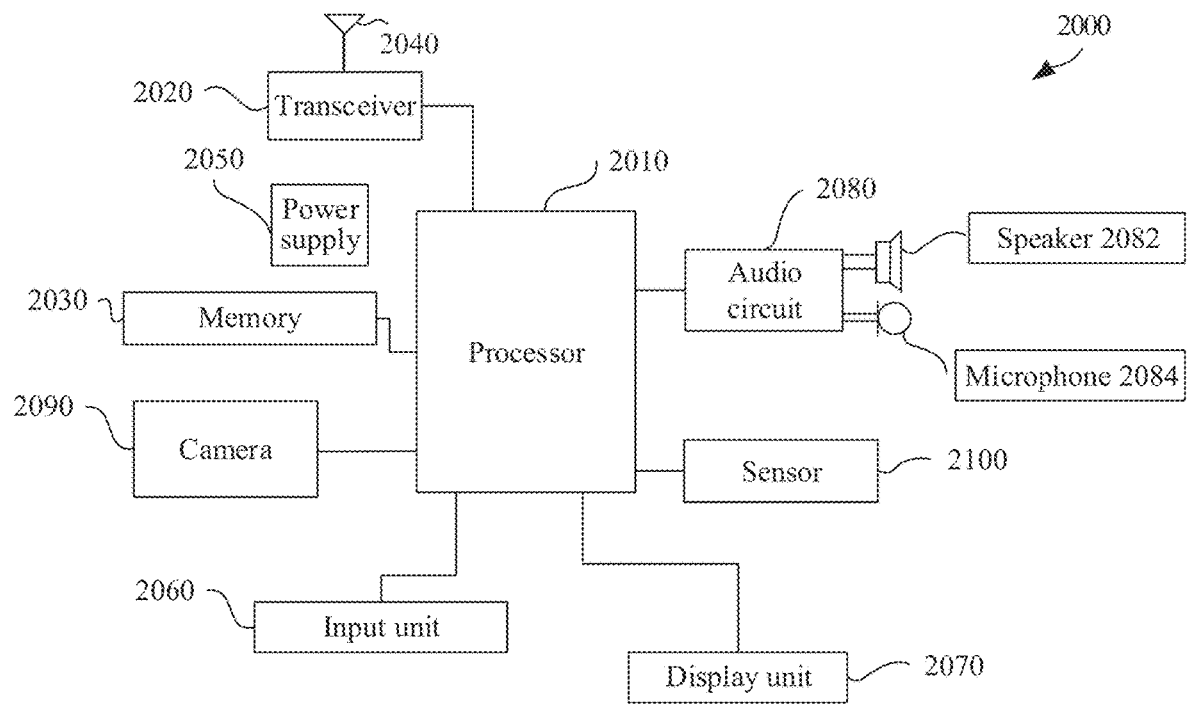
FIG. 10 is a schematic structural diagram of a terminal device according to an embodiment of this application.

It should be further understood that when the communications apparatus 1000 is the terminal device, the communications unit 1100 in the communications apparatus 1000 may correspond to a transceiver 2020 in a terminal device 2000 shown in FIG. 10, and the processing unit 1200 in the communications apparatus 1000 may correspond to a processor 2010 in the terminal device 2000 shown in FIG. 10.

It should be further understood that when the communications apparatus 1000 is the chip disposed in the terminal device, the communications unit 1100 in the communications apparatus 1000 may be an input/output interface.

In another possible design, the communications apparatus 1000 may correspond to the network device in the foregoing method embodiments, for example, may be the network device, or a chip disposed in the network device.

Specifically, the communications apparatus 1000 may correspond to the network device in the method 200 or the method 300 according to the embodiments of this application. The communications apparatus 1000 may include units configured to perform the method performed by the network device in the method 200 in FIG. 2 or the method 300 in FIG. 8. In addition, the units in the communications apparatus 1000 and the foregoing other operations and/or functions are separately intended to implement corresponding procedures of the method 200 in FIG. 2 or the method 300 in FIG. 8.

When the communications apparatus 1000 is configured to perform the method 200 in FIG. 2, the communications unit 1100 may be configured to perform step 210 and step 230 in the method 200, and the processing unit 1200 may be configured to perform step 240 in the method 200.

When the communications apparatus 1000 is configured to perform the method 300 in FIG. 8, the communications unit 1100 may be configured to perform step 310 and step 330 in the method 300, and the processing unit 1200 may be configured to perform step 340 in the method 300.

Figure 11:
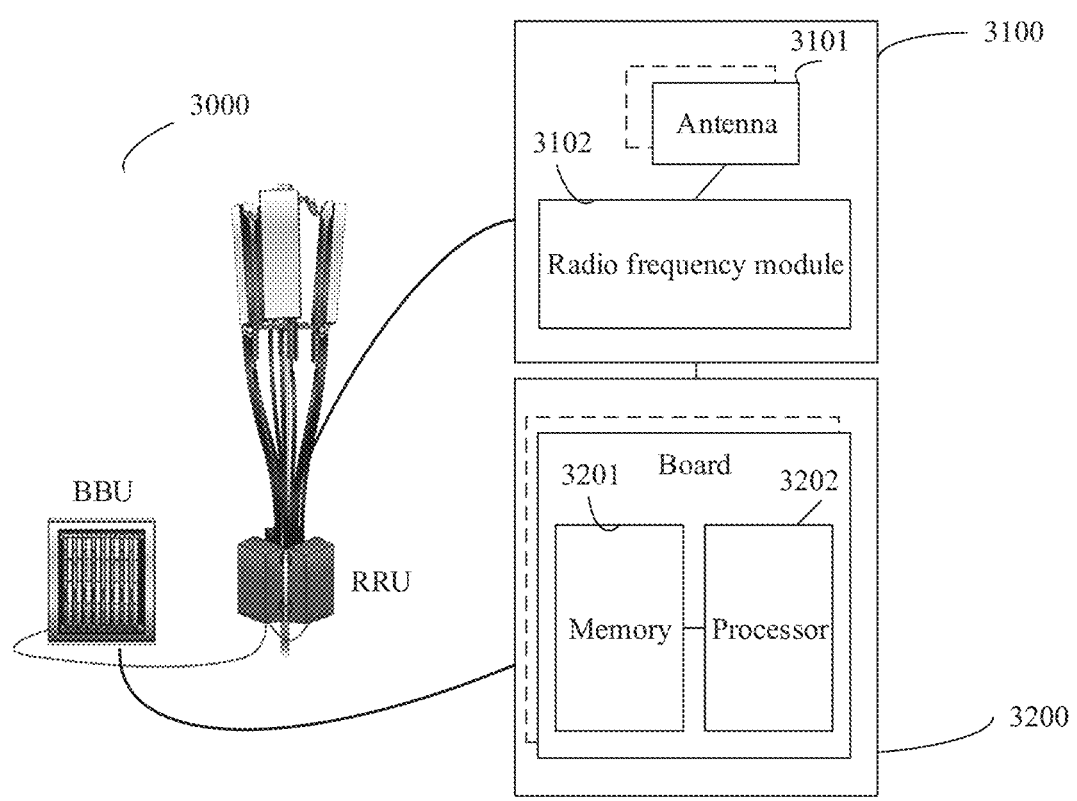
FIG. 11 is a schematic structural diagram of a network device according to an embodiment of this application.

It should be further understood that when the communications apparatus 1000 is a network device, the communications unit in the communications apparatus 1000 may correspond to a transceiver 3200 in a network device 3000 shown in FIG. 11, and the processing unit 1200 in the communications apparatus 1000 may correspond to a processor 3100 in the network device 3000 shown in FIG. 11.

It should be further understood that when the communications apparatus 1000 is the chip disposed in the network device, the communications unit 1100 in the communications apparatus 1000 may be an input/output interface.

FIG. 10 is a schematic structural diagram of the terminal device 2000 according to an embodiment of this application. The terminal device 2000 may be applied to the system shown in FIG. 1, to perform functions of the terminal device in the foregoing method embodiments. As shown in the figure, the terminal device 2000 includes the processor 2010 and the transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program in the memory 2030 and run the computer program, to control the transceiver 2020 to receive or send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 9.

The transceiver 2020 may correspond to the communications unit in FIG. 9, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that the terminal device 2000 shown in FIG. 10 can implement the processes of the terminal device in the method embodiment shown in FIG. 2 or FIG. 8. Operations and/or functions of the modules in the terminal device 2000 are separately intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050 that is configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 11 is a schematic structural diagram of a network device according to an embodiment of this application, for example, may be a schematic structural diagram of a base station. The base station 3000 may be applied to the system shown in FIG. 1, to perform functions of the network device in the foregoing method embodiments. As shown in the figure, the base station 3000 may include one or more radio frequency units, for example, one or more remote radio units (RRU) 3100, and one or more baseband units (BBU) (which may also be referred to as distributed units (DU)) 3200. The RRU 3100 may be referred to as a transceiver unit, and corresponds to the communications unit 1200 in FIG. 9. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to: receive and send a radio frequency signal, and perform conversion between the radio frequency signal and a baseband signal. For example, the RRU 3100 is configured to send indication information to a terminal device. The BBU 3200 is mainly configured to: perform baseband processing, control the base station, and so on. The RRU 3100 and the BBU 3200 may be physically disposed together, or may be physically disposed separately; to be specific, the base station is a distributed base station.

The BBU 3200 is a control center of the base station, may be referred to as a processing unit, may correspond to the processing unit 1100 in FIG. 9, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, to generate the foregoing indication information.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store a necessary instruction and necessary data. The processor 3202 is configured to control the base station to perform a necessary action, for example, configured to control the base station to perform an operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may be further disposed on each board.

It should be understood that the base station 3000 shown in FIG. 11 can implement the processes of the network device in the method embodiment in FIG. 2 or FIG. 8. Operations and/or functions of the modules in the base station 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor is configured to perform the communication method in any one of the foregoing method embodiments.

It should be understood that, the processing apparatus may be a chip. For example, the processing apparatus may be a field programmable gate array (FPGA), an application-specific integrated circuit (ASIC), a system-on-a-chip (SoC), a central processing unit (CPU), a network processor (NP), a digital signal processing circuit (digital signal processor, DSP), a micro controller unit (MCU), a programmable logic device (PLD), or another integrated chip.

In an implementation process, steps in the foregoing methods may be implemented by using a hardware integrated logic circuit in the processor, or by using instructions in a form of software. The steps of the methods disclosed with reference to the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in the embodiments of this application may be an integrated circuit chip, and has a signal processing capability. In an implementation process, steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and completed by a hardware decoding processor, or may be performed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memories in the systems and methods described in this specification include but are not limited to these memories and any memory of another suitable type.

According to the methods provided in the embodiments of this application, this application further provides a computer program product. The computer program product includes computer program code. When the computer program code is run on a computer, the computer is enabled to perform the method in either of the embodiments shown in FIG. 2 and FIG. 8.

According to the methods provided in the embodiments of this application, this application further provides a computer-readable medium. The computer-readable medium stores program code. When the program code is run on a computer, the computer is enabled to perform the method in either of the embodiments shown in FIG. 2 and FIG. 8.

According to the methods provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedures or the functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the communications unit (transceiver) performs a receiving or sending step in the method embodiments, and a step other than the sending step and the receiving step may be performed by the processing unit (processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and according to, for example, a signal having one or more data packets (for example, data from two components interacting with another component in a local system, in a distributed system, and/or across a network such as the Internet interacting with other systems by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel measurement method, comprising:
   receiving a precoded reference signal, wherein the precoded reference signal is obtained by precoding a reference signal based on K angle vectors and L delay vectors;
   generating first indication information, wherein:
      the first indication information is used to indicate P weighting coefficients corresponding to P angle-delay pairs;
      the P weighting coefficients are determined by using the precoded reference signal;
      the P angle-delay pairs and the P weighting coefficients corresponding to the P angle-delay pairs are used to determine a precoding matrix;
      each of the P angle-delay pairs comprises one of the K angle vectors and one of the L delay vectors; and
      P, K, and L are all positive integers; and
   sending the first indication information.

2. The method according to claim 1, wherein the method further comprises:
   receiving second indication information, wherein:
      the second indication information is used to configure one or more reference signal resources;
      the one or more reference signal resources are used to carry the precoded reference signal;
      a precoded reference signal carried on a same reference signal resource corresponds to one or more ports; and
      when a plurality of reference signal resources are configured by using the second indication information, angle-delay pairs corresponding to precoded reference signals carried on the plurality of reference signal resources are different, and the plurality of reference signal resources do not overlap in at least one of frequency domain or time domain.

3. The method according to claim 1, wherein the method further comprises:
   receiving third indication information, wherein:
      the third indication information is used to configure one reference signal resource;
      the one reference signal resource is used to carry the precoded reference signal; and
      port numbers corresponding to precoded reference signals carried on at least two resource blocks (RBs) in the one reference signal resource are different.

4. The method according to claim 1, wherein the method further comprises:
   receiving fourth indication information, wherein:
      the fourth indication information is used to indicate a quantity M of frequency domain groups;
      each of the M frequency domain groups comprises a plurality of RBs;
      precoded reference signals that are of a same port and that are carried on any two RBs in a same frequency domain group correspond to a same angle-delay pair; and
      M is an integer greater than 1.

5. The method according to claim 1, wherein each of the P weighting coefficients is a sum of a plurality of estimation values obtained by performing channel estimation on a precoded reference signal on a plurality of RBs, wherein the precoded reference signal is obtained through precoding based on one angle vector and one delay vector.

6. The method according to claim 1, wherein the K angle vectors and the L delay vectors are determined based on uplink channel measurement.

7. The method according to claim 1, wherein the P weighting coefficients correspond to one receive antenna or one transport layer.

8. A communications apparatus, comprising:
at least one processor; and
one or more memories coupled to the at least one processor and storing programming instructions for execution by the at least one processor to:
receive a precoded reference signal, wherein the precoded reference signal is obtained by precoding a reference signal based on K angle vectors and L delay vectors;
generate first indication information, wherein:
the first indication information is used to indicate P weighting coefficients corresponding to P angle-delay pairs;
the P weighting coefficients are determined by using the precoded reference signal;
the P angle-delay pairs and the P weighting coefficients corresponding to the P angle-delay pairs are used to determine a precoding matrix;
each of the P angle-delay pairs comprises one of the K angle vectors and one of the L delay vectors; and
P, K, and L are all positive integers; and
send the first indication information.

9. The apparatus according to claim 8, wherein the one or more memories store the programming instructions for execution by the at least one processor further to receive second indication information, wherein:
the second indication information is used to configure one or more reference signal resources;
the one or more reference signal resources are used to carry the precoded reference signal;
a precoded reference signal carried on a same reference signal resource corresponds to one or more ports; and
when a plurality of reference signal resources are configured by using the second indication information, angle-delay pairs corresponding to precoded reference signals carried on the plurality of reference signal resources are different, and the plurality of reference signal resources do not overlap in at least one of frequency domain or time domain.

10. The apparatus according to claim 8, wherein the one or more memories store the programming instructions for execution by the at least one processor further to receive third indication information, wherein:
the third indication information is used to configure one reference signal resource;
the one reference signal resource is used to carry the precoded reference signal; and
port numbers corresponding to precoded reference signals carried on at least two resource blocks (RBs) in the one reference signal resource are different.

11. The apparatus according to claim 8, wherein the one or more memories store the programming instructions for execution by the at least one processor further to receive fourth indication information, wherein:
the fourth indication information is used to indicate a quantity M of frequency domain groups;
each of the M frequency domain groups comprises a plurality of RBs;
precoded reference signals that are of a same port and that are carried on any two RBs in a same frequency domain group correspond to a same angle-delay pair; and
M is an integer greater than 1.

12. The apparatus according to claim 8, wherein each of the P weighting coefficients is a sum of a plurality of estimation values obtained by performing channel estimation on a precoded reference signal on a plurality of RBs, wherein the precoded reference signal is obtained through precoding based on one angle vector and one delay vector.

13. The apparatus according to claim 8, wherein the K angle vectors and the L delay vectors are determined based on uplink channel measurement.

14. The apparatus according to claim 8, wherein the P weighting coefficients correspond to one receive antenna or one transport layer.

15. A non-transitory computer-readable storage medium, storing a computer program for execution by at least one processor to implement operations comprising:
receiving a precoded reference signal, wherein the precoded reference signal is obtained by precoding a reference signal based on K angle vectors and L delay vectors;
generating first indication information, wherein:
the first indication information is used to indicate P weighting coefficients corresponding to P angle-delay pairs;
the P weighting coefficients are determined by using the precoded reference signal;
the P angle-delay pairs and the P weighting coefficients corresponding to the P angle-delay pairs are used to determine a precoding matrix;
each of the P angle-delay pairs comprises one of the K angle vectors and one of the L delay vectors; and
P, K, and L are all positive integers; and
sending the first indication information.

16. The non-transitory computer-readable storage medium according to claim 15, wherein the operations further comprise:
receiving second indication information, wherein:
the second indication information is used to configure one or more reference signal resources;
the one or more reference signal resources are used to carry the precoded reference signal;
a precoded reference signal carried on a same reference signal resource corresponds to one or more ports; and
when a plurality of reference signal resources are configured by using the second indication information, angle-delay pairs corresponding to precoded reference signals carried on the plurality of reference signal resources are different, and the plurality of reference signal resources do not overlap in at least one of frequency domain or time domain.

17. The non-transitory computer-readable storage medium according to claim 15, wherein the operations further comprise:
receiving third indication information, wherein:
the third indication information is used to configure one reference signal resource;
the one reference signal resource is used to carry the precoded reference signal; and
port numbers corresponding to precoded reference signals carried on at least two resource blocks (RBs) in the one reference signal resource are different.

18. The non-transitory computer-readable storage medium according to claim 15, wherein the operations further comprise:
receiving fourth indication information, wherein:
the fourth indication information is used to indicate a quantity M of frequency domain groups;
each of the M frequency domain groups comprises a plurality of RBs;

precoded reference signals that are of a same port and that are carried on any two RBs in a same frequency domain group correspond to a same angle-delay pair; and M is an integer greater than 1.

19. The non-transitory computer-readable storage medium according to claim 15, wherein each of the P weighting coefficients is a sum of a plurality of estimation values obtained by performing channel estimation on a precoded reference signal on a plurality of RBs, and wherein the precoded reference signal is obtained through precoding based on one angle vector and one delay vector.

20. The non-transitory computer-readable storage medium according to claim 15, wherein the K angle vectors and the L delay vectors are determined based on uplink channel measurement.

21. The non-transitory computer-readable storage medium according to claim 15, wherein the P weighting coefficients correspond to one receive antenna or one transport layer.

* * * * *